US011979701B1

(12) United States Patent
Zhang et al.

(10) Patent No.: US 11,979,701 B1
(45) Date of Patent: May 7, 2024

(54) OPEN EARPHONES

(71) Applicant: SHENZHEN SHOKZ CO., LTD., Guangdong (CN)

(72) Inventors: Lei Zhang, Shenzhen (CN); Peigeng Tong, Shenzhen (CN); Guolin Xie, Shenzhen (CN); Yongjian Li, Shenzhen (CN); Jiang Xu, Shenzhen (CN); Tao Zhao, Shenzhen (CN); Duoduo Wu, Shenzhen (CN); Ao Ji, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

(21) Appl. No.: 18/451,090

(22) Filed: Aug. 16, 2023

Related U.S. Application Data

(63) Continuation of application No. PCT/CN2023/079409, filed on Mar. 2, 2023.

(30) Foreign Application Priority Data

Oct. 28, 2022 (CN) ......................... 202211336918.4
Dec. 1, 2022 (CN) ......................... 202223239628.6
Dec. 30, 2022 (WO) ................ PCT/CN2022/144339

(51) Int. Cl.
*H04R 1/10* (2006.01)

(52) U.S. Cl.
CPC ........... *H04R 1/1008* (2013.01); *H04R 1/105* (2013.01); *H04R 2460/09* (2013.01)

(58) Field of Classification Search
CPC . H04R 1/00; H04R 1/02; H04R 1/021; H04R 1/026; H04R 1/028; H04R 1/10;
(Continued)

(56) References Cited

U.S. PATENT DOCUMENTS 9,031,275 B2 5/2015 Brødsgaard
10,631,075 B1 4/2020 Patil et al.
(Continued)

FOREIGN PATENT DOCUMENTS

CN 110958526 A 4/2020
CN 210491148 U * 5/2020 .............. H04R 1/10
(Continued)

OTHER PUBLICATIONS

CN214014498u, English Translation, Date: Aug. 2021.*
(Continued)

*Primary Examiner* — Thang V Tran
(74) *Attorney, Agent, or Firm* — METIS IP LLC

(57) ABSTRACT

Disclosed is an open earphone, comprising a sound production component and an ear hook. The ear hook may include a first portion and a second portion connected in sequence. The first portion may be hung between the auricle of a user and the head of the user, the second portion may extend toward a front outer side of the auricle and connect the sound production component, and the sound production component may be located close to the ear canal but not block the opening of the ear canal; wherein the sound production component and the auricle may have a first projection and a second projection on a sagittal plane, respectively, a centroid of the first projection may have a first distance from a highest point of the second projection in a vertical axis direction, a ratio of the first distance to a height of the second projection in the vertical axis direction may be within a range of 0.25-0.6, the centroid of the first projection may have a second distance from an end point of the second projection in a sagittal axis direction, and a ratio of the second distance to a width of the second projection in the sagittal axis direction may be within a range of 0.4-0.7.

20 Claims, 16 Drawing Sheets

(58) Field of Classification Search

CPC .... H04R 1/105; H04R 1/1008; H04R 1/1016; H04R 1/1058; H04R 1/1066; H04R 1/1075; H04R 25/00; H04R 25/02; H04R 25/60; H04R 25/602; H04R 25/607; H04R 25/65; H04R 2460/09

See application file for complete search history.

(56) References Cited

U.S. PATENT DOCUMENTS

| | | | | |
|---|---|---|---|---|
| 11,736,850 | B1 | 8/2023 | Liu et al. | |
| 2003/0044038 | A1* | 3/2003 | Shirata | H04R 1/105 381/381 |
| 2007/0009133 | A1 | 1/2007 | Gerkinsmeyer | |
| 2007/0258613 | A1 | 11/2007 | Wright | |
| 2009/0175473 | A1 | 7/2009 | Wong et al. | |
| 2010/0061681 | A1 | 3/2010 | Soetejo et al. | |
| 2012/0070022 | A1 | 3/2012 | Saiki | |
| 2012/0134524 | A1 | 5/2012 | Peng | |
| 2016/0134957 | A1 | 5/2016 | Jentz et al. | |
| 2016/0381472 | A1 | 12/2016 | Feeley et al. | |
| 2017/0006387 | A1 | 1/2017 | Kah, Jr. | |
| 2017/0034611 | A1* | 2/2017 | Maruyama | H04R 1/105 |
| 2020/0137476 | A1 | 4/2020 | Shinmen et al. | |
| 2020/0196062 | A1 | 6/2020 | Zhang | |
| 2020/0322712 | A1 | 10/2020 | Williams et al. | |
| 2021/0112329 | A1* | 4/2021 | Zhang | H04R 5/0335 |
| 2021/0168483 | A1* | 6/2021 | Zhang | H04R 1/2803 |
| 2021/0195312 | A1 | 6/2021 | Woo et al. | |
| 2022/0095029 | A1* | 3/2022 | Zheng | H04R 1/1066 |
| 2022/0124428 | A1* | 4/2022 | Zheng | H04R 1/1016 |
| 2022/0386006 | A1* | 12/2022 | Meyberg Guzman | H04R 25/407 |
| 2023/0061686 | A1 | 3/2023 | Wolfl | |
| 2023/0308801 | A1 | 9/2023 | Schmidt et al. | |

FOREIGN PATENT DOCUMENTS

| | | | | |
|---|---|---|---|---|
| CN | 212909891 U | | 4/2021 | |
| CN | 214014498 U | * | 8/2021 | H04R 1/10 |
| CN | 214125513 U | * | 9/2021 | H04R 1/10 |
| CN | 113542956 A | | 10/2021 | |
| CN | 113556638 A | | 10/2021 | |
| CN | 113573215 A | | 10/2021 | |
| CN | 114286228 A | | 4/2022 | |
| CN | 114286236 A | | 4/2022 | |
| CN | 216357249 U | * | 4/2022 | H04R 1/10 |
| CN | 114513717 A | * | 5/2022 | H04R 1/10 |
| CN | 216649963 U | * | 5/2022 | H04R 1/10 |
| CN | 115175069 A | | 10/2022 | |

OTHER PUBLICATIONS

International Search Report in PCT/CN2023/079409 dated Jun. 29, 2023, 8 pages.

Written Opinion in PCT/CN2023/079409 dated Jun. 29, 2023, 8 pages.

* cited by examiner

OPEN EARPHONES

CROSS REFERENCE TO RELATED APPLICATIONS

This application is a continuation of International Application No. PCT/CN2023/079409, filed on Mar. 2, 2023, which claims priority to the Chinese Patent Application No. 202211336918.4, filed on Oct. 28, 2022, the Chinese Patent Application No. 202223239628.6, filed on Dec. 1, 2022, and the International Application No. PCT/CN2022/144339, filed on Dec. 30, 2022, the entire contents of each of which are hereby incorporated by reference.

TECHNICAL FIELD

The present disclosure relates to the technical field of acoustics, and in particular to open earphones.

BACKGROUND

With the development of acoustic output technology, acoustic devices (e.g., earphones) have been widely used in people's daily life, which can be used in conjunction with electronic devices such as mobile phones and computers to provide users with an auditory feast. Acoustic devices can generally be classified into head-mounted type, ear hook type, and in-ear devices according to the way users wear them.

Therefore, it is desirable to provide an open earphone that can improve the wearing comfort of the user and has better output performance.

SUMMARY

Some embodiments of the present disclosure provide an open earphone, comprising: a sound production component and an ear hook. The ear hook may include a first portion and a second portion connected in sequence. The first portion may be hung between the auricle of a user and the head of the user. The second portion may extend toward a front outer side of the auricle and connect the sound production component, and the sound production component may be worn near an ear canal but not block an opening of the ear canal. The sound production component and the auricle may have a first projection and a second projection on a sagittal plane, respectively. A centroid of the first projection may have a first distance from a highest point of the second projection in a vertical axis direction. A ratio of the first distance to a height of the second projection in the vertical axis direction may be within a range of 0.25-0.6. The centroid of the first projection may have a second distance from an end point of the second projection in a sagittal axis direction. A ratio of the second distance to a width of the second projection in the sagittal axis direction may be within a range of 0.4-0.7.

Some embodiments of the present disclosure further provide an open earphone, comprising a sound production component and an ear hook. The ear hook may include a first portion and a second portion connected in sequence. The first portion may be hung between the auricle of a user and the head of the user. The second portion may extend toward a front outer side of the auricle and connect the sound production component, and the sound production component may be worn near an ear canal but not block an opening of the ear canal. The sound production component may extend at least partially into a cavity of auricular concha. The sound production component and the auricle may have a first projection and a second projection on a sagittal plane, respectively. A centroid of the first projection may have a seventh distance from a projection of a highest point of a connection part between the auricle and the head on the sagittal plane in a vertical axis direction. A ratio of the seventh distance to a distance between the projection of a highest point and a projection of a lowest point of the connection part between the auricle and the head on the sagittal plane in the vertical axis plane may be within a range of 0.4-0.65. A ratio of a distance between the centroid of the first projection and the projection of the end point of the tragus on the sagittal plane in the sagittal axis direction to a width of the second projection in the sagittal axis direction may be within a range of 0.4-0.65.

Some embodiments of the present disclosure further provide an open earphone, comprising a sound production component and an ear hook. The ear hook may include a first portion and a second portion connected in sequence. The first portion may be hung between the auricle of a user and the head of the user. The second portion may extend toward a front outer side of the auricle and connect the sound production component, and the sound production component may be worn near an ear canal but not block an opening of the ear canal. The sound production component may extend at least partially into a cavity of auricular concha. The sound production component and the auricle may have a first projection and a second projection on a sagittal plane, respectively. A distance between a centroid of the first projection and a contour of the second projection may be within a range of 23 mm-52 mm. An inclination angle of a projection of an upper sidewall or a lower sidewall of the sound production component on the sagittal plane relative to a horizontal direction may be less than or equal to 40°.

Some embodiments of the present disclosure further provide an open earphone, comprising a sound production component and an ear hook. The ear hook may include a first portion and a second portion connected in sequence. The first portion may be hung between the auricle of a user and the head of the user. The second portion may extend toward a front outer side of the auricle and connect the sound production component, and the sound production component may be worn near an ear canal but not block an opening of the ear canal. The sound production component may extend at least partially into a cavity of auricular concha. A distance between a midpoint of a projection of an upper sidewall of the sound production component on the sagittal plane and a projection of a highest point of the auricle on the sagittal plane may be within a range of 24 mm-36 mm. A distance between a midpoint of a projection of a lower sidewall of the sound production component on the sagittal plane and the highest point of the auricle on the sagittal plane may be within a range of 36 mm-54 mm.

Some embodiments of the present disclosure further provide an open earphone, comprising: a sound production component and an ear hook. The ear hook may include a first portion and a second portion connected in sequence. The first portion may be hung between the auricle of a user and the head of the user. The second portion may extend toward a front outer side of the auricle and connect the sound production component, and the sound production component may be worn near the ear canal but not block an opening of the ear canal. The sound production component may extend at least partially into a cavity of auricular concha. A distance between a midpoint of a projection of an upper sidewall of the sound production component on a sagittal plane and a projection of a vertex of the ear hook on the sagittal plane may be within a range of 21 mm-32 mm. A distance between a midpoint of a projection of a lower sidewall of the sound production component on the sagittal plane and the projection of the vertex of the ear hook on the sagittal plane may be within a range of 32 mm-48 mm.

Some embodiments of the present disclosure further provide an open earphone, comprising: a sound production component and an ear hook. The ear hook may include a first portion and a second portion connected in sequence. The first portion may be hung between the auricle of a user and the head of the user. The second portion may extend toward a front outer side of the auricle and connect the sound production component, and the sound production component may be worn near an ear canal but not block an opening of the ear canal. The sounding may at least partially cover an antihelix region. The sound production component and the auricle may have a first projection and a second projection on a sagittal plane, respectively. A distance between a centroid of the first projection and a contour of the second projection may be within a range of 13 mm-54 mm. An inclination angle of a projection of an upper sidewall or a lower sidewall of the sound production component on the sagittal plane relative to a horizontal direction may be less than or equal to 40°.

Some embodiments of the present disclosure further provide an open earphone, comprising: a sound production component and an ear hook. The ear hook may include a first portion and a second portion connected in sequence. The first portion may be hung between the auricle of a user and the head of the user. The second portion may extend toward a front outer side of the auricle and connect the sound production component, and the sound production component may be worn near an ear canal but not block an opening of the ear canal. The sound production component may at least partially cover an antihelix region. A distance between a midpoint of a projection of an upper sidewall of the sound production component on a sagittal plane and a projection of a highest point of the auricle on the sagittal plane may be within a range of 12 mm-24 mm. A distance between a midpoint of a projection of a lower sidewall of the sound production component on the sagittal plane and the projection of the highest point of the auricle on the sagittal plane may be within a range of 22 mm-34 mm.

Some embodiments of the present disclosure further provide an open earphone, comprising: a sound production component and an ear hook. The ear hook may include a first portion and a second portion connected in sequence. The first portion may be hung between the auricle of a user and the head of the user. The second portion may extend toward a front outer side of the auricle and connect the sound production component, and the sound production component may be worn near an ear canal but not block an opening of the ear canal. The sound production component may at least partially cover an antihelix region. A distance between a midpoint of a projection of an upper sidewall of the sound production component on a sagittal plane and a projection of a vertex of the ear hook on the sagittal plane may be within a range of 13 mm-20 mm. A distance between a midpoint of a projection of a lower sidewall of the sound production component on the sagittal plane and a projection of a vertex of the ear hook on the sagittal plane may be within a range of 22 mm-36 mm.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein.

DETAILED DESCRIPTION

Figure 1:
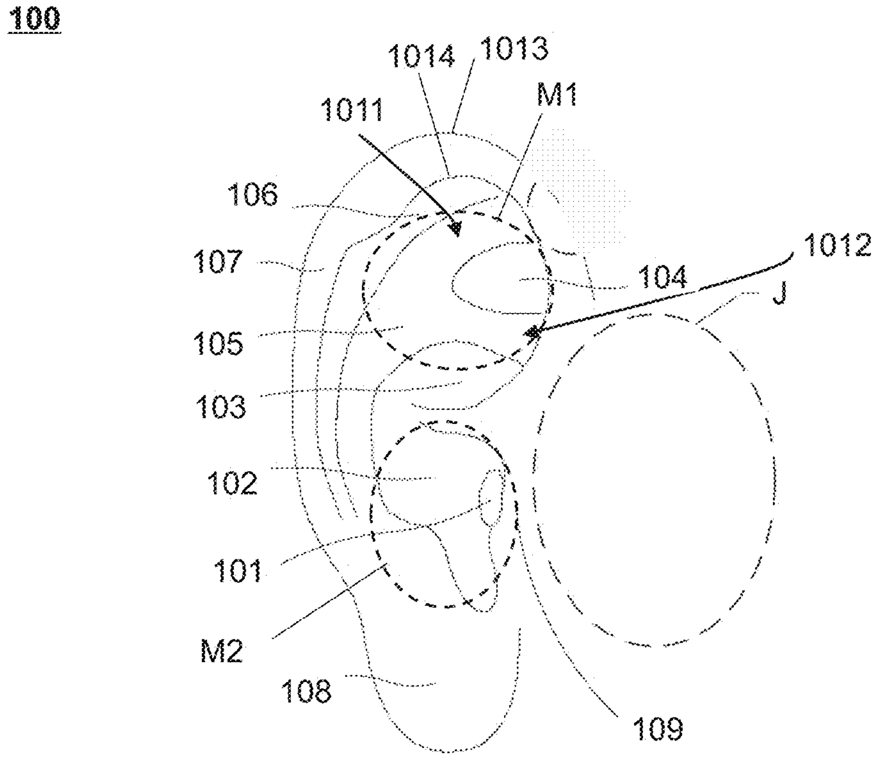
FIG. 1 is a schematic diagram illustrating an exemplary ear according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

FIG. 1 is a schematic diagram illustrating an exemplary ear according to some embodiments of the present disclosure. As shown in FIG. 1, FIG. 1 is a schematic diagram of an exemplary ear according to some embodiments of the present disclosure. Referring to FIG. 1, an ear 100 may include an external ear canal 101, a cavity of auricular concha 102, a cymba conchae 103, a triangular fossa 104, an antihelix 105, a scapha 106, a helix 107, an earlobe 108, a crus of helix 109, an outer contour 1013, and an inner contour 1014. It should be noted that, for the convenience of description, an upper anticrus of helix 1011, a lower anticrus of helix 1012, and the antihelix 105 are collectively referred to as the antihelix region in the embodiments of the present disclosure. In some embodiments, an acoustic device may be stably worn by means of one or more parts of the ear 100 supporting the acoustic device. In some embodiments, the external ear canal 101, the cavity of auricular concha 102, the cymba conchae 103, and the triangular fossa 104 may have a certain depth and volume in a three-dimensional space, which can be used to meet the wearing requirements of the acoustic device. For example, the acoustic device (e.g., the earphone) may be worn in the external ear canal 101. In some embodiments, the acoustic device may be worn by means of other parts of the ear 100 than the external ear canal 101. For example, the acoustic device may be worn by means of the cymba conchae 103, the triangular fossa 104, the antihelix 105, the scapha 106, or the helix 107, or a combination thereof. In some embodiments, the earlobe 108 of the user and other parts may be further used to improve the wearing comfort and reliability of the acoustic device. By using other parts of the ear 100 than the external ear canal 101 to realize the wearing of the acoustic device and the transmission of sound, the external ear canal 101 of the user may be "freed". When the user wears the acoustic device (open earphone), the acoustic device may not block the external ear canal 101 of the user. The user may receive both the sound from the acoustic device and the sound from the environment (e.g., sound of a whistle, sound of a vehicle bell, sound of people around, sound of traffic guidance, etc.), thereby reducing the probability of traffic accidents. In some embodiments, the acoustic device may be designed into a structure adapted to the ear 100 according to a structure of the ear 100, to realize the wearing of the sound production component of the acoustic device at different positions of the ear. For example, when the acoustic device is the open earphone, the open earphone may include a suspension structure (e.g., the ear hook) and the sound production component. The sound production component and the suspension structure may be physically connected. The suspension structure may be adapted to a shape of the auricle, to place the whole or part of the structure of the sound production component on a front side (e.g., a region J enclosed by dotted lines in FIG. 1) of the crus of helix 109. As another example, when the user wears the open earphone, the whole or part structure of the sound production component may be in contact with an upper part (e.g., a position of one or more of the crus of helix 109, the cymba conchae 103, the triangular fossa 104, the antihelix 105, the scapha 106, the helix 107, etc.) of the external ear canal 101. As another example, when the user wears the open earphone, the whole or part of the structure of the sound production component may be located in a cavity (e.g., a region M1 including at least the cymba conchae 103 and the triangular fossa 104 and a region M2 including at least the cavity of auricular concha 102 enclosed by the dotted lines in FIG. 1) formed by one or more parts (e.g., the cavity of auricular concha 102, the cymba conchae 103, the triangular fossa 104, etc.) of the ear.

Different users may have individual differences, resulting in different shapes, sizes and other dimensional differences in the ears. For ease of description and understanding, unless otherwise specified, the present disclosure mainly takes to an ear model with a "standard" shape and size for reference, and further describes how the acoustic device in different embodiments is worn on the ear model. For example, a simulator containing the head and (left and right) ears thereof prepared based on ANSI: S3.36, S3.25 and IEC: 60318-7 standards, such as GRAS KEMAR, HEAD Acoustics, B&K 4128 series, or B&K 5128 series, may be used as a reference for wearing the acoustic device, to present a situation that most users normally wear the acoustic device. Taking GRAS KEMAR as an example, an ear simulator may be any one of GRAS 45AC, GRAS 45BC, GRAS 45CC, or GRAS 43AG. Taking HEAD Acoustics as an example, an ear simulator may be any one of HMS 11.3, HMS 11.3 LN, or HMS II.3LN HEC. It should be noted that the range of data measured in the embodiments of the present disclosure is based on GRAS 45BC KEMAR, but it should be understood that there may be differences between different head models and ear models. There may be a fluctuation of ±10% in the relevant data range with other models. Merely by way of example, a reference ear model may have the following relevant features: a size of a projection of an auricle on a sagittal plane in a vertical axis direction may be within a range of 55 mm-65 mm, and a size of the projection of the auricle on the sagittal plane in a sagittal axis direction may be within a range of 45 mm-55 mm. The projection of the auricle on the sagittal plane refers to a projection of an edge of the auricle on the sagittal plane. The edge of the auricle may at least include an outer contour of the helix, a contour of the earlobe, a contour of a tragus, an intertragic notch, an antitragus tip, a notch between an antitragus and the anti-helix, etc. Therefore, in the present disclosure, descriptions such as "wearing by the user", "in the wearing state" and "in wearing" refer to that the acoustic device described in the present disclosure is worn on the ear of the simulator. Of course, considering the individual differences of different users, the structure, shape, size, thickness, etc. of one or more parts of the ear 100 may be differentiated according to ears of different shapes and sizes. These differentiated designs may be expressed as that feature parameters of one or more parts (e.g., the sound production component, the ear hook, etc. hereinafter) of the acoustic device may have different ranges of values, to adapt to different ears.

It should be noted that in the fields of medicine and anatomy, three basic planes including the sagittal plane, the coronal plane, and the horizontal plane, and three basic axes including the sagittal axis, the coronal axis, and the vertical axis of a human body may be defined. The sagittal plane refers to a section perpendicular to the ground along front and rear directions of the body, which divides the human body into left and right parts; the coronal plane refers to a section perpendicular to the ground along left and right directions of the body, which divides the human body into front and rear parts; and the horizontal plane refers to a section parallel to the ground along a vertical direction of the body, which divides the human body into upper and lower parts. Correspondingly, the sagittal axis refers to an axis along a front-back direction of the body and perpendicular to the coronal plane, the coronal axis refers to an axis along a left-right direction of the body and perpendicular to the sagittal plane, and the vertical axis refers to an axis along a vertical direction of the body and perpendicular to the horizontal plane. Further, the front side of the ear in the present disclosure refers to a side of the ear facing the facial region of the human body along the sagittal axis direction. A schematic diagram illustrating a front contour of the ear as shown in FIG. 1 may be obtained by observing the ear of the simulator along the coronal axis direction of the human body.

The description of the ear 100 is for illustration purposes only, and is not intended to limit the scope of the present disclosure. Those skilled in the art can make various variations and modifications based on the description of the present disclosure. For example, part of the structure of the acoustic device may cover part or all of the external ear canal 101. These variations and modifications are still within the protection scope of the present disclosure.

Figure 2:
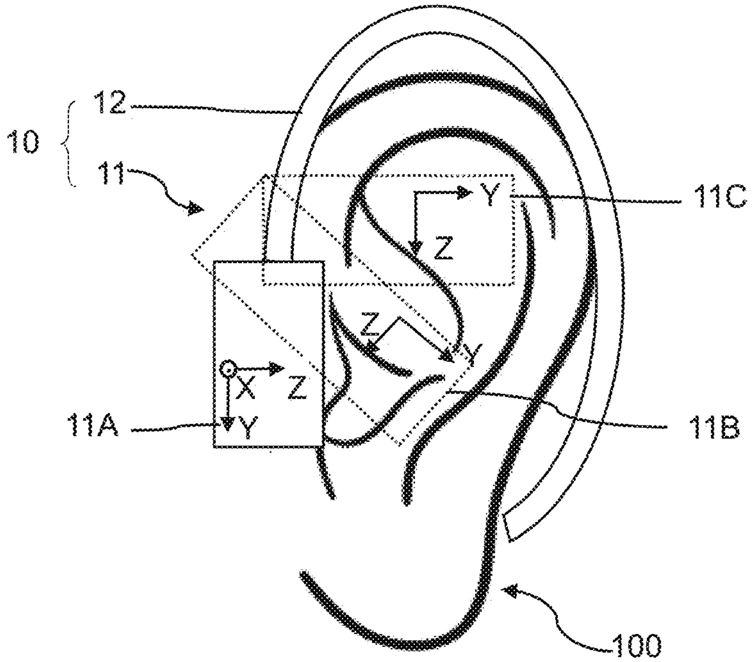
FIG. 2 is schematic diagram illustrating exemplary wearing of an open earphone according to some embodiments of the present disclosure.

FIG. 2 is a schematic diagram illustrating exemplary wearing of an open earphone according to some embodiments of the present disclosure. As shown in FIG. 2, the open earphone 10 may comprise a sound production component 11 and a suspension structure 12. In some embodiments, the open earphone 10 may enable the sound production component 11 to be worn on a user's body (e.g., the head, neck, or upper torso of the body) through the suspension structure 12. In some embodiments, the suspension structure 12 may be an ear hook. The sound production component 11 may be connected to one end of the ear hook. The ear hook may be set in a shape suitable for the ear of the user. For example, the ear hook may be in an arc structure. In some embodiments, the suspension structure 12 may also be a clamping structure adapted to the auricle of the user, to enable the suspension structure 12 to clamp the auricle of the user. In some embodiments, the suspension structure 12 may include but not limited to the ear hook, an elastic band, etc., so that the open earphone 10 may be better hung on the user to prevent from falling during use for the user.

In some embodiments, the sound production component 11 may be worn on the user's body. A loudspeaker may be disposed in the sound production component 11 to produce sound input to the ear of the user 100. In some embodiments, the open earphone 10 may be combined with products such as glasses, a headset, a head-mounted display device, an AR/VR helmet, etc. In this case, the sound production component 11 may be suspended or clamped near the ear 100 of the user. In some embodiments, the sound production component 11 may be circular, elliptical, polygonal (regular or irregular), U-shaped, V-shaped, or semicircular, so that the sound production component 11 may be directly hung on the ear 100 of the user.

Referring to FIG. 1 and FIG. 2, in some embodiments, when the user wears the open earphone 10, at least part of the sound production component 11 may be located in a region J on a front side of a tragus of the ear 100 of the user or regions M1 and M2 on a front outer side of an auricle in FIG. 1. An exemplary description may be given below in conjunction with different wearing positions of the sound production component (11A, 11B, and 11C). It should be noted that the front outer side of the auricle mentioned in the embodiments of the present disclosure refers to the side of the auricle away from the head along the coronal axis direction, and correspondingly, a rear inner side of the auricle refers to the side of the auricle facing the head along the coronal axis direction. In some embodiments, the sound production component 11A may be located on a side of the ear 100 of the user facing the facial region along the sagittal axis direction, i.e., the sound production component 11A may be located on a human facial region J on a front side of the ear 100. Further, a loudspeaker may be disposed inside a housing of the sound production component 11A. At least one sound guiding hole (not shown in FIG. 2) may be disposed on the housing of the sound production component 11A. The sound guiding hole may be disposed on a sidewall of the housing of the sound production component facing or close to the external ear canal 101 of the user. The loudspeaker may output sound to the external ear canal 101 of the user through the sound guiding hole. In some embodiments, the loudspeaker may include a diaphragm. A cavity inside the housing of the sound production component 11 may be at least divided into a front cavity and a rear cavity by the diaphragm. The sound guiding hole may be acoustically coupled with the front cavity. The diaphragm may vibrate to drive the air in the front cavity to vibrate to produce air-conducted sound. The air-conducted sound produced by the front cavity may be transmitted to the outside through the sound guiding hole. In some embodiments, the housing of the sound production component 11 may further include one or more pressure relief holes. The pressure relief hole may be located on a sidewall of the housing adjacent to or opposite to a sidewall where the sound guiding hole is located. The pressure relief hole may be acoustically coupled with the rear cavity. When the diaphragm vibrates, the vibration may also drive the air in the rear cavity to vibrate to produce air-conducted sound. The air-conducted sound produced by the rear cavity may be transmitted to the outside through the pressure relief hole. For example, in some embodiments, the loudspeaker in the sound production component 11A may output sound with a phase difference (e.g., anti-phase) through the sound guiding hole and the pressure relief hole. The sound guiding hole may be located in a sidewall of the housing of the sound production component 11A facing the external ear canal 101 of the user, and the pressure relief hole may be located on a side of the housing of the sound production component 11 away from the external ear canal 101 of the user. At this time, the housing may act as a baffle, increasing a sound path difference from the sound guiding hole and the pressure relief hole to the external ear canal 101, thereby increasing a sound intensity at the external ear canal 101 while reducing the volume of far-field leakage. In some embodiments, the sound production component 11 may have a major axis direction Y and a minor axis direction Z which are perpendicular to a thickness direction X and orthogonal to each other. The major axis direction Y may be defined as a direction (e.g., when a projection shape is a rectangle or an approximate rectangle, the major axis direction may be a length direction of the rectangle or the approximate rectangle) with a maximum extension size in a shape of a two-dimensional projection plane (e.g., a projection of the sound production component 11 on a plane where an outer surface of the sound production component is located, or a projection of the sound production component 11 on the sagittal plane) of the sound production component 11. The minor axis direction Z may be defined as a direction (e.g., when a projection shape is a rectangle or an approximate rectangle, the minor axis direction may be a width direction of the rectangle or the approximate rectangle) in a shape of a projection of the sound production component 11 on the sagittal plane perpendicular to the major axis direction Y. The thickness direction X may be defined as a direction perpendicular to the two-dimensional projection plane, e.g., which is consistent with the coronal axis direction, both pointing to the left and right directions of the body. In some embodiments, when the sound production component 11 is in a tilted state when worn, the major axis direction Y and the minor axis direction Z may still be parallel or approximately parallel to the sagittal plane. A certain included angle may be formed between the major axis direction Y and the sagittal axis direction, i.e., the major axis direction Y may also be tilted accordingly. A certain included angle may be formed between the minor axis direction Z and the vertical axis direction, i.e., the minor axis direction Z may also be tilted, as shown in the wearing state of the sound production component of FIG. 2. In some embodiments, the whole or part of the structure of the sound production component 11B may extend into the cavity of auricular concha, i.e., a projection of the sound production component 11B on the sagittal plane and a projection of the cavity of auricular concha on the sagittal plane may have an overlapping part. The specific description regarding the sound production component 11B may be found elsewhere in the present disclosure (e.g., FIG. 3 and corresponding content thereof). In some embodiments, the sound production component 11 may also be in a horizontal state or approximately horizontal state in the wearing state, as shown in the sound production component 11C of FIG. 2. The major axis direction Y may be consistent or approximately consistent with the sagittal axis direction, both pointing to the front-back direction of the body. The minor axis direction Z may be consistent or approximately consistent with the direction of the vertical axis, both pointing to the up-down direction of the body. It should be noted that in the wearing state, the sound production component 11C in the approximately horizontal state may mean that an included angle between the major axis direction Y of the sound production component 11C shown in FIG. 2 and the sagittal axis may be within a specific range (e.g., not greater than 20°). In addition, the wearing position of the sound production component may not be limited to the sound production component 11A, the sound production component 11B, and the sound production component 11C in FIG. 2. The wearing position of the sound production component 11 may meet the region J, the region M1, or the M2 in FIG. 1. For example, the whole or part structure of the sound production component 11 may be located in the region J enclosed by the dotted lines in FIG. 1. As another example, the whole or part structure of the sound production component may be in contact with the position of one or more parts of the ear 100 such as the crus of helix 109, the cymba conchae 103, the triangular fossa 104, the antihelix 105, the scapha 106, and the helix 107. As another example, the whole or part structure of the sound production component 11 may be located in a cavity (e.g., the region M1 enclosed by the dotted lines in FIG. 1 that includes at least the cymba conchae 103 and the triangular fossa 104, and the region M2 enclosed by the dotted lines in FIG. 1 that includes at least the cavity of auricular concha 102) formed by one or more parts of the ear 100 (e.g., the cavity of auricular concha 102, the cymba conchae 103, the triangular fossa 104, etc.).

In order to improve the stability of the open earphone 10 in the wearing state, the open earphone 10 may adopt any one or a combination of the following methods. First, at least part of the suspension structure 12 may be configured as a profiling structure that fits at least one of the rear inner side of the auricle and the head, to increase a contact area between the suspension structure 12 and the ear and/or the head, thereby increasing the resistance of the acoustic device 10 falling off from the ear. Second, at least part of the suspension structure 12 may be set as an elastic structure, so that the suspension structure 12 may have a certain amount of deformation in the wearing state, to increase the positive pressure of the suspension structure 12 on the ear and/or the head, thereby increasing the resistance of the open earphone 10 falling off from the ear. Third, at least part of the suspension structure 12 may be set to lean against the ear and/or the head in the wearing state, to form a reaction force that presses the ear and make the sound production component 11 press against the front outer side (e.g., the regions M1 and M2 shown in FIG. 1) of the auricle, thereby increasing the resistance of the open earphone 10 falling off from the ear. Fourth, the sound production component 11 and the suspension structure 12 may be set to clamp the antihelix area, the area of the cavity of auricular concha, etc. from the front outer side and the rear inner side of the auricle in the wearing state, thereby increasing the resistance of the open earphone 10 falling off from the ear. Fifth, the sound production component 11 or a structure connected thereto may be arranged to at least partially extend into cavities such as the cavity of auricular concha 102, the cymba conchae 103, the triangular fossa 104, and the scapha 106, thereby increasing the resistance of the open earphone 10 falling off from the ear.

Figure 3:
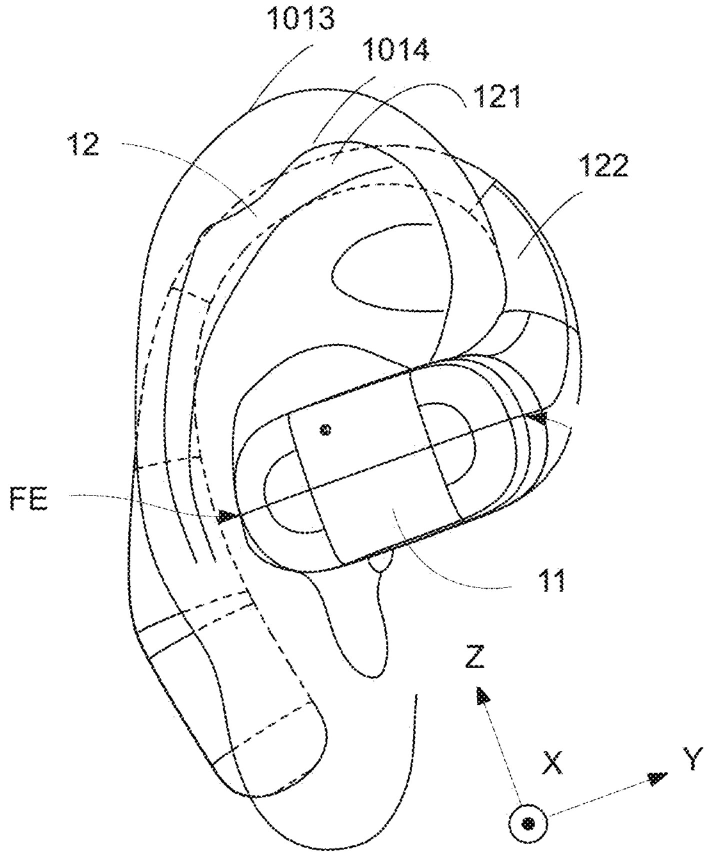
FIG. 3 is a schematic diagram illustrating a wearing process that a sound production component of an open earphone extends into a cavity of auricular concha according to some embodiments of the present disclosure.

Exemplarily, referring to FIG. 3, in the wearing state, an end FE (also referred to as a free end) of the sound production component 11 may extend into the cavity of auricular concha. Optionally, the sound production component 11 and the suspension structure 12 may be configured to clamp the ear region from the front and rear sides of the ear region corresponding to the cavity of auricular concha, thereby increasing the resistance of the open earphone 10 falling off from the ear, and further improving the stability of the open earphone 10 in the wearing state. For example, the end FE of the sound production component may be pressed in the cavity of auricular concha in the thickness direction X. As another example, the end FE may abut against the cavity of auricular concha (e.g., which abuts against an inner wall of the cavity of auricular concha opposite to the end FE) in the major axis direction Y and/or the minor axis direction Z. It should be noted that the end FE of the sound production component 11 refers to an end of the sound production component 11 opposite to a fixed end connected to the suspension structure 12, which is also referred to as the free end. The sound production component 11 may be a regular or irregular structure. An exemplary description is given to further illustrate the end FE of the sound production component 11. For example, when the sound production component 11 is a cuboid structure, an end wall of the sound production component 11 may be a plane, and the end FE of the sound production component 11 may be an end sidewall opposite to the fixed end connected to the suspension structure 12 in the sound production component 11. As another example, when the sound production component 11 is a sphere, an ellipsoid or an irregular structure, the end FE of the sound production component 11 may be a specific region away from the fixed end obtained by cutting the sound production component 11 along a Y-Z plane (a plane formed by the minor axis direction Z and the thickness direction X). A ratio of a size of the specific region along the major axis direction Y to the size of the sound production component along the major axis direction Y may be within a range of 0.05-0.2.

Figure 4:
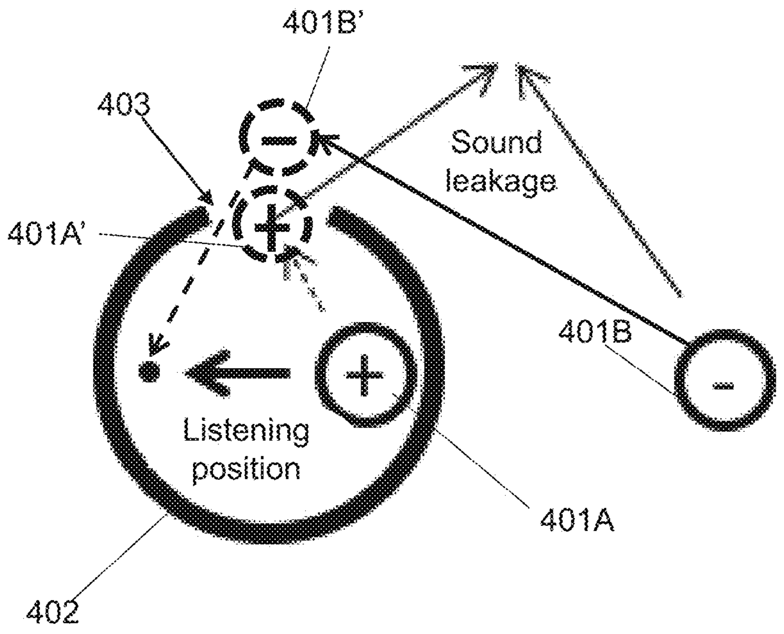
FIG. 4 is a schematic diagram illustrating a quasi-cavity structure acoustic model according to some embodiments of the present disclosure.

By extending at least part of the sound production component 11 into the cavity of auricular concha, the listening volume at the listening position (e.g., at the opening of the ear canal), especially the listening volume at the middle and low frequencies, may be improved, while still maintaining good effect of far-field sound leakage cancellation. Merely by way of example, when the whole or part of the structure of the sound production component 11 extends into the cavity of auricular concha 102, the sound production component 11 and the cavity of auricular concha 102 may form a structure similar to a cavity (hereinafter referred to as a quasi-cavity structure). In the embodiments of the disclosure, the quasi-cavity structure may be understood as a semi-closed structure enclosed by the sidewall of the sound production component 11 and the cavity of auricular concha 102. The semi-closed structure may make the listening position (e.g., the opening of the ear canal) not completely sealed off from the external environment, but have a leakage structure (e.g., an opening, a gap, a tube, etc.) in acoustic communication with the external environment. When the user wears the open earphone 10, one or more sound guiding holes may be disposed on a side of the housing of the sound production component 11 near or toward the ear canal of the user. One or more pressure relief holes may be disposed on the other sidewalls (e.g., sidewalls away from the ear canal of the user) of the housing of the sound production component 11. The sound guiding hole may be acoustically coupled with a front cavity of the open earphone 10, and the pressure relief hole may be acoustically coupled with a rear cavity of the open earphone 10. Taking the sound production component 11 including one sound guiding hole and one pressure relief hole as an example, the sound output from the sound guiding hole and the sound output from the pressure relief hole may be approximately regarded as two sound sources. Sound phases of the two sound sources may be opposite to form a dipole. Inner walls corresponding to the sound production component 11 and the cavity of auricular concha 102 may form the quasi-cavity structure, wherein the sound source corresponding to the sound guiding hole may be located in the quasi-cavity structure, and the sound source corresponding to the pressure relief hole may be located outside the quasi-cavity structure, forming an acoustic model shown in FIG. 4. As shown in FIG. 4, the quasi-cavity structure 402 may include a listening position and at least one sound source 401A. The "include" here may mean that at least one of the listening position and the sound source 401A is located inside the quasi-cavity structure 402, and may also mean that at least one of the listening position and the sound source 401A is located at an inner edge of the quasi-cavity structure 402. The listening position may be equivalent to the opening of the ear canal, an acoustic reference point of the ear, such as ERP, DRP, etc., or an entrance structure leading to the listener, etc. The sound source 401B may be located outside the quasi-cavity structure 402. The sound sources 401A and 401B with anti-phases may form a dipole. The dipole may respectively radiate sound to the surrounding space and produce the phenomenon of interference and cancellation of sound waves, thereby realizing the effect of sound leakage cancellation. As the sound path difference between the two sounds is relatively large at the listening position, the effect of sound cancellation may be relatively insignificant, and a relatively large sound may be heard at the listening position than at other positions. Specifically, as the sound source 401A is surrounded by the quasi-cavity structure 402, most of the sound radiated from the sound source 401A may reach the listening position through direct radiation or reflection. In contrast, most of the sound radiated from the sound source 401A may not reach the listening position without the quasi-cavity structure 402. Therefore, the arrangement of the quasi-cavity structure 402 may significantly increase the sound volume reaching the listening position. Meanwhile, only a small part of anti-phase sound radiated from an anti-phase sound source 401B outside the quasi-cavity structure 402 may enter the quasi-cavity structure 402 through the leakage structure 403 of the quasi-cavity structure 402. This may be equivalent to generating a secondary sound source 401B' at the leakage structure 403, of which the intensity may be significantly smaller than the sound source 401B and also be significantly smaller than the sound source 401A. The sound produced by the secondary sound source 401B' may have a weak anti-phase cancellation effect on the sound source 401A in the cavity, which may significantly increase the listening volume at the listening position. For sound leakage, the sound source 401A may radiate sound to the outside through the leakage structure 402 of the cavity, which may be equivalent to generating the secondary sound source 401A' at the leakage structure 402. As almost all the sound radiated by the sound source 401A comes from the leakage structure 403, and a scale of the quasi-cavity structure 402 is much smaller than the spatial scale of evaluating sound leakage (the difference is at least one order of magnitude), it can be considered that the intensity of the secondary sound source 401A' may be equivalent to that of the sound source 401A. For the external space, the sound cancellation effect produced by the secondary sound source 401A' and the sound source 401B may be equivalent to the sound cancellation effect produced by the sound source 401A and the sound source 401B. That is to say, a considerable sound leakage reduction effect may still be maintained under the quasi-cavity structure.

In a specific application scenario, the outer wall of the housing of the sound production component 11 may usually be a plane or a curved surface, while the contour of the cavity of auricular concha of the user may be an uneven structure. By extending part or the whole structure of the sound production component 11 into the cavity of auricular concha, the sound production component 11 and the contour of the cavity of auricular concha may form the quasi-cavity structure that communicates with the outside world. Further, the sound guiding hole may be arranged on the housing of the sound production component toward the opening of ear canal of the user and near the edge of the cavity of auricular concha, and the pressure relief hole may be arranged at the position where the sound production component 11 deviates from or is away from the opening of the ear canal, to construct the acoustic model shown in FIG. 4, so as to improve the listening volume at the opening of ear canal when wearing the open earphone, and reduce the far-field leakage effect.

Figure 5A:
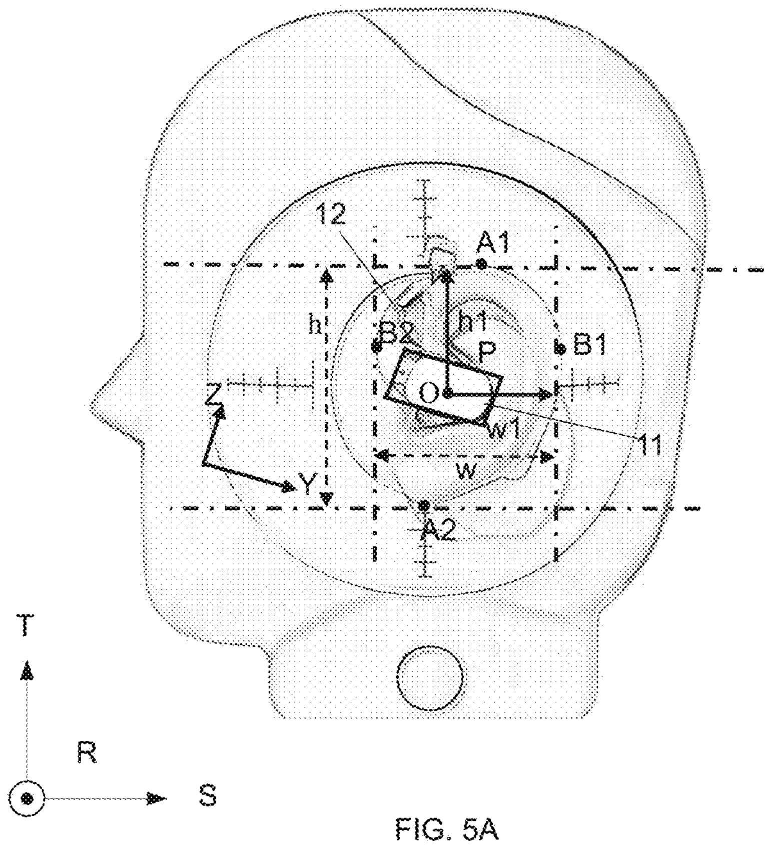
FIG. 5A is a schematic diagram illustrating exemplary wearing of an open earphone according to some embodiments of the present disclosure.
Figure 5B:
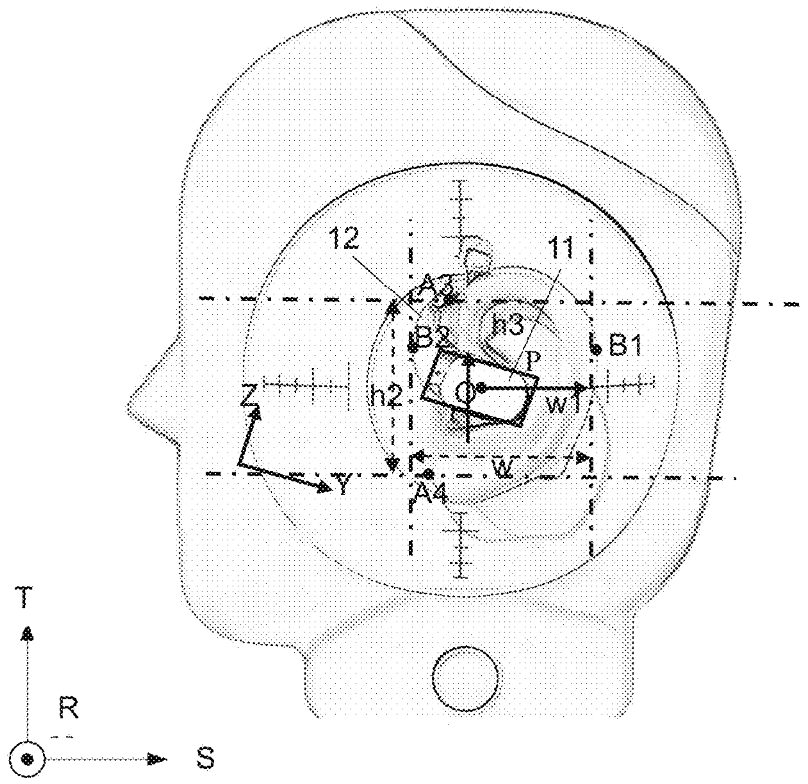
FIG. 5B is schematic diagram illustrating exemplary wearing of an open earphone according to some embodiments of the present disclosure.

FIG. 5A and FIG. 5B are schematic diagrams illustrating exemplary wearing of an open earphone according to some embodiments of the present disclosure.

In some embodiments, the sound production component of the open earphone may include a transducer and a housing for containing the transducer. The transducer may be an element capable of receiving an electrical signal and converting the electrical signal into a sound signal for output. In some embodiments, by frequency, transducer types may include low frequency (e.g., 30 Hz-150 Hz) loudspeakers, medium and low frequency (e.g., 150 Hz-500 Hz) loudspeakers, medium and high frequency (e.g., 500 Hz-5 kHz) loudspeakers, high frequency (e.g., kHz-16 kHz) loudspeakers, or full range (e.g., 30 Hz-16 kHz) loudspeakers, or any combination thereof. The low frequency, high frequency, etc. mentioned here may only represent an approximate range of the frequency, and in different application scenarios, there may be different division methods. For example, a frequency division point may be determined, the low frequency may represent a frequency range below the frequency division point, and the high frequency may represent a frequency range above the frequency division point. The frequency division point may be any value within an audible range of the human ear, e.g., 500 Hz, 600 Hz, 700 Hz, 800 Hz, 1000 Hz, or the like.

In some embodiments, the transducer may include a diaphragm. When the diaphragm vibrates, the sound may be emitted from front and rear sides of the diaphragm, respectively. In some embodiments, a front cavity (not shown) for sound transmission may be disposed at the front side of the diaphragm in the housing 120. The front cavity may be acoustically coupled with the sound guiding hole, and the sound from the front side of the diaphragm may be emitted from the sound guiding hole through the front cavity. A rear cavity (not shown) for sound transmission may be disposed at the rear side of the diaphragm in the housing 120. The rear cavity may be acoustically coupled with the pressure relief hole, and the sound from the rear side of the diaphragm may be emitted from the pressure relief hole through the rear cavity.

Referring to FIG. 3, an example of the suspension structure 12 is illustrated here with an ear hook. In some embodiments, the ear hook may include a first portion 121 and a second portion 122 connected in sequence, wherein the first portion may be hung between the rear outer side of the auricle of the user and the head of the user, the second portion may extend toward a front outer side (a side of the auricle away from the head along the coronal axis) of the auricle and connect the sound production component 11, and the sound production component may be located close to the ear canal but not block the opening of the ear canal. In some embodiments, the sound guiding hole may be disposed on the sidewall of the housing of the sound production component 11 toward the auricle, and the sound produced by the transducer may be exported out of the housing and transmitted to the opening of the ear canal of the user.

Referring to FIG. 3 and FIG. 5A, in some embodiments, when the user wears the open earphone 10, the sound production component 11 may have a first projection on a sagittal plane (i.e., a plane formed by a T-axis and an S-axis in FIG. 5A) along a coronal axis direction R. A shape of the sound production component 11 may be a regular or irregular three-dimensional shape. Correspondingly, the first projection of the sound production component 11 on the sagittal plane may be a regular or irregular shape. For example, when the shape of the sound production component 11 is a cuboid, a quasi-cuboid shape, or a cylinder, the first projection of the sound production component 11 on the sagittal plane may be a rectangle or a quasi-rectangle shape (e.g., a racetrack shape). Considering that the first projection of the sound production component 11 on the sagittal plane may be the irregular shape, for the convenience of describing the first projection, a rectangular region shown in a solid line box P may be delineated around the projection (i.e., the first projection) of the sound production component 11 in FIG. 5A and FIG. 5B, and a centroid O of the rectangular region showed by the solid line box P may be approximately regarded as the centroid of the first projection. It should be noted that the above description about the first projection and the centroid thereof is only an example, and the shape of the first projection is related to the shape of the sound production component 11 or the wearing condition relative to the ear. The auricle may have a second projection on the sagittal plane along the coronal axis direction R. In order to make the open earphone 10 in the wearing state, at least part of the structure of the sound production component 11 may extend into the cavity of auricular concha or cover the antihelix region. In some embodiments, a ratio of a distance h1 (also referred to as a first distance) between the centroid O of the first projection and a highest point of the second projection in a vertical axis direction (e.g., the T-axis direction in FIG. 5A) to a high h of the second projection in the vertical axis direction may be within a range of 0.25-0.6. A ratio of a distance w1 (also referred to as a second distance) between the centroid O of the first projection and an end point of the second projection in the sagittal axis direction (e.g., the S-axis direction in FIG. 5A) to a width w of the second projection in the sagittal axis direction may be within a range of 0.4-0.7. In some embodiments, the sound production component 11 and the suspension structure 12 may be two independent structures or an integrated structure. In order to describe the first projection region of the sound production component more clearly, a thickness direction X, a major axis direction Y, and a minor axis direction Z may be introduced according to a three-dimensional structure of the sound production component 11, wherein the major axis direction Y and the minor axis direction Z are perpendicular, and the thickness direction X may be perpendicular to a plane formed by the major axis direction Y and the minor axis direction Z. Merely by way of example, the confirmation process of the solid line box P may be as follows: two farthest points of the sound production component 1 in the major axis direction Y may be determined, and a first line segment and a second line segment parallel to the minor axis direction Z through these two farthest points may be drawn, respectively; two farthest points of the sound production component 11 in the minor axis direction Z may be determined, a third line segment and a fourth line segment parallel to the major axis direction Y through these two farthest points may be drawn, and the rectangular region of the solid line box P in FIG. 5A and FIG. 5B may be obtained by a region formed by the above line segments.

The highest point of the second projection may be understood as a point with a largest distance in the vertical axis direction relative to the projection of a certain point on the neck of the user on the sagittal plane among all the projection points, i.e., a projection of the highest point of the auricle (e.g., point A1 in FIG. 5A) on the sagittal plane may be the highest point of the second projection. A lowest point of the second projection may be understood as a point with a smallest distance in the vertical axis direction relative to the projection of a certain point of the neck of the user on the sagittal plane among all the projection points, i.e., a projection of the lowest point of the auricle (e.g., point A2 in FIG. 5A) on the sagittal plane may be the lowest point of the second projection. A height of the second projection in the vertical axis direction may be a difference (height h shown in FIG. 5A) between the point with the largest distance and the point with the smallest distance in the vertical axis direction and the smallest point of the projection relative to a projection of a certain point of the neck of the user on the sagittal plane among all the projection points in the second projection, i.e., the distance between point A1 and point A2 in the vertical axis direction T. The end point of the second projection may be understood as a point with the largest distance in the sagittal axis direction relative to the projection of the nose tip of the user on the sagittal plane among all the projection points, i.e., the projection of the end point of the auricle (e.g., point B1 in FIG. 5A) on the sagittal plane may be the end point of the second projection. The front end point of the second projection may be understood as a point with the smallest distance in the sagittal axis direction relative to the projection of the nose tip of the user on the sagittal plane among all projection points, i.e., the projection of the front end point of the auricle (e.g., point B2 shown in FIG. 5) on the sagittal plane may be the front end point of the second projection. The width of the second projection in the sagittal axis direction may be a difference (the width w shown in FIG. 5A) between the point with the largest distance and the point with the smallest distance along the sagittal axis direction relative to the projection of the nose tip on the sagittal plane among all projection points in the second projection, i.e., the distance between the point B1 and the point B2 in the sagittal axis direction S. It should be noted that the projections of structures such as the sound production component 11 or the auricle on the sagittal plane in the embodiments of the present disclosure refer to projections on the sagittal plane along the coronal axis direction R, which is not emphasized in the disclosure hereinafter.

In some embodiments, when the ratio of the distance h1 between the centroid O of the first projection and the highest point of the second projection in the vertical axis direction to the height h of the second projection in the vertical axis direction is within the range of 0.25-0.6, and the ratio of the distance w1 between the centroid O of the first projection and the end point of the second projection in the sagittal axis direction to the width w of the second projection in the sagittal axis direction is within the range of 0.4-0.7, the part or whole structure of the sound production component 11 may substantially cover the antihelix region of the user (e.g., the position in the triangular fossa, the upper anticrus of helix, the lower anticrus of helix, or the position of the antihelix, the position of the sound production component 11C relative to the ear shown in FIG. 2), or part or whole structure of the sound production component 11 may extend into the cavity of auricular concha (e.g., the position of the sound production component 11B relative to the ear shown in FIG. 2). In some embodiments, in order to make the whole or part structure of the sound production component 11 cover the antihelix region of the user (e.g., the position in the triangular fossa, the upper anticrus of helix, the lower anticrus of helix, or the position of the antihelix), as the position of the sound production component 11C relative to the ear shown in FIG. 2, the ratio of the distance h1 between the centroid of the first projection and the highest point of the second projection in the vertical axis direction to the height h of the second projection in the vertical axis direction may be within a range of 0.25-0.4; and the ratio of the distance w1 between the centroid O of the first projection and the end point of the second projection in the sagittal axis direction to the width w of the second projection may be within a range of 0.4-0.6. When the whole or part structure of the sound production component 11 covers the antihelix region of the user, the housing of the sound production component 11 may act as a baffle to increase a sound path difference from the sound guiding hole and the pressure relief hole to the opening of the ear canal, thereby increasing the sound intensity at the opening of the ear canal. Furthermore, in the wearing state, the sidewall of the sound production component 11 may be close to the antihelix region, and a concave-convex structure of the antihelix region may also act as a baffle, to increase a sound path of the transmission of the sound from the pressure relief hole to the opening of the ear canal, thereby increasing the sound path difference between the sound guiding hole and the pressure relief hole to the opening of the ear canal. In addition, when the whole or part of the sound production component 11 covers the antihelix region of the user, the sound production component 11 may not extend into the opening of ear canal of the user, which may ensure that the opening of ear canal remains fully open, thereby obtaining sound information in the external environment for the user, and improving the wearing comfort for the user. The specific description regarding the whole or part structure of the sound production component 11 substantially covering the antihelix region of the user may be found elsewhere in in the present disclosure.

In some embodiments, in order to make the whole or part of the structure of the sound production component 11 extend into the cavity of auricular concha, as the position of the sound production component 11B relative to the ear shown in FIG. 2, the ratio of the distance h1 between the centroid O of the first projection and the highest point of the second projection in the vertical axis direction to the height h of the second projection in the vertical axis direction may be within a range of 0.35-0.6, and the ratio of the distance w1 between the centroid O of the first projection and the end point of the second projection in the sagittal axis direction to the width w of the second projection in the sagittal axis direction may be within a range of 0.4-0.65. For the open earphone provided in the embodiments of the present disclosure, when the user wears the open earphone, the ratio of the distance h1 between the centroid O of the first projection and the highest point of the second projection in the vertical axis direction to the height h of the second projection in the vertical axis direction may be controlled to be within the range of 0.35-0.6, and the ratio of the distance w1 between the centroid of the first projection and the end point of the second projection in the sagittal axis direction to the width w of the second projection in the sagittal axis direction may be controlled to be with the range of 0.4-0.65, so that at least part of the sound production component 11 may extend into the cavity of auricular concha, and form the acoustic model shown in FIG. 4 with the cavity of auricular concha of the user, thereby improving the listening volume of the open earphone at the listening position (e.g., at the opening of the ear canal), especially the listening volume at the medium and low frequency, while maintaining a good effect of far-field sound leakage cancellation. When part or the whole of the sound production component 11 extends into the cavity of auricular concha, the sound guiding hole may be closer to the opening of the ear canal, which further increases the listening volume at the opening of the ear canal. In addition, the cavity of auricular concha may support and limit the sound production component 11 to a certain extent, thereby improving the stability of the open earphone in the wearing state.

It should also be noted that an area of the first projection of the sound production component 11 on the sagittal plane may be generally much smaller than an area of a projection of the auricle on the sagittal plane, to ensure that the opening of ear canal of the user may not be blocked when the user wears the open earphone 10, and the load on the user when wearing the open earphone may be reduced, which is convenient for the user to carry daily. On this premise, in the wearing state, when ratio of the distance h1 between the centroid O of the projection (the first projection) of the sound production component 11 on the sagittal plane and the projection (the highest point of the second projection) of the highest point A1 of the auricle on the sagittal plane in the vertical axis direction to the height h of the second projection in the vertical axis direction is too small or too large, part of the structure of the sound production component 11 may be located above the top of the auricle or at the earlobe of the user, which may be impossible to use the auricle to sufficiently support and limit the sound production component 11, and there may be a problem that the wearing is unstable and easy to fall off. On the other hand, it may also cause the sound guiding hole set on the sound production component 11 to be away from the opening of the ear canal, affecting the listening volume at the opening of the ear canal of the user. In order to ensure that the open earphone does not block the opening of the ear canal of the user and ensure the stability and comfort of the user wearing the open earphone and a good listening effect, in some embodiments, the ratio of the distance h1 between the centroid O of the first projection and the highest point A1 of the second projection in the vertical axis direction to the height h of the second projection in the vertical axis direction may be controlled to be within a range of 0.35-0.6, so that when part or the whole structure of the sound production component extends into the cavity of auricular concha, the force exerted by the cavity of auricular concha on the sound production component 11 may support and limit the sound production component 11 to a certain extent, thereby improving the wearing stability and comfort of the open earphone. Meanwhile, the sound generating part 11 may also form the acoustic model shown in FIG. 4 with the cavity of auricular concha, to ensure the listening volume of the user at the listening position (e.g., the opening of the ear canal) and reduce the far-field leakage volume. Preferably, the ratio of the distance h1 between the centroid O of the first projection and the highest point A1 of the second projection in the vertical axis direction to the height h of the second projection in the vertical axis direction may be controlled to be within a range of 0.35-0.55. More preferably, the ratio of the distance h1 between the centroid O of the first projection and the highest point of the second projection in the vertical axis direction to the height h of the second projection in the vertical axis direction may be controlled to be within a range of 0.4-0.5.

Similarly, when the ratio of the distance w1 between the centroid O of the first projection and the end point of the second projection in the sagittal axis direction to the width w of the second projection in the sagittal axis direction is too large or too small, the part of whole structure of the sound production component 11 may be located in a facial region on the front side of the ear, or extend out of the outer contour of the auricle, which may also cause the problem that the sound production component 11 cannot construct the acoustic model in FIG. 4 with the cavity of auricular concha, and also lead to unstable wearing of the open earphone 10. According to the open earphone provided in the embodiments of the present disclosure, the ratio of the distance w1 between the centroid O of the first projection and the end point of the second projection in the sagittal axis direction to the width w of the second projection in the sagittal axis direction may be controlled to be within a range of 0.4-0.7, thereby improving the wearing stability and comfort of the open earphone while ensuring the acoustic output effect of the sound production component. Preferably, the ratio of the distance w1 between the centroid O of the first projection and the end point of the second projection in the sagittal axis direction to the width w of the second projection in the sagittal axis direction may be controlled to be within a range of 0.45-0.68. More preferably, the ratio of the distance w1 between the centroid O of the first projection and the end point of the second projection in the sagittal axis direction to the width w of the second projection in the sagittal axis direction may be controlled to be within a range of 0.5-0.6.

For example, the height h of the second projection in the vertical axis direction may be within a range of 55 mm-65 mm. In the wearing state, if the distance h1 between the centroid O of the first projection and the highest point of the second projection in the vertical axis direction is less than 15 mm or greater than 50 mm, the sound production component 11 may be located away from the cavity of auricular concha, which not only fails to construct the acoustic model in FIG. 4, but also has the problem of unstable wearing. Therefore, in order to ensure the acoustic output effect of the sound production component and the wearing stability of the open earphone, the distance h1 between the centroid O of the first projection and the highest point of the second projection in the vertical axis direction may be controlled to be within a range of 15 mm-50 mm. Similarly, in some embodiments, the width of the second projection in the sagittal axis direction may be within a range of 40 mm-55 mm. When the distance between the centroid O of the first projection and the end point of the second projection in the sagittal axis direction is greater than 45 mm or less than 15 mm, the sound production component 11 may be too forward or too backward relative to the ear of the user, causing that the sound production component 11 may not construct the acoustic model in FIG. 4 and the unstable wearing of the open earphone 10. Therefore, in order to ensure the acoustic output effect of the sound production component 11 and the wearing stability of the open earphone, the distance between the centroid O of the first projection and the end point of the second projection in the sagittal axis direction may be controlled to be within a range of 15 mm-45 mm.

Figure 6:
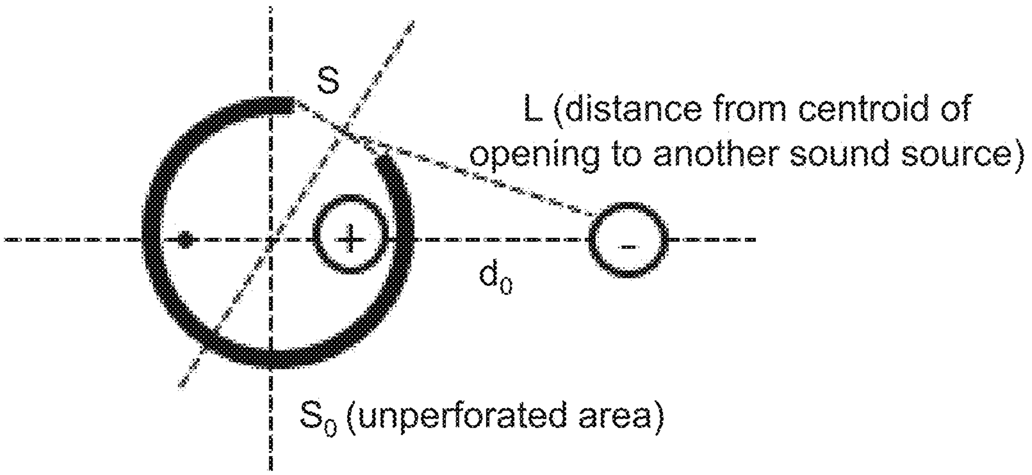
FIG. 6 is a schematic diagram illustrating a quasi-cavity structure according to some embodiments of the present disclosure.
Figure 7:
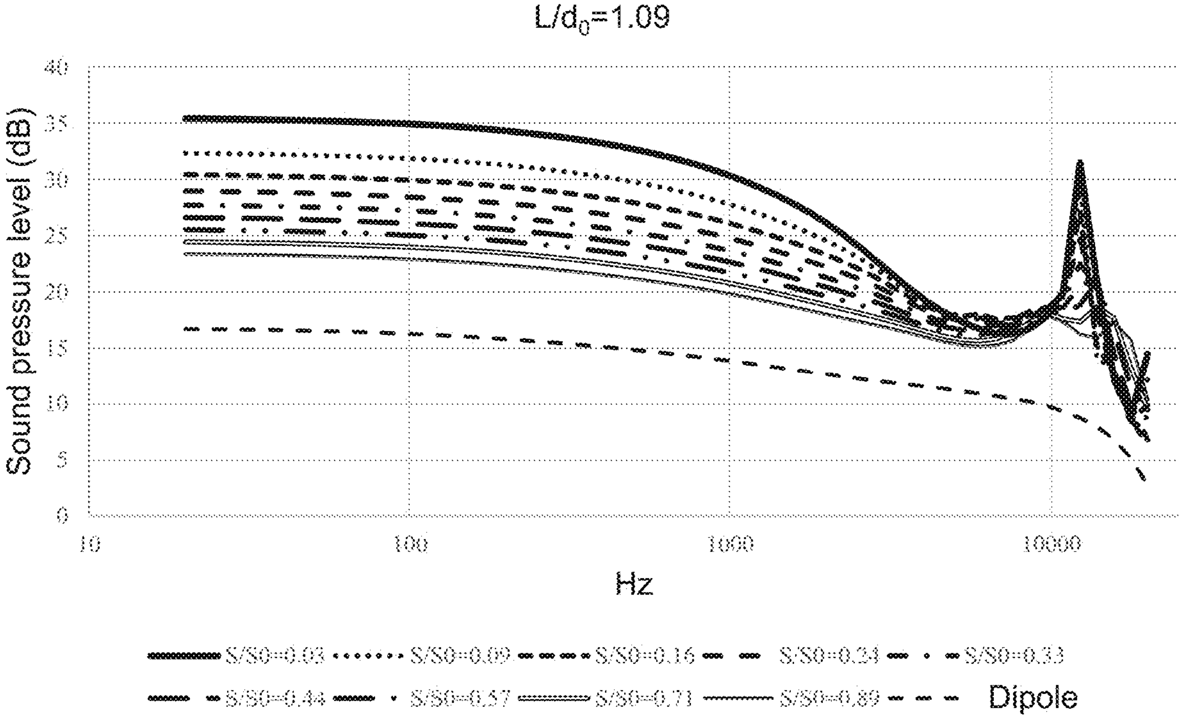
FIG. 7 is a graph illustrating listening indices of quasi-cavity structures with leakage structures of different sizes according to some embodiments of the present disclosure.

As mentioned above, when the user wears the open earphone 10, at least part of the sound production component 11 may extend into the cavity of auricular concha of the user to form the acoustic model in FIG. 4. The outer wall surface of the housing of the sound production component 11 may usually be the plane or the curved surface, and the contour of the cavity of auricular concha of the user may be the uneven structure. When the part of whole structure of the sound production component 11 extends into the cavity of auricular concha, a gap may be formed as the sound production component 11 cannot be closely fit with the cavity of auricular concha. The gap may correspond to the leakage structure 403 in FIG. 4. FIG. 6 is a schematic diagram illustrating a quasi-cavity structure according to some embodiments of the present disclosure. FIG. 7 is a graph illustrating listening indices of quasi-cavity structures with leaking structures of different sizes according to some embodiments of the present disclosure. As shown in FIG. 6, an opening area of the leakage structure on the quasi-cavity structure may be represented as S, and an area of the quasi-cavity structure directly affected by a contained sound source (e.g., "+" shown in FIG. 6) may be represented as S0. The "directly affected" here means that the sound emitted by the contained sound source may directly acoustically act on a wall of the quasi-cavity structure without passing through the leakage structure. A distance between two sound sources is d0, and a distance from a center of an opening shape of the leakage structure to another sound source (e.g., "−" in FIG. 6) is L. As shown in FIG. 7, keeping L/d0=1.09 constant, the larger the relative opening size S/S0, the smaller the listening index. This is because the larger the relative opening, the more sound components that the contained sound source radiates directly outward, and the less sound reaching the listening position, causing the listening volume to decrease with the increase of the relative opening, which in turn leads the decrease of the listening index. It may be inferred that the larger the opening, the lower the listening volume at the listening position.

In some embodiments, considering that the relative position of the sound production component 11 and the ear canal of the user (e.g., the cavity of auricular concha) may affect a size of the gap formed between the sound production component 11 and the cavity of auricular concha, e.g., when the end FE of the sound production component 11 abuts against the cavity of auricular concha, the size of the gap may be relatively small, and when the end FE of the sound production component 11 does not abut against the cavity of the auricular concha, the size of the gap may be relatively large. The gap formed between the sound production component 11 and the cavity of auricular concha may be referred to as the leakage structure in the acoustic model in FIG. 4. The relative position of the sound production component 11 and the ear canal of the user (e.g., the cavity of auricular concha) may affect a count of the leakage structure of the quasi-cavity structure formed by the sound production component 11 and the cavity of auricular concha and the opening size of the leakage structure, and the opening size of the leakage structure may directly affect the listening quality. Specifically, the larger the opening of the leakage structure, the more sound components that the sound production component 11 radiate directly outward, and the less sound reaching the listening position. Accordingly, in order to consider the listening volume of the sound production component 11 and the sound leakage reduction effect to ensure the acoustic output quality of the sound production component 11, the sound production component 11 may be fit as closely as possible to the cavity of auricular concha of the user. Correspondingly, the ratio of the distance h1 between the centroid O of the first projection and the highest point of the second projection in the vertical axis direction to the height h of the second projection in the vertical axis direction may be controlled to be within a range of 0.35-0.6, while the ratio of the distance w1 between the centroid O of the first projection and the end point of the second projection in the sagittal axis direction to the width w of the second projection in the sagittal axis direction may be controlled to be within a range of 0.4-0.65. Preferably, in some embodiments, in order to improve the wearing comfort of the open earphone while ensuring the acoustic output quality of the sound production component 11, the ratio of the distance h1 between the centroid O of the first projection and the highest point of the second projection in the vertical axis direction to the height h of the second projection in the vertical axis direction may be within a range of 0.35-0.55, and the ratio of the distance w1 between the centroid O of the first projection and the end point of the second projection in the sagittal axis direction to the width w of the second projection in the sagittal axis direction may be within a range of 0.45-0.68. More preferably, the ratio of the distance h1 between the centroid O of the first projection and the highest point of the second projection in the vertical axis direction to the height h of the second projection in the vertical axis direction may be within a range of 0.35-0.5, and the ratio of the distance w1 between the centroid O of the first projection and the end point of the second projection in the sagittal axis direction to the width w of the second projection in the sagittal axis direction may be within a range of 0.48-0.6.

In some embodiments, considering that there may be certain differences in the shape and size of the ears of different users, the ratio range may fluctuate within a certain range. For example, when the earlobe of the user is long, the height h of the second projection in the vertical axis direction may be larger than that of the general situation. At this time, when the user wears the open earphone 100, the ratio of the distance h1 between the centroid O of the first projection and the highest point of the second projection in the vertical axis direction to the height h of the second projection in the vertical axis direction may be smaller, e.g., which may be within a range of 0.2-0.55. Similarly, in some embodiments, when the helix of the user is bent forward, the width w of the second projection in the sagittal axis direction be smaller than that of the general situation, and the distance w1 between the centroid O of the first projection and the end point of the second projection in the sagittal axis direction may also be relatively small. At this time, when the user wears the open earphone 100, the ratio of the distance w1 between the centroid O of the first projection and the end point of the second projection in the sagittal axis direction to the width w of the second projection in the sagittal axis direction may be larger, e.g., which may be within a range of 0.4-0.75.

The ears of different users are different. For example, some users have longer earlobes. At this time, it may have an effect if the open earphone 10 is defined using the ratio of the distance (the seventh distance) between the centroid O of the first projection and the highest point of the second projection to the height of the second projection on the vertical axis. As shown in FIG. 5B, a highest point A3 and a lowest point A4 of a connection region between the auricle of the user and the head of the user may be selected for illustration. The highest point of the connection part between the auricle and the head may be understood as a position where the projection of the connection region of the auricle and the head on the sagittal plane has a largest distance from a projection of a specific point on the neck on the sagittal plane. The lowest point of the connection part between the auricle and the head may be understood as a position where the projection of the connection region of the auricle and the head on the sagittal plane has a smallest distance from a projection of a specific point on the neck on the sagittal plane. In order to consider the listening volume of the sound production component 11 and the sound leakage reduction effect to ensure the acoustic output quality of the sound production component 11, the sound production component 11 may be fit as closely as possible to the cavity of auricular concha of the user. Correspondingly, a ratio of a distance h3 between the centroid O of the first projection and a highest point of a projection of the connection region of the auricle and the head on the sagittal plane in the vertical axis direction to a height h2 between a highest point and a lowest point of the projection of the connection region of the auricle and the head on the sagittal plane in the vertical axis direction may be controlled to be within a range of 0.4-0.65. Meanwhile, the ratio of the distance w1 between the centroid O of the first projection and the end point of the second projection in the sagittal axis direction to the width w of the second projection in the sagittal axis direction may be controlled to be within a range of 0.4-0.65. Preferably, in some embodiments, in order to improve the wearing comfort of the open earphone while ensuring the acoustic output quality of the sound production component 11, the ratio of the distance h3 between the centroid O of the first projection and the highest point of the projection of the connection region of the auricle and the head on the sagittal plane in the vertical axis direction to the height h2 between the highest point and the lowest point of the projection of the connection region of the auricle and the head on the sagittal plane in the vertical axis direction may be controlled to be within a range of 0.45-0.6, and the ratio of the distance w1 between the centroid O of the first projection and the end point of the second projection in the sagittal axis direction to the width w of the second projection in the sagittal axis direction may be within a range of 0.45-0.68. More preferably, the ratio of the distance h3 between the centroid O of the first projection and the highest point of the projection of the connection region of the auricle and the head on the sagittal plane in the vertical axis direction to the height h2 between the highest point and the lowest point of the projection of the connection region of the auricle and the head on the sagittal plane in the vertical axis direction may be within a range of 0.5-0.6, and the ratio of the distance w1 between the centroid O of the first projection and the end point of the second projection in the sagittal axis direction to the width w of the second projection in the sagittal axis direction may be within a range of 0.48-0.6.

Figure 8:
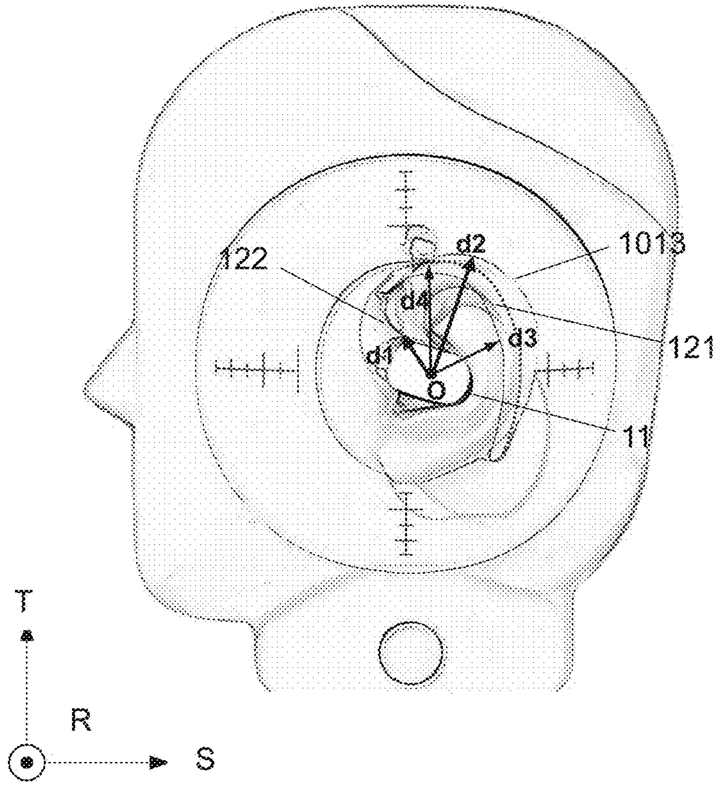
FIG. 8 is a schematic diagram of exemplary wearing of an open earphone according to some embodiments of the present disclosure.

FIG. 8 is a schematic diagram illustrating exemplary wearing of an open earphone according to other embodiments of the present disclosure.

Referring to FIG. 3 and FIG. 8, when the user wears the open earphone 10 and the sound production component 11 extends into the cavity of auricular concha, the centroid O of the first projection may be located in a region enclosed by a contour of the second projection, wherein the contour of the second projection may be understood as a projection of an outer contour of the helix of the user, an earlobe contour, a tragus contour, an intertragic notch, an antitragus apex, a notch between the antitragus and the anthelix, etc. on the sagittal plane. In some embodiments, the listening volume of the sound production component, the sound leakage reduction effect, and the wearing comfort and stability may be improved by adjusting a distance between the centroid O of the first projection and the contour of the second projection. For example, when the sound production component 11 is located at the top of the auricle, the earlobe, the facial region on the front side of the auricle, or between the inner contour 1014 of the auricle and the outer edge of the cavity of auricular concha, it may be specifically embodied as that a distance between the centroid O of the first projection and a point of a certain region of the contour of the second projection is too small, and a distance between the centroid O of the first projection and a point of another region of the contour of the second projection is too large, and the sound production component may not form a quasi-cavity structure (acoustic model in FIG. 4) with the cavity of auricular concha, affecting the acoustic output effect of the open earphone 10. In order to ensure the acoustic output quality when the user wears the open earphone 10, in some embodiments, the distance between the centroid O of the first projection and the contour of the second projection may be within a range of 10 mm-52 mm, i.e., the distance between the centroid O of the first projection and any point of the contour of the second projection may be within a range of 10 mm-52 mm. Preferably, in order to further improve the wearing comfort of the open earphone 10 and optimize the quasi-cavity structure formed by the sound production component 11 and the cavity of auricular concha, the distance between the centroid O of the first projection and the contour of the second projection may be within a range of 12 mm-50.5 mm. More preferably, the distance between the centroid O of the first projection and the contour of the second projection may also be within a range of 13.5 mm-50.5 mm. In some embodiments, by controlling the distance between the centroid O of the first projection and the contour of the second projection to be within a range of 10 mm-52 mm, most of the sound production component 11 may be located near the ear canal of the user, and at least part of the sound production component may extend into the cavity of auricular concha of the user to form the acoustic model in FIG. 4, thereby ensuring that the sound output by the sound production component 11 may be better transmitted to the user. For example, in some embodiments, a minimum distance d1 between the centroid O of the first projection and the contour of the second projection may be 20 mm, and a maximum distance d2 between the centroid O of the first projection and the contour of the second projection may be 48.5 mm.

In some embodiments, considering that when the user wears the open earphone 10, if a distance between the centroid O of the first projection and a projection of the first portion 121 of the ear hook on the sagittal plane is too large, it may cause unstable wearing (at this time, an effective clamping of the ear may not be formed between the sound production component 11 and the ear hook), and the problem that the sound production component 11 may not effectively extend into the cavity of auricular concha. If the distance is too small, it may affect the relative position of the sound production component to the cavity of auricular concha of the user and the opening of the ear canal, and may also cause the sound production component 11 or the ear hook to press the ear, resulting in poor wearing comfort. Accordingly, in order to avoid the problems, in some embodiments, the distance between the centroid O of the first projection and the projection of the first portion 121 of the ear hook on the sagittal plane may be within a range of 18 mm-43 mm. By controlling the distance to be within the range of 18 mm-43 mm, the ear hook may fit the ear of the user better, and the sound production component 11 may be ensured to be just located at the cavity of auricular concha of the user, and the acoustic model in FIG. 4 may be formed, thereby ensuring that the sound output by the sound production component 11 may be better transmitted to the user. Preferably, in order to further improve the wearing stability of the open earphone and ensure the listening effect of the sound production component 11 at the opening of the ear canal, in some embodiments, the distance between the centroid O of the first projection and the projection of the first portion 121 of the ear hook on the sagittal plane may be within a range of 20 mm-41 mm. More preferably, the distance between the centroid O of the first projection and the projection of the first portion 121 of the ear hook on the sagittal plane may be within a range of 22 mm-40.5 mm. For example, a minimum distance d3 between the centroid O of the first projection and the projection of the first portion 121 of the ear hook on the sagittal plane may be 21 mm, and a maximum distance d4 between the centroid O of the first projection on the sagittal plane of the user and the projection of the first portion 121 of the ear hook on the sagittal plane may be 41.2 mm.

In some embodiments, due to the elasticity of the ear hook, the distance between the sound production component 11 and the ear hook may vary (usually the distance in the non-wearing state may be smaller than that in the wearing state) in the wearing state and the non-wearing state. For example, in some embodiments, when the open earphone 10 is not worn, a distance between a centroid of a projection of the sound production component 11 on a specific reference plane and a centroid of a projection of the first portion 121 of the ear hook on the specific reference plane may be within a range of 15 mm-38 mm. Preferably, when the open earphone 100 is not worn, the distance between the centroid of the projection of the sound production component 11 on the specific reference plane and the centroid of the projection of the first portion 121 of the ear hook on the specific reference plane may be within a range of 16 mm-36 mm. In some embodiments, the distance between the centroid of the projection of the sound production component on the specific reference plane and the centroid of the projection of the first portion 121 of the ear hook on the specific reference plane may be slightly smaller in the non-wearing state than in the wearing state, so that when the open earphone 100 is in the wearing state, the ear hook may generate a certain clamping force on the ear of the user, thereby improving the wearing stability for the user without affecting the wearing experience of the user. In some embodiments, the specific reference plane may be the sagittal plane. At this time, in the non-wearing state, the centroid of the projection of the sound production component on the sagittal plane may be compared to the centroid of the projection of the sound production component on the specific reference plane. For example, the non-wearing state may be represented by removing the auricle structure from the human head model, and fixing the sound production component on the human head model in the same posture as the wearing state by using a fixing component or adhesive. In some embodiments, the specific reference plane may be an ear hook plane. An ear hook structure may be an arc structure. The ear hook plane may be a plane formed by three most protruding points on the ear hook, i.e., the plane that supports the ear hook when the ear hook is placed freely (i.e., not subject to external force). For example, when the ear hook is freely placed on a horizontal plane, the horizontal plane may support the ear hook, and the horizontal plane may be regarded as the ear hook plane. In other embodiments, the ear hook plane also refers to a plane formed by a bisector that bisects or roughly bisects the ear hook along a length extension direction of the ear hook. In the wearing state, although the ear hook plane has a certain angle relative to the sagittal plane, the ear hook may be approximately regarded as fitting the head at this time, and thus the angle is very small. For the convenience of calculation and description, it may also be possible to use the ear hook plane as the specific reference plane instead of the sagittal plane.

Figure 9:
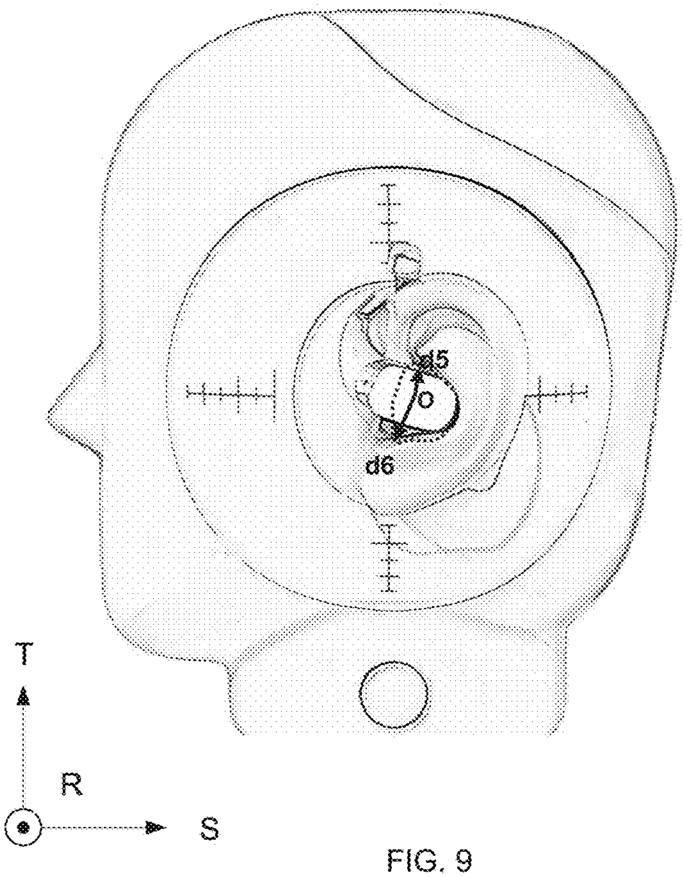
FIG. 9 is a schematic diagram of an open earphone according to some embodiments of the present disclosure.

FIG. 9 is a schematic diagram illustrating exemplary wearing of an open earphone according to other embodiments of the present disclosure.

Referring to FIG. 9, in some embodiments, the projection of the sound production component on the sagittal plane may overlap with the projection of the cavity of auricular concha of the user (e.g., the dotted line in FIG. 9) on the sagittal plane, i.e., when the user wears the open earphone, part or the whole of the sound production component may cover the cavity of auricular concha, and when the open earphone is in the wearing state, the centroid of the first projection (e.g., point 0 in FIG. 9) may be located in a projection region of the cavity of auricular concha of the user on the sagittal plane. The position of the centroid O of the first projection may be related to a size of the sound production component. For example, if the size of the sound production component 11 in major axis direction Y or the minor axis direction Z is too small, a volume of the sound production component 11 may be relatively small, thus an area of the internally arranged diaphragm may also be relatively small, resulting in low efficiency of the diaphragm pushing the air inside the housing of the sound production component 11 to produce sound, which may affect the acoustic output effect of the open earphone. When the size of the sound production component 11 in major axis direction Y or the minor axis direction Z is too large, the sound production component 11 may exceed the range of the cavity of auricular concha, and may not extend into the cavity of auricular concha or form the quasi-cavity structure, or a total size of the gap formed between the sound production component 11 and the cavity of auricular concha may be very large, affecting the listening volume at the opening of the ear canal when the user wears the open earphone 10 and the far-field sound leakage effect. In some embodiments, in order to enable the user to have better acoustic output quality when wearing the open earphone 10, a distance between the centroid O of the first projection and a projection of an edge of the cavity of auricular concha of the user on the sagittal plane may be within a range of 4 mm-25 mm. Preferably, the distance between the centroid of the first projection and the projection of the edge of the cavity of auricular concha of the user on the sagittal plane may be within a range of 6 mm-20 mm. More preferably, the distance between the centroid of the first projection and the projection of the edge of the cavity of auricular concha of the user on the sagittal plane may be within a range of 10 mm-18 mm. For example, in some embodiments, a minimum distance d5 between the centroid of the first projection and the projection of the edge of the cavity of auricular concha of the user on the sagittal plane may be mm, and a maximum distance d6 between the centroid of the first projection and the projection of the edge of the cavity of auricular concha of the user on the sagittal plane may be 24.5 mm. In some embodiments, by controlling the distance between the centroid of the first projection and the projection of the edge of the cavity of auricular concha of the user on the sagittal plane to be within the range of 4 mm-25 mm, at least part of the structure of the sound production component 11 may cover the cavity of auricular concha to form a quasi-cavity acoustic model with the cavity of auricular concha. Therefore, the sound output by the sound production component may be better transmitted to the user, and the wearing stability of the open earphone 100 may be improved by the force exerted by the cavity of auricular concha on the sound production component 11.

It should be noted that the positional relationship between the sound production component 11 and the auricle or the cavity of auricular concha in the embodiments of the present may be determined by the following exemplary method. First, at a specific position, a picture of a human head model with ears may be taken in the direction facing the sagittal plane, the edge of the cavity of auricular concha and the contour of the auricle (e.g., inner and outer contours) may be marked, which may be viewed as the projection contours of various structures of the ear on the sagittal plane; then at the specific position, a picture of the open earphone worn on the human head model may be taken at the same angle, and the contour of the sound production component may be marked, which may be regarded as the projection of the sound production component on the sagittal plane, and the positional relationship between the sound production component (e.g., centroid, end, etc.) and the edge of the cavity of auricular concha and the auricle may be determined through comparative analysis.

Figure 10A:
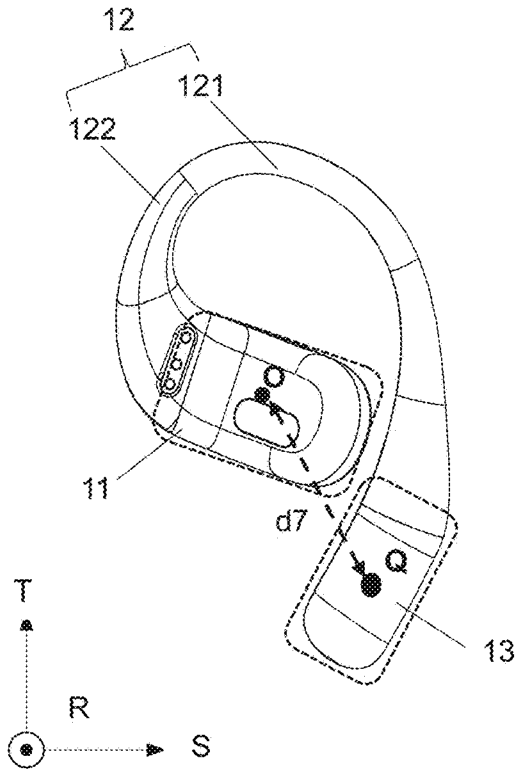
FIG. 10A is a schematic diagram illustrating an exemplary structure of an open earphone according to some embodiments of the present disclosure.
Figure 10B:
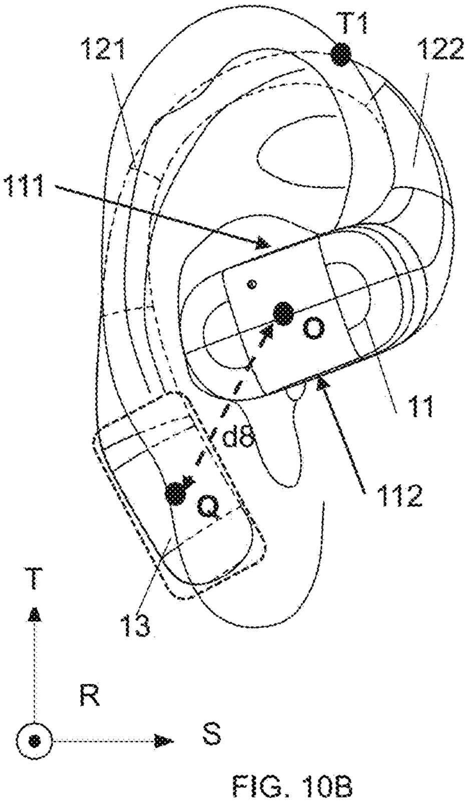
FIG. 10B is a schematic diagram illustrating a user wearing an open earphone according to some embodiments of the present disclosure.

FIG. 10A is a schematic diagram illustrating an exemplary structure of an open earphone according to some embodiments of the present disclosure. FIG. 10B is a schematic diagram illustrating a user wearing an open earphone according to some embodiments of the present disclosure. As shown in FIG. 10A and FIG. 10B, the open earphone 10 may include a suspension structure 12, a sound production component 11, and a battery compartment 13, wherein the sound production component 11 and the battery compartment 13 may be respectively located at two ends of the suspension structure 12. In some embodiments, the suspension structure 12 may be the ear hook in FIG. 10A or FIG. 10B. The ear hook may include a first portion 121 and a second portion 122 connected in sequence. The first portion 121 may be hung between a rear inner side of the auricle of the user and the head of the user, and extends toward the neck along the rear inner side of the auricle. The second portion 122 may extend to a front outer side of the auricle and connect the sound production component 11, and the sound production component 11 may be located close to the ear canal but not block the opening of the ear canal. An end of the first portion 121 away from the sound production component 11 may be connected to the battery compartment 13, and a battery electrically connected to the sound production component 11 may be arranged in the battery compartment 3. In some embodiments, the ear hook may be an arc structure adapted to a connection part between the auricle and the head. When the user wears the open earphone 10, the sound production component 11 and the battery compartment 13 may be respectively located on the front outer side and the rear inner side of the auricle. The sound production component 11 may extend toward the first portion 121 of the ear hook, and the whole or part of the structure of the sound production component 11 may extend into the cavity of auricular concha, and cooperate with the cavity of auricular concha to form a quasi-cavity structure. When a size (length) of the first portion 121 in an extension direction of the first portion 121 is too small, the battery compartment 13 may be near the top of the auricle of the user, then the first portion 121 and the second portion 122 may not provide sufficient contact area to the ear or the head for the open earphone 10, causing the open earphone 10 to fall off easily from the ear. Therefore, a length of the first portion 121 of the ear hook may be long enough to ensure that the ear hook may provide sufficient contact area to the ear or the head, thereby increasing the resistance of open earphone to falling off from the human ear or the head. In addition, when the distance between the end of the sound production component 11 and the first portion 121 of the ear hook is too large, the battery compartment 13 may be away from the auricle in the wearing state, which may not provide sufficient clamping force for the open earphone, and the open earphone may be liable to fall off. When the distance between the end of the sound production component 11 and the first portion 121 of the ear hook is too small, the battery compartment 13 or the sound production component 11 may squeeze the auricle, which may affect the wearing comfort when user wears the open earphone for a long time. Taking the user wearing the open earphone as an example, the length of the first portion 121 of the ear hook in the extension direction and a distance between the end of the sound production component 11 and the first portion 121 may be represented by a distance between the centroid O of the projection (i.e., the first projection) of the sound production component 11 on the sagittal plane and the centroid Q of the projection of the battery compartment 13 on the sagittal plane. In order to ensure that the ear hook may provide a large enough contact area to the ear or the head, the distance of the centroid Q of the projection of the battery compartment 13 on the sagittal plane relative to the horizontal plane (e.g., the ground plane) may be smaller than a distance of the centroid O of the projection of the sound production component 11 on the sagittal plane relative to the horizontal plane, i.e., in the wearing state, the centroid Q of the projection of the battery compartment 13 on the sagittal plane may be located below the centroid O of the projection of the sound production component 11 on the sagittal plane. In the wearing state, the part or whole position of the sound production component 11 may extend into the cavity of auricular concha, and the position of the sound production component 11 may be relatively fixed. If the distance between the centroid O of the projection of the sound production component 11 on the sagittal plane and the centroid Q of the projection of the battery compartment 13 on the sagittal plane is too small, the battery compartment 13 may be tightly attached to or even press against the rear inner side of the auricle, which may affect the wearing comfort of the user. If the distance between the centroid O of the projection of the sound production component 11 on the sagittal plane and the centroid Q of the projection of the battery compartment 13 on the sagittal plane is too large, the length of the first portion 121 of the ear hook may also be relatively long, causing the user to clearly feel that the part of earphone located on the rear inner side of the auricle is heavy or the position of the battery compartment 13 relative to the auricle is far away when wearing the open earphone, the earphone being prone to fall off during exercise of the user, thereby affecting the wearing comfort of the user and the wearing stability of the open earphone. In order to make the user have better stability and comfort when wearing the open earphone 10, in the wearing state, a fourth distance d8 between the centroid O of the projection of the sound production component 11 on the sagittal plane and the centroid Q of the projection of the battery compartment 13 on the sagittal plane may be within a range of 20 mm-30 mm. Preferably, the fourth distance d8 between the centroid O of the projection of the sound production component 11 on the sagittal plane and the centroid Q of the projection of the battery compartment 13 on the sagittal plane may be within a range of 22 mm-28 mm. More preferably, the fourth distance d8 between the centroid O of the projection of the sound production component 11 on the sagittal plane and the centroid Q of the projection of the battery compartment 13 on the sagittal plane may be within a range of 23 mm-26 mm. Due to the elasticity of the ear hook, the distance between the centroid O of the projection of the sound production component 11 on the sagittal plane and the centroid Q of the projection of the battery compartment 13 on the sagittal plane may vary in the wearing state and the non-wearing state of the open earphone. In some embodiments, in the non-wearing state, a third distance d7 between the centroid of the projection of the sound production component 11 on a specific reference plane and the centroid of the projection of the battery compartment 13 on the specific reference plane may be within a range of 16.7 mm-25 mm. Preferably, in the non-wearing state, the third distance d7 between the centroid of the projection of the sound production component 11 on the specific reference plane and the centroid of the projection of the battery compartment 13 on the specific reference plane may be within a range of 18 mm-23 mm. More preferably, in the non-wearing state, the third distance d7 between the centroid of the projection of the sound production component 11 on the specific reference plane and the centroid of the projection of the battery compartment 13 on the specific reference plane may be within a range of 19.6 mm-21.8 mm. In some embodiments, the specific reference plane may be the sagittal plane of the human body or the ear hook plane. In some embodiments, the specific reference plane may be the sagittal plane. At this time, in the non-wearing state, the centroid of the projection of the sound production component on the sagittal plane may be compared to the centroid of the projection of the sound production component on the specific reference plane, and the centroid of the projection of the battery compartment on the sagittal plane may be compared to the centroid of the projection of the battery compartment on the specific reference plane. For example, the non-wearing state may be represented by removing the auricle structure from the human head model, and fixing the sound production component on the human head model in the same posture as the wearing state using a fixing component or adhesive. In some embodiments, the specific reference plane may be the ear hook plane. The ear hook structure may be an arc structure. The ear hook plane may be a plane formed by three most protruding points on the ear hook, i.e., the plane that supports the ear hook when the ear hook is placed freely. For example, when the ear hook is placed on a horizontal plane, the horizontal plane may support the ear hook, and the horizontal plane may be regarded as the ear hook plane. In other embodiments, the ear hook plane also refers to a plane formed by a bisector that bisects or roughly bisects the ear hook along a length extension direction of the ear hook. In the wearing state, although the ear hook plane has a certain angle relative to the sagittal plane, the ear hook may be approximately regarded as fitting the head at this time, and thus the angle may be very small. For the convenience of calculation and description, it may also be possible to use the ear hook plane as the specific reference plane instead of the sagittal plane.

Taking the specific reference plane as the sagittal plane as an example, the distance between the centroid O of the projection of the sound production component 11 on the sagittal plane and the centroid Q of the projection of the battery compartment 13 on the sagittal plane may vary in the wearing state and the non-wearing state of the open earphone 10. A variation value may reflect a softness of the ear hook. When the softness of the ear hook is too large, the overall structure and shape of the open earphone 10 may be unstable, and may not provide strong support for the sound production component 11 and the battery compartment 13, the wearing stability may also poor, and the open earphone may be liable to fall off. Considering that the ear hook may be hung at the connection part between the auricle and the head, when the softness of the ear hook is too small, the open earphone 10 may not be liable to deform. When the user wears the open earphone, the ear hook may closely fit or even pressure against a region between the ears or the head, affecting wearing comfort. In order to make the user have better stability and comfort when wearing the open earphone 10, in some embodiments, a ratio of a variation value of the distance between the centroid O of the projection of the sound production component 11 on the sagittal plane and the centroid Q of the projection of the battery compartment 13 on the sagittal plane in the wearing state and the non-wearing state of the open earphone 10 to the distance between the centroid O of the projection of the sound production component 11 on the sagittal plane and the centroid Q of the projection of the battery compartment 13 on the sagittal plane in the non-wearing state of the open earphone may be within a range of 0.3-0.8. Preferably, the ratio of the variation value of the distance between the centroid O of the projection of the sound production component 11 on the sagittal plane and the centroid Q of the projection of the battery compartment 13 on the sagittal plane in the wearing state and the non-wearing state of the open earphone 10 to the distance between the centroid O of the projection of the sound production component 11 on the sagittal plane and the centroid Q of the projection of the battery compartment 13 on the sagittal plane in the non-wearing state of the open earphone may be within a range of 0.45-0.68.

It should be noted that, the shape and the centroid Q of the projection of the battery compartment 13 on the sagittal plane may be found in the relevant descriptions on the shape and the centroid O of the projection of the sound production component 11 on the sagittal plane in the present disclosure. In addition, the battery compartment 13 and the first portion 121 of the ear hook may be mutually independent structures. The battery compartment 13 and the first portion 121 of the ear hook may be connected in an inserting mode, a clamping mode, etc. The projection of the battery compartment 13 on the sagittal plane may be obtained more accurately by using a splicing point or a splicing line between the battery compartment 13 and the first portion 121 when the projection of the battery compartment 13 is determined.

In some embodiments, the sound production component 11 may be a cuboid, quasi-cuboid, cylinder, ellipsoid, or other regular or irregular three-dimensional structures. When the sound production component 11 extends into the cavity of auricular concha, as the overall contour of the cavity of auricular concha is an irregular structure similar to an arc, the sound production component 11 may not completely cover or fit the contour of the cavity, thus several gaps may be formed. An overall size of the gaps may be approximately regarded as the opening S of the leakage structure in the quasi-cavity model in FIG. 6. A size of the sound production component 11 fitting or covering the contour of the cavity of auricular concha may be approximately regarded as an unperforated area S0 of the quasi-cavity structure in FIG. 6. As shown in FIG. 7, the larger the relative opening size S/S0, the smaller the listening index. As the larger the relative opening, the more sound components that the contained sound source radiates directly outward, and the less sound reaching the listening position, causing the listening volume to decrease with the increase of the relative opening, which in turn leads to the decrease in the listening index. In some embodiments, while ensuring that the ear canal is not blocked, it may also be necessary to consider that the size of the gaps formed between the sound production component 11 and the cavity of auricular concha may be as small as possible, and the overall volume of the sound production component 11 may not be too large or too small. On the premise that the overall volume or shape of the sound production component 11 is specific, the wearing angle of the sound production component 11 relative to the auricle and the cavity of auricular concha may be considered. For example, when the sound production component 11 is a quasi-cuboid structure and the user wears the open earphone 10, and an upper sidewall 111 (also referred to as an upper side) or a lower sidewall 112 (also referred to as a lower side) of the sound production component 11 is parallel or approximately parallel and vertically or approximately vertical (also be understood that a projection of the upper sidewall 111 or the lower sidewall 112 of the sound production component 11 on the sagittal plane is parallel or approximately parallel and vertically or approximately vertical to the sagittal axis) relative to the horizontal plane, a large gap may be formed when the sound production component 11 fits or covers part of the cavity of auricular concha of the ear, which may affect the listening volume of the user. In order to make the whole or part of the sound production component 11 extend into the cavity of auricular concha, increase an area of the region of the cavity of auricular concha covered by the sound production component 11, reduce the size of the gap formed between the sound production component 11 and the edge of the cavity of auricular concha, and improve the listening volume at the opening of the ear canal, in some embodiments, an inclination angle $\alpha$ between a projection of the upper sidewall 111 or the lower sidewall 112 of the sound production component 11 on the sagittal plane and the horizontal direction may be within a range of 10°-28° in the wearing state of the open earphone 10. Preferably, the inclination angle $\alpha$ between the projection of the upper sidewall 111 or the lower sidewall 112 of the sound production component 11 on the sagittal plane and the horizontal direction may be within a range of 13°-21° in the wearing state of the open earphone 10. More preferably, the inclination angle $\alpha$ between the projection of the upper sidewall 111 or the lower sidewall 112 of the sound production component 11 on the sagittal plane and the horizontal direction may be within a range of 15°-19° in the wearing state of the open earphone 10. It should be noted that the inclination angle between the projection of the upper sidewall 111 of the sound production component 11 on the sagittal plane and the horizontal direction and the inclination angle between the projection of the lower sidewall 112 of the sound production component 11 on the sagittal plane and the horizontal direction may be the same or different. For example, when the upper sidewall 111 is parallel to the lower sidewall 112 of the sound production component 11, the inclination angle between the projection of the upper sidewall 111 on the sagittal plane and the horizontal direction and the inclination angle between the projection of the lower sidewall 112 on the sagittal plane and the horizontal direction may be the same. As another example, when the upper sidewall 111 is not parallel to the lower sidewall 112 of the sound production component 11, or one of the upper sidewall 111 or the lower sidewall 112 is a planar wall, and the other of the upper sidewall 111 or the lower sidewall 112 is a non-planar wall (e.g., a curved wall), the inclination angle between the projection of the upper sidewall 111 on the sagittal plane and the horizontal direction and the inclination angle between the projection of the lower sidewall 112 on the sagittal plane and the horizontal direction may be different. In addition, when the upper sidewall 111 or the lower sidewall 112 is a curved surface, the projection of the upper sidewall 111 or the lower sidewall 112 on the sagittal plane may be a curved line or a broken line. At this time, the inclination angle between the projection of the upper sidewall 111 on the sagittal plane and the horizontal direction may be an included angle between a tangent line to a point at which the curved line or the broken line has a largest distance from the ground plane and the horizontal direction, and the inclination angle between the projection of the lower sidewall 111 on the sagittal plane and the horizontal direction may be an included angle between a tangent line to a point at which the curved line or the broken line has a smallest distance from the ground plane and the horizontal direction. In some embodiments, when the upper sidewall 111 or the lower sidewall 112 is the curved surface, a tangent line parallel to the major axis direction Y on the projection may also be selected, and an included angle between the tangent line and the horizontal direction may be used to represent the inclination angle between the projection of the upper sidewall 111 or the lower sidewall 112 on the sagittal plane and the horizontal direction.

Figure 11:
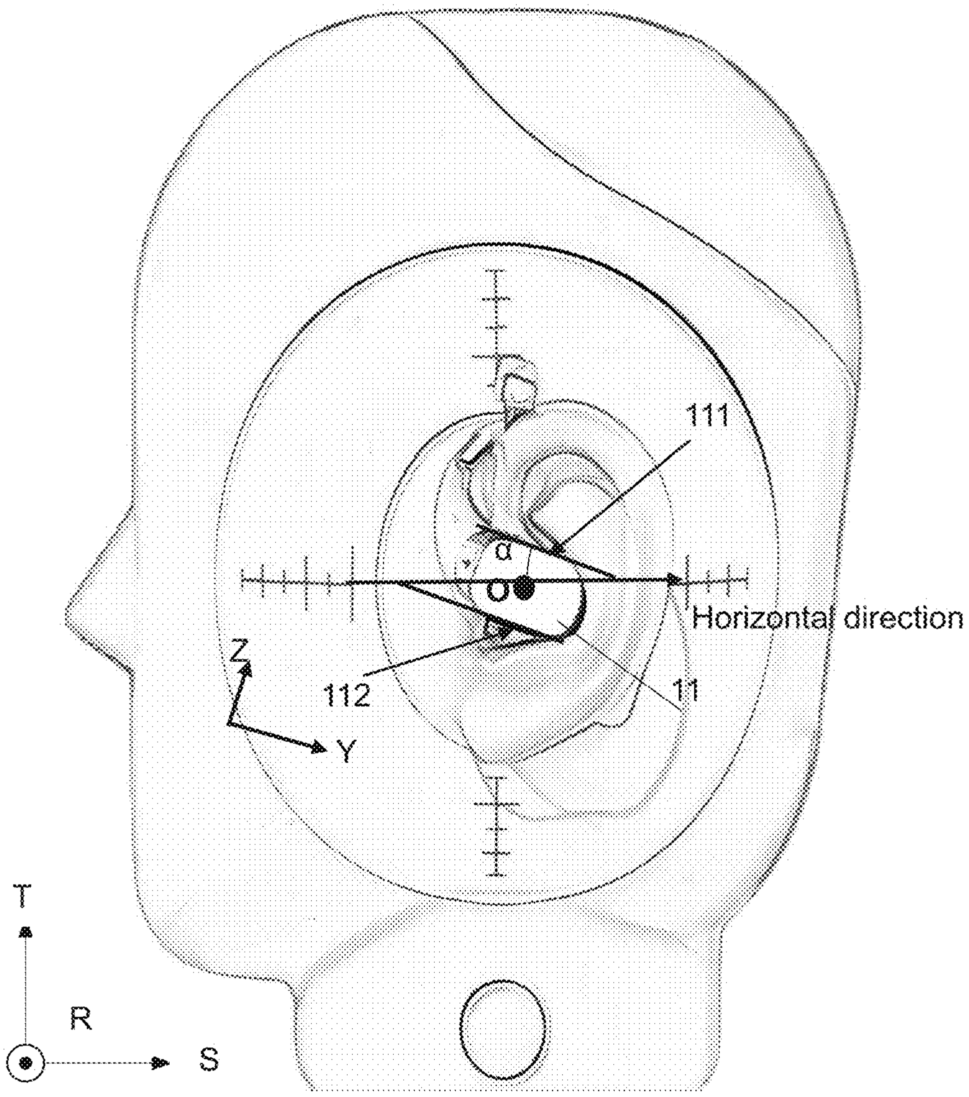
FIG. 11 is a schematic diagram illustrating exemplary wearing of an open earphone according to other embodiments of the present disclosure.

It should be noted that one end of the sound production component 11 in the embodiments of the present disclosure may be connected to the second portion 122 of the suspension structure. The end may be referred to as a fixed end. An end of the sound production component 11 away from the fixed end may be referred to as a free end or an end. The end of the sound production component 11 may face the first portion 121 of the ear hook. In the wearing state, the suspension structure 12 (e.g., the ear hook) may have a vertex (e.g., vertex T1 in FIG. 10B), i.e., a position with a highest distance relative to the horizontal plane. The vertex T1 may be close to a connection part between the first portion 121 and the second portion 122. The upper sidewall may be a sidewall of the sound production component 11 (e.g., the upper sidewall 111 in FIG. 10B and FIG. 11) other than the fixed end and the end, a center point (e.g., a geometric center point) of which has a least distance from the upper vertex of the ear hook in the vertical axis direction. Correspondingly, the lower sidewall may be a sidewall opposite to the upper sidewall of the sound production component 11, i.e., a sidewall of sound production component 11 (e.g., the lower sidewall 112 in FIG. 10B and FIG. 11) other than the fixed end and the end, a center point (e.g., the geometric center point) of which has the largest a distance from the upper vertex of the ear hook in the vertical axis direction.

Figure 12:
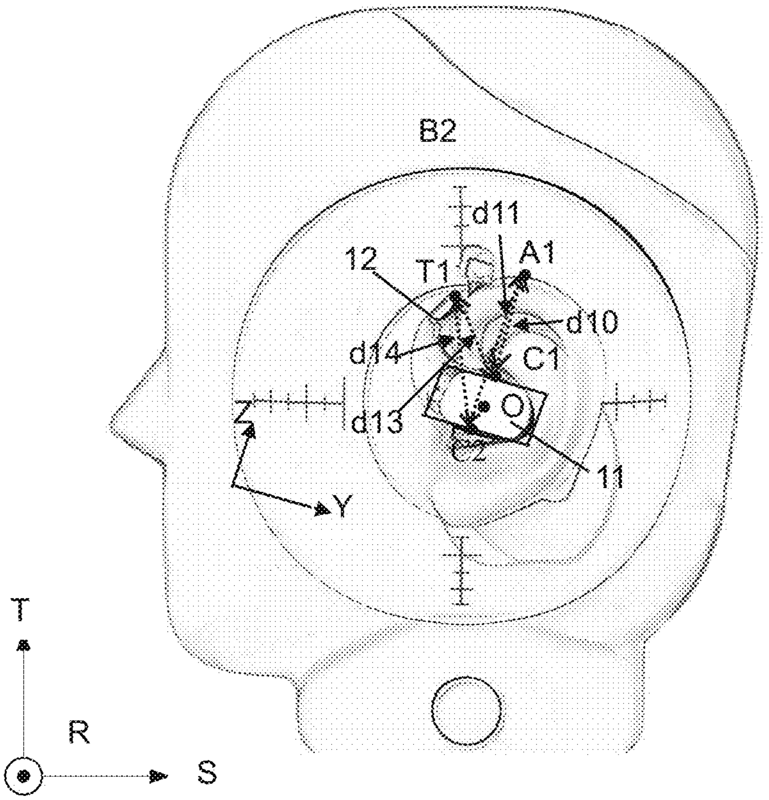
FIG. 12 is a schematic diagram illustrating exemplary wearing of an open earphone according to other embodiments of the present disclosure.

The whole or part structure of the sound production component 11 may extend into the cavity of auricular concha to form the quasi-cavity structure as shown in FIG. 4. The listening volume when the user wears the open earphone 10 may be related to the size of the gap formed between the sound production component 11 and the edge of the cavity of auricular concha. The smaller the size of the gap, the greater the listening volume at the opening of the ear canal of the user. The size of the gap formed between the sound production component 11 and the edge of the cavity of auricular concha may not only be related to the inclination angle between the projection of the upper sidewall 111 or the lower sidewall 112 of the sound production component 11 on the sagittal plane and the horizontal plane, but also be related to the size of the sound production component 11. For example, if the size of the sound production component 11 (especially the size along the minor axis direction Z in FIG. 12) is too small, the gap formed between the sound production component 11 and the edge of the cavity of auricular concha may be too large, affecting the listening volume at the opening of the ear canal of the user. When the size of the sound production component 11 (especially the size along the minor axis direction Z in FIG. 12) is too large, the sound production component 11 may have few parts extending into the cavity of auricular concha, or the sound production component 11 may completely cover the cavity of auricular concha. At this time, the opening of the ear canal may be equivalent to being blocked, the connection between the opening of the ear canal and the external environment may not be realized, and the original design intention of the open earphone may not be achieved. In addition, the excessively large size of the sound production component 11 may affect the wearing comfort of the user and the convenience of carrying around. As shown in FIG. 12, in some embodiments, the distance between a midpoint of the projection of the upper sidewall 111 and the lower sidewall 112 of the sound production component 11 on the sagittal plane and the highest point of the second projection may reflect the size of the sound production component 11 along the minor axis direction Z (the direction indicated by the arrow Z in FIG. 12) and the position of the sound production component 11 relative to the cavity of auricular concha. In order to improve the listening effect of the open earphone 10 while ensuring that the open earphone 10 does not block the opening of the ear canal of the user, in some embodiments, the distance d10 between midpoint C1 of the projection of the upper sidewall 111 of the sound production component 11 on the sagittal plane and the highest point A1 of the second projection may be within a range of 20 mm-38 mm, and a distance d11 between the midpoint C2 of the projection of the lower sidewall 112 of the sound production component 11 on the sagittal plane and the highest point A1 of the second projection may be within a range of 32 mm-57 mm. Preferably, the distance d10 between the midpoint C1 of the projection of the upper sidewall 111 of the sound production component 11 on the sagittal plane and the highest point A1 of the second projection may be within a range of 24 mm-36 mm, and the distance d11 between the midpoint C2 of the projection of the lower sidewall 112 of the sound production component 11 on the sagittal plane and the highest point A1 of the second projection may be within a range of 36 mm-54 mm. More preferably, the distance between the midpoint C1 of the projection of the upper sidewall 111 of the sound production component 11 on the sagittal plane and the highest point A1 of the second projection may be within a range of 27 mm-34 mm, and the distance between the midpoint C2 of the projection of the lower sidewall 112 of the sound production component 11 on the sagittal plane and the highest point A1 of the second projection may be within a range of 38 mm-50 mm. It should be noted that, when the projection of the upper sidewall 111 of the sound production component 11 on the sagittal plane is the curved line or the broken line, the midpoint C1 of the projection of the upper sidewall 111 of the sound production component 11 on the sagittal plane may be selected by the following example. A line segment may be drawn by selecting two farthest points on the projection of the upper sidewall 111 on the sagittal plane along the major axis direction, a mid-perpendicular line may be drawn by selecting a midpoint on the line segment, and an interaction point of the mid-perpendicular line and the projection may be the midpoint of the projection of the upper sidewall 111 of the sound production component 11 on the sagittal plane. In some alternative embodiments, a point of the projection of the upper sidewall 111 on the sagittal plane with a smallest distance from the highest point of the second projection may be selected as the midpoint C1 of the projection of the upper sidewall 111 of the sound production component 11 on the sagittal plane. The midpoint of the projection of the lower sidewall 112 of the sound production component 11 on the sagittal plane may be selected in the same manner as above. For example, a point of the projection of the lower sidewall 112 on the sagittal plane with a largest distance from the highest point of the second projection may be selected as the midpoint C2 of the projection of the lower sidewall 112 of the sound production component 11 on the sagittal plane.

In some embodiments, the distance between the midpoint of the projection of the upper sidewall 111 and the lower sidewall 112 of the sound production component 11 on the sagittal plane and the projection of the vertex of the ear hook on the sagittal plane may reflect the size of the sound production component 11 along the minor axis direction Z (the direction indicated by the arrow Z in FIG. 3). The upper vertex of the ear hook may be a position on the ear hook that has the largest distance relative to a specific point on the neck of the user in the vertical axis direction when the user wears the open earphone, e.g., the vertex T1 in FIG. 10B. In order to improve the listening effect of the open earphone 10 while ensuring that the open earphone 10 does not block the opening of the ear canal of the user, in some embodiments, a distance d13 between the midpoint C1 of the projection of the upper sidewall 111 of the sound production component 11 on the sagittal plane and the projection of the upper vertex T1 of the ear hook on the sagittal plane may be within a range of 17 mm-36 mm, and a distance d14 between the midpoint C2 of the projection of the lower sidewall 112 of the sound production component 11 on the sagittal plane and the projection of the upper vertex of the ear hook on the sagittal plane may be within a range of 28 mm-52 mm. Preferably, the distance d13 between the midpoint C1 of the projection of the upper sidewall 111 of the sound production component 11 on the sagittal plane and the projection of the upper vertex T1 of the ear hook on the sagittal plane may be within a range of 21 mm-32 mm, and the distance d14 between the midpoint C2 of the projection of the lower sidewall 112 of the sound production component 11 on the sagittal plane and the projection of the upper vertex T1 of the ear hook on the sagittal plane may be within a range of 32 mm-48 mm. More preferably, the distance d13 between the midpoint C1 of the projection of the upper sidewall 111 of the sound production component 11 on the sagittal plane and the projection of the upper vertex T1 of the ear hook on the sagittal plane may be within a range of 24 mm-30 mm, and the distance d14 between the midpoint C2 of the projection of the lower sidewall 112 of the sound production component 11 on the sagittal plane and the projection of the upper vertex T1 of the ear hook on the sagittal plane may be within a range of 35 mm-45 mm.

Figure 13A:
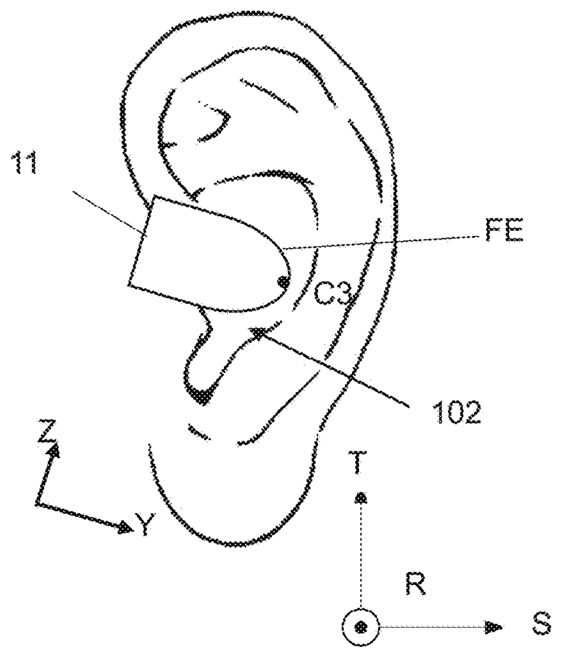
FIG. 13A is a schematic diagram illustrating an exemplary matching position between an open earphone and an ear canal of a user according to some embodiments of the present disclosure.
Figure 13B:
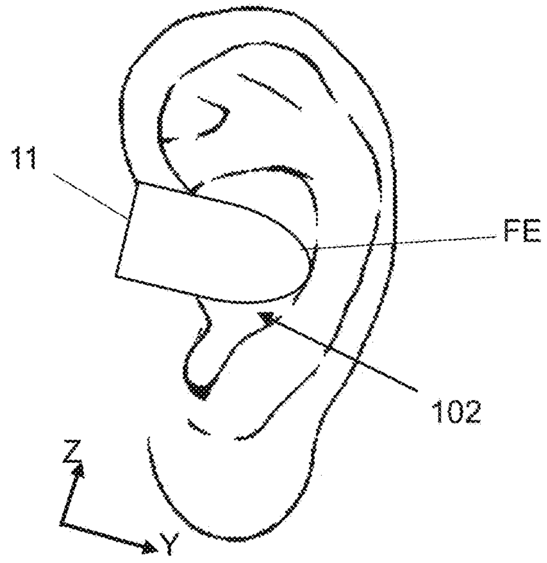
FIG. 13B is a schematic diagram illustrating an exemplary matching position between another open earphone and an ear canal of a user according to some embodiments of the present disclosure.
Figure 13C:
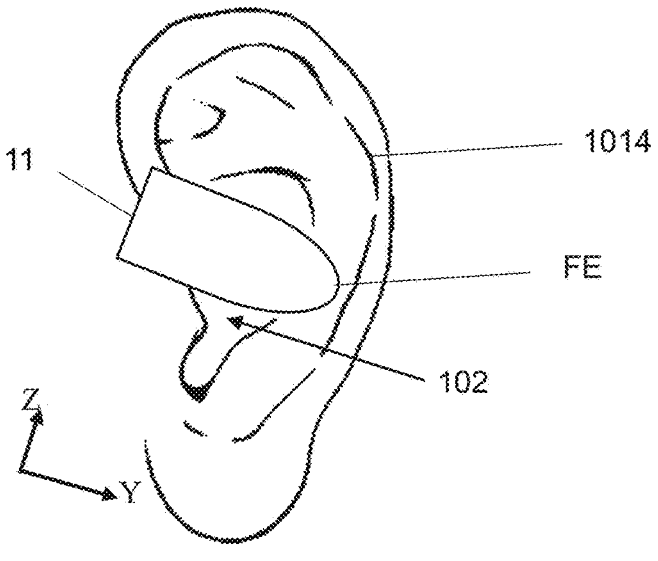
FIG. 13C is a schematic diagram illustrating an exemplary matching position between another open earphone and an ear canal of a user according to some embodiments of the present disclosure.

FIGS. 13A-13C are schematic diagrams illustrating different exemplary matching positions of an open earphone and an ear canal of a user according to some embodiments of the present disclosure.

The size of the gap formed between the sound production component 11 and the edge of the cavity of auricular concha may be related to the inclination angle between the projection of the upper sidewall 111 or the lower sidewall 112 of the sound production component 11 on the sagittal plane and the horizontal plane, the size of the sound production component 11 (e.g., the size in the minor axis direction Z in FIG. 3), and the distance between the end FE of the sound production component 11 and the edge of the cavity of auricular concha. It should be noted that the end FE of the sound production component 11 refers to an end of the sound production component 11 opposite to the fixed end connected to the suspension structure 12, and is also referred to as a free end. The sound production component 11 may be a regular or irregular structure. An exemplary description is given to further illustrate the end FE of the sound production component 11. For example, when the sound production component 11 is a cuboid structure, an end wall of the sound production component 11 may be a plane, and the end FE of the sound production component 11 may be an end sidewall opposite to the fixed end connected to the suspension structure 12 in the sound production component 11. As another example, when the sound production component 11 is a sphere, an ellipsoid or an irregular structure, the end FE of the sound production component 11 refers to a specific region away from the fixed end obtained by cutting the sound production component 11 along a Y-Z plane (a plane formed by the minor axis direction Z and a thickness direction X). A ratio of a size of the specific region along the major axis direction Y to a size of the sound production component along the major axis direction Y may be within a range of 0.05-0.2.

Specifically, one end of the sound production component 11 may be connected to the suspension structure 12 (the second portion 122 of the ear hook). When the user wears the open earphone, its position may be relatively forward, and a distance between the end FE (free end) of the sound production component 11 and the fixed end may reflect the size of the sound production component 11 in the major axis direction (the direction indicated by the arrow Y in FIG. 3). Therefore, the position of the end FE of the sound production component 11 relative to the cavity of auricular concha may affect an area of the cavity of auricular concha covered by the sound production component 11, and the size of the gap formed between the sound production component 11 and the contour of the cavity of auricular concha may be affected, thereby affecting the listening volume at the opening of the ear canal of the user. A distance between the midpoint of the projection of the end FE of the sound production component 11 on the sagittal plane and the projection of the edge of the cavity of auricular concha on the sagittal plane may reflect the position of the end FE of the sound production component 11 relative to the cavity of auricular concha and an extent to which the sound production component 11 covers the cavity of auricular concha of the user. The cavity of auricular concha refers to a concave region below the crus of helix, i.e., the edge of the cavity of auricular concha may be at least defined by the sidewall below the crus of helix, the contour of the tragus, the intertragic notch, the antitragus apex, the notch between the antitragus and the anthelix, and the contour of the antihelix corresponding to the cavity of auricular concha. It should be noted that when the projection of the end FE of the sound production component 11 on the sagittal plane is a curved line or a broken line, the midpoint of the projection of the end FE of the sound production component 11 on the sagittal plane may be selected by the following exemplary method. A line segment may be drawn by selecting two farthest points on the projection of the end FE on the sagittal plane along the minor axis direction, a mid-perpendicular line may be drawn by selecting a midpoint on the line segment, and an interaction point of the mid-perpendicular line and the projection may be the midpoint of the projection of the end of the sound production component 11 on the sagittal plane. In some embodiments, when the end FE of the sound production component 11 is a curved surface, a tangent point where a tangent line parallel to the minor axis direction Z on the projection may also be selected as the midpoint of the projection of the end FE of the sound production component 11 on the sagittal plane.

As shown in FIG. 13A, when the sound production component 11 does not abut against the edge of the cavity of auricular concha 102, the end FE of the sound production component 11 may be located in the cavity of auricular concha 102, i.e., the midpoint of the projection of the end FE of the sound production component 11 on the sagittal plane may not overlap with the projection of the edge of the cavity of auricular concha 102 on the sagittal plane. As shown in FIG. 13B, the sound production component 11 of the open earphone 10 may extend into the cavity of auricular concha 102, and the end FE of the sound production component 11 may abut against the edge of the cavity of auricular concha 102. It should be noted that, in some embodiments, when the end FE of the sound production component 11 abuts against the edge of the cavity of auricular concha 102, the midpoint of the projection of the end FE of the sound production component 11 on the sagittal plane may overlap with the projection of the edge of the cavity of auricular concha 102 on the sagittal plane. In some embodiments, when the end FE of the sound production component 11 abuts against the edge of the cavity of auricular concha 102, the midpoint of the projection of the end FE of the sound production component 11 on the sagittal plane may not overlap with the projection of the edge of the cavity of auricular concha 102 on the sagittal plane. For example, the cavity of auricular concha 102 may be the concave structure, the sidewall corresponding to the cavity of auricular concha 102 may not a flat wall surface, and the projection of the edge of the cavity of auricular concha on the sagittal plane may be an irregular two-dimensional shape. The projection of the sidewall corresponding to the cavity of auricular concha 102 on the sagittal plane may be on or outside the contour of the shape. Therefore, the midpoint of the projection of the end FE of the sound production component 11 on the sagittal plane may not overlap with the projection of the edge of the cavity of auricular concha 102 on the sagittal plane. For example, the midpoint of the projection of the end FE of the sound production component 11 on the sagittal plane may be located on an inner side or an outer side of the projection of the edge of the cavity of auricular concha 102 on the sagittal plane. In the embodiments of the present disclosure, when the end FE of the sound production component 11 is located in the cavity of auricular concha 102, the distance between the midpoint of the projection of the end FE of the sound production component 11 on the sagittal plane and the projection of the edge of the cavity of auricular concha 102 on the sagittal plane may be within a specific range (e.g., not greater than 6 mm), which may be considered that the end FE of the sound production component 11 may abut against the edge of the cavity of auricular concha 102. As shown in FIG. 13C, the sound production component 11 of the open earphone 10 may cover the cavity of auricular concha, and the end FE of the sound production component 11 may be located between the edge of the cavity of auricular concha 102 and an inner contour 1014 of the auricle.

Referring to FIGS. 13A-13C, when the end FE of the sound production component 11 is located in the edge of the cavity of auricular concha 102, if the distance between the midpoint C3 of the projection of the end FE of the sound production component 11 on the sagittal plane and the projection of the edge of the cavity of auricular concha 102 on the sagittal plane is too small, the area of the cavity of auricular concha 102 covered by the sound production component 11 may be too small, and the size of the gap formed between the sound production component 11 and the edge of the cavity of auricular concha may be relatively large, which may affect the listening volume at the opening of the ear canal of the user. When the midpoint C3 of the projection of the end FE of the sound production component on the sagittal plane is located at a position between the projection of the edge of the cavity of auricular concha 102 on the sagittal plane and a projection of the inner contour 1014 of the auricle on the sagittal plane, if the distance between the midpoint C3 of the projection of the end FE of the sound production component on the sagittal plane and the projection of the edge of the cavity of auricular concha 102 on the sagittal plane is too large, the end FE of the sound production component 11 may interfere with the auricle, and the area of the cavity of auricular concha 102 covered by the sound production component 11 may not be increased. In addition, when the user wears the open earphone, if the end FE of the sound production component 11 is not located in the cavity of auricular concha 102, the edge of the cavity of auricular concha 102 may not limit the sound production component 11, and the open earphone may be liable to fall off. In addition, an increase in the size of the sound production component 11 in a certain direction may increase weight of the sound production component 11, which may affect the wearing comfort and portability of the user. Accordingly, in order to ensure that the open earphone 10 has a better listening effect and the wearing comfort and stability of the user, in some embodiments, the distance between the midpoint C3 of the projection of the end FE of the sound production component 11 on the sagittal plane and the projection of the edge of the cavity of auricular concha on the sagittal plane may not be greater than 16 mm. Preferably, the distance between the midpoint C3 of the projection of the end FE of the sound production component 11 on the sagittal plane and the projection of the edge of the cavity of auricular concha on the sagittal plane may not be greater than 13 mm. More preferably, the distance between the midpoint C3 of the projection of the end FE of the sound production component 11 on the sagittal plane and the projection of the edge of the cavity of auricular concha on the sagittal plane may not be greater than 8 mm. It should be noted that, in some embodiments, the distance between the midpoint C3 of the projection of the end FE of the sound production component 11 on the sagittal plane and the projection of the edge of the cavity of auricular concha 102 on the sagittal plane may be a minimum distance between the midpoint C3 of the projection of the end FE of the sound production component 11 on the sagittal plane and the projection of the edge of the cavity of auricular concha 102 on the sagittal plane. In some embodiments, the distance between the midpoint C3 of the projection of the end FE of the sound production component 11 on the sagittal plane and the projection of the edge of the cavity of auricular concha 102 on the sagittal plane also refers to a distance along the sagittal axis. In addition, in a specific wearing scenario, it may also be that the points, other than the midpoint C3, of the projection the end FE of the sound production component 11 on the sagittal plane may abut against the edge of the cavity of auricular concha. At this time, the distance between the midpoint C3 of the projection of the end FE of the sound production component 11 on the sagittal plane and the projection of the edge of the cavity of auricular concha on the sagittal plane may be greater than 0 mm. In some embodiments, the distance between the midpoint C3 of the projection of the end FE of the sound production component 11 on the sagittal plane and the projection of the edge of the cavity of auricular concha on the sagittal plane may be within a range of 2 mm-16 mm. Preferably, the distance between the midpoint C3 of the projection of the end FE of the sound production component 11 on the sagittal plane and the projection of the edge of the cavity of auricular concha on the sagittal plane may be within a range of 4 mm-10.48 mm.

Figure 14A:
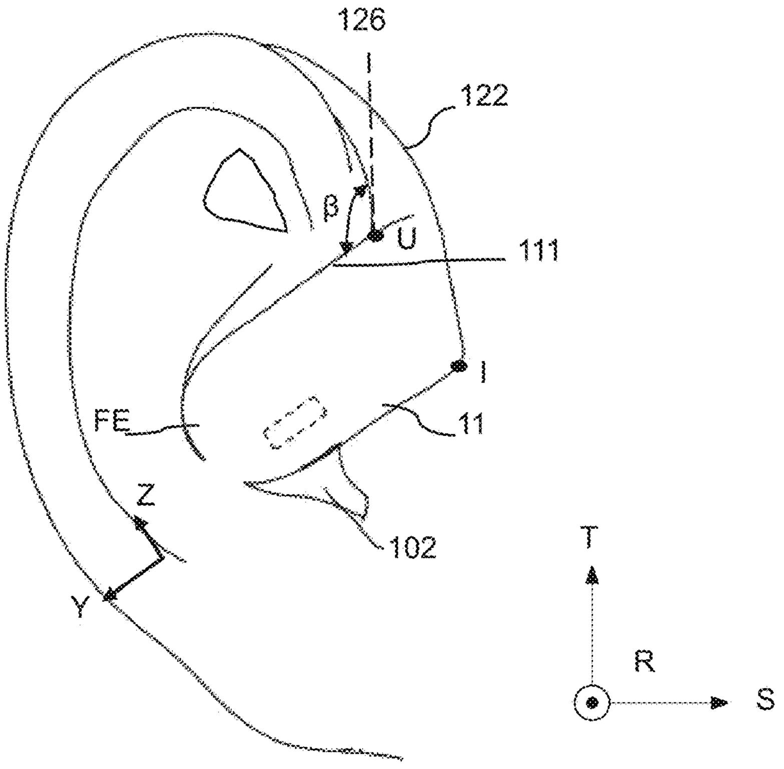
FIG. 14A is a schematic diagram illustrating exemplary wearing of an open earphone according to other embodiments of the present disclosure.
Figure 14B:
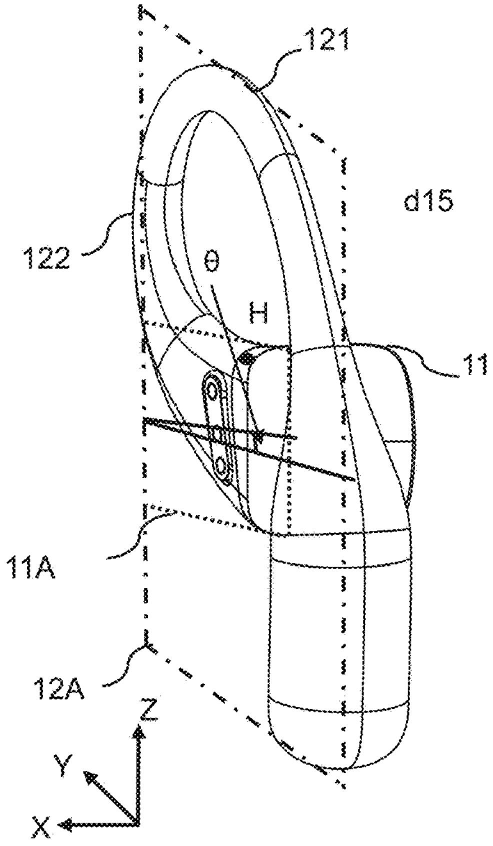
FIG. 14B is a schematic structural diagram illustrating an open earphone when not worn according to some embodiments of the present disclosure.

FIG. 14A is a schematic diagram illustrating exemplary wearing of an open earphone according to other embodiments of the present disclosure. FIG. 14B is a schematic structural diagram illustrating an open earphone in a non-wearing state according to some embodiments of the present disclosure.

Referring to FIG. 14A, in some embodiments, when the user wears the open earphone, part or the whole structure of the sound production component may extend into the cavity of auricular concha, and a certain included angle may be formed between the upper sidewall 111 of the sound production component 11 and the second portion 122 of the ear hook. The included angle may be expressed by an included angle β between a tangent line 126 of the projection of the upper sidewall 111 of the sound production component 11 on the sagittal plane and a tangent line 126 of a projection of a connection part between the second portion 122 of the ear hook and the upper sidewall 111 of the sound production component 11 on the sagittal plane. Specifically, the upper sidewall of the sound production component 11 and the second portion 122 of the ear hook may have the connection part. The projection of the connection part on the sagittal plane may be a point U. The tangent line 126 of the projection of the second portion 122 of the ear hook may be drawn through the point U. When the upper sidewall 111 is the curved surface, the projection of the upper sidewall 111 on the sagittal plane may be the curved line or the broken line. At this time, the included angle between the projection of the upper sidewall 111 on the sagittal plane and the tangent line 126 may be an included angle between a tangent line to a point at which the curved line or the broken line has a largest distance from the ground plane and the tangent line 126. In some embodiments, when the upper sidewall 111 is the curved surface, a tangent line parallel to the major axis direction Y on the projection may also be selected. An included angle between the tangent line and the horizontal direction may represent an inclination angle between the projection of the upper sidewall 111 on the sagittal plane and the tangent line 126. In some embodiments, the included angle β may be within a range of 100°-150°. Preferably, the included angle β may be within a range of 110°-140°. More preferably, the included angle β may be within a range of 120°-135°.

The human head is approximately regarded as a quasi-sphere structure, and the auricle is a structure that protrudes relative to the head. When the user wears the open earphone, part of the ear hook 12 may be attached to the head of the user. In order to make the sound production component 11 extend into the cavity of auricular concha 102, a certain inclination angle may be formed between the sound production component 11 and the ear hook plane. The inclination angle may be represented by an included angle between a plane corresponding to the sound production component 11 and the ear hook plane. In some embodiments in the present disclosure, the ear hook plane refers to a plane (e.g., a plane where the dotted line 12A in FIG. 14B is located) formed by a bisector that bisects or roughly bisects the ear hook 12 along a length extension direction of the ear hook 12. In some embodiments, the ear hook plane may also be a plane formed by three most protruding points on the ear hook, i.e., a plane that supports the ear hook when the ear hook is placed freely (without external force). For example, when the ear hook is placed on a horizontal plane, the horizontal plane may support the ear hook, and the horizontal plane may be regarded as the ear hook plane. In some embodiments, the plane 11A corresponding to the sound production component 11 may include a sidewall (also referred to as an inner side) of the sound production component 11 facing the front outer side of the auricle of the user, or a sidewall (also referred to as an outer side) away from the front outer side of the auricle of the user. When the sidewall of the sound production component 11 facing the front outer side of the auricle of the user or the sidewall of the sound production component 11 away from the front outer side of the auricle of the user is a curved surface, the plane corresponding to the sound production component 11 refers to a tangent plane corresponding to the curved surface at a center position, or a plane approximately coinciding with a curve enclosed by the contour of the edge of the curved surface. Taking the sound production component 11 facing the plane 11A where the sidewall of the front outer side of the auricle of the user is located as an example, the included angle θ formed between the plane 11A and the ear hook plane 12A may be the inclination angle θ of the sound production component 11 relative to the ear hook plane. In some embodiments, the included angle θ may be measured by the following exemplary method. The projection of the sidewall (hereinafter referred to as the inner side) of the sound production component 11 close to the ear hook 12 on an X-Y plane and the projection of the ear hook 12 on the X-Y plane may be obtained along the minor axis direction Z, respectively. A first straight line may be drawn by selecting two most protruding points of a side of the projection of the ear hook 12 on the X-Y plane close to (or away from) the projection of the inner side of the sound production component 11 on the X-Y plane. When the projection of the inner side of the sound production component 11 on the XY plane is a straight line, an included angle between the first straight line and the projection of the inner side on the X-Y plane may be the included angle θ. When the inner side of the sound production component 11 is the curved line, the included angle between the first straight line and the major axis direction Y may be approximately regarded as the included angle θ. It should be noted that the inclination angle θ of the sound production component 11 relative to the ear hook plane in both the wearing state and the non-wearing state of the open-type earphone may be measured using the method. The difference lies in that in the non-wearing state, the inclination angle θ may be directly measured using the method; in the wearing state, the inclination angle θ may be measured using the method when the open earphone is worn on the human head model or an ear model. Considering that if the angle is too large, the contact area between the sound production component 11 and the front outer side of the auricle of the user may be small, which may not provide sufficient contact resistance, and the open earphone may be prone to fall off when the user wears the open earphone. In addition, the sizes of the gap formed in the quasi-cavity structure between the sound production component 11 and the cavity of auricular concha 102 of the user may be too large, which may affect the listening volume at the opening of the ear canal of the user. If the angle is too small, the sound production component 11 may not effectively extend into the cavity of auricular concha when the user wears the open earphone. In order to ensure that the user has a better listening effect when wearing the open earphone and ensure the wearing stability, in some embodiments, when the open earphone is in the wearing state, the inclination angle θ of the sound production component 11 relative to the ear hook plane may be within a range of 15°-28°. Preferably, the inclination angle θ of the sound production component 11 relative to the ear hook plane may be within a range of 16°-25°. More preferably, the inclination angle θ of the sound production component 11 relative to the ear hook plane may be within a range of 18°-23°.

Due to the elasticity of the ear hook, the inclination angle of the sound production component 11 relative to the ear hook plane 12A may vary to a certain extent in the wearing state and the non-wearing state. For example, the inclination angle in the non-wearing state may be smaller than that in the wearing state. In some embodiments, when the open earphone is in the non-wearing state, the inclination angle of the sound production component 11 relative to the ear hook plane may be within a range of 15°-23°, and the ear hook of the open earphone 100 may produce a certain clamping force on the ear of the user when the open earphone 100 is in the wearing state, thereby improving the wearing stability for the user without affecting the wearing experience of the user. Preferably, in the non-wearing state, the inclination angle of the sound production component 11 relative to the ear hook plane 12A may be within a range of 16.5°-21°. More preferably, in the non-wearing state, the inclination angle of the sound production component 11 relative to the ear hook plane 12A may be within a range of 18°-20°.

When the size of the sound production component 11 in the thickness direction X is too small, a volume of the front cavity and the rear cavity formed by the diaphragm and the housing of the sound production component 11 may be too small, a vibration amplitude of the vibration may be limited, and a large sound volume may not be provided. When the size of the sound production component 11 in the thickness direction X is too large, the end FE of the sound production component 11 may not completely abut against the edge of the cavity of auricular concha 102 in the wearing state, causing the open earphone to easily fall off. The sidewall of the sound production component 11 facing the ear of the user in the coronal axis direction may have an inclination angle relative to the ear hook plane. A distance between a point on the sound production component 11 farthest from the ear hook plane and the ear hook plane may be the size of the sound production component 11 in the thickness direction X. As the sound production component 11 is arranged obliquely relative to the ear hook plane, the point on the sound production component 11 farthest from the ear hook plane refers to an intersection point I of the fixed end connected to the ear hook, the lower sidewall, and the outer side of the sound production component 11. Further, the extent to which the sound production component 11 extends into the cavity of auricular concha 11 may be determined by the distance between a point on the sound production component 11 closest to the ear hook plane and the ear hook plane. It may ensure that the size of the gap formed between the sound production component 11 and the cavity of auricular concha is small and the wearing comfort for the user by setting the distance between the point on the sound production component 11 closest to the ear hook plane and the ear hook plane to be within an appropriate range. The point on the sound production component 11 closest to the ear hook plane refers to an intersection point H of the end FE, the upper sidewall, and the inner side of the sound production component 11. In some embodiments, in order to ensure that the sound production component 11 has a better acoustic output effect and the wearing stability and comfort, when the open earphone is in the wearing state, the distance between a point I on the sound production component 11 farthest from the ear hook plane 12A and the ear hook plane 12A may be within a range of 11.2 mm-16.8 mm, and the distance between a point H on the sound production component 11 closest to the ear hook plane 12A and the ear hook plane 12A may be within a range of 3 mm-5.5 mm. Preferably, the distance between the point I on the sound production component 11 farthest from the ear hook plane 12A and the ear hook plane 12A may be within a range of 12 mm-15.6 mm, and the distance between the point H on the sound production component 11 closest to the ear hook plane 12A and the ear hook plane 12A may be within a range of 3.8 mm-5 mm. More preferably, the distance between the point I on the sound production component 11 farthest from the ear hook plane 12A and the ear hook plane 12A may be within a range of 13 mm-15 mm, and the distance between the point H on the sound production component 11 closest to the ear hook plane 12A and the ear hook plane 12A may be within a range of 4 mm-5 mm.

Figure 15:
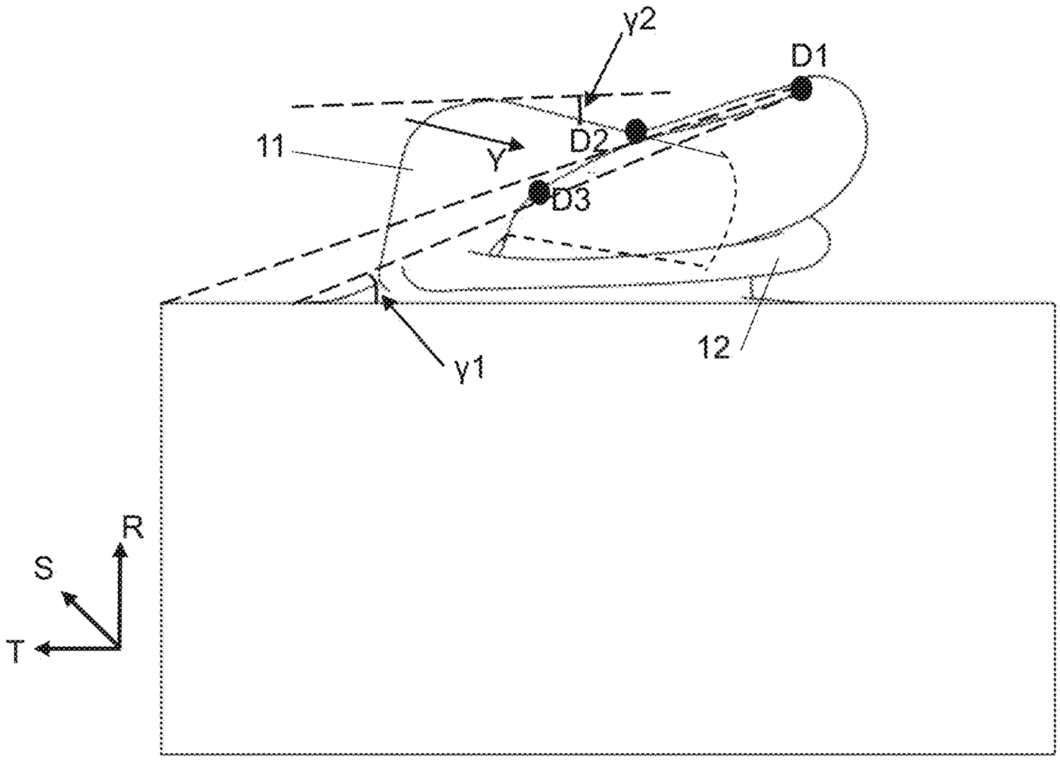
FIG. 15 is a schematic diagram illustrating exemplary wearing of an open earphone according to other embodiments of the present disclosure.

FIG. 15 is a schematic diagram illustrating exemplary wearing of an open earphone according to other embodiments of the present disclosure.

Referring to FIG. 15, in some embodiments, when the open earphone is in the wearing state, at least part of the sound production component 11 of the open earphone may extend into the cavity of auricular concha of the user to ensure the acoustic output effect of the sound production component 11 while improving the wearing stability of the open earphone through the force exerted by the cavity of auricular concha on the sound production component 11. At this time, the sidewall of the sound production component 11 away from the head of the user or facing the opening of the ear canal of the user may have a certain inclination angle relative to an auricle surface of the user. It should be noted that the sidewall of the sound production component 11 away from the head of the user or facing the opening of the ear canal of the user may be a plane or a curved surface. When the sidewall is the curved surface, the inclination angle of the sidewall of the sound production component 11 away from the head of the user or facing the opening of the ear canal of the user relative to the auricle surface of the user may be represented by an inclination angle of a tangent plane (or a plane roughly coincides with a curve formed by the edge contour of the curved surface) corresponding to the curved surface at a center position relative to the auricle surface of the user. It should be noted that in some embodiments of the present disclosure, the auricle surface of the user refers to a plane (e.g., a plane on which points D1, D2, and D3 are located in FIG. 15) on which three points farthest from the sagittal plane of the user are located in different regions (e.g., the top region of the auricle, the tragus region, and the antihelix) on the auricle of the user.

As the projection of the sound production component 11 on the sagittal plane is much smaller than the projection of the auricle on the sagittal plane, and the cavity of auricular concha is a concave cavity in the structure of the auricle, when the inclination angle of the sound production component 11 relative to the auricle surface is small, e.g., when the sidewall of the sound production component 11 away from the head of the user or facing the opening of the ear canal of the user is approximately parallel to the auricle surface, the sound production component 11 may not extend into the cavity of auricular concha, or the size of the gap of the quasi-cavity structure formed between the sound production component 11 and the cavity of auricular concha may be very large, and the user may not obtain a good listening effect when wearing the open earphone. Meanwhile, the sound production component 11 may not abut against the edge of the cavity of auricular concha, and the open earphone may be liable to fall off when the user wears the open earphone. When the inclination angle of the sound production component 11 relative to the auricle surface is large, the sound production component 11 may excessively extend into the cavity of auricular concha and squeeze the ear of the user, and the user may feel a strong sense of discomfort after wearing the open earphone for a long time. In order to make the user experience a better acoustic output effect when wearing the open earphone and ensure the wearing stability and comfort, the inclination angle of the sidewall of the sound production component 11 away from the head of the user or facing the opening of the ear canal of the user relative to the auricle surface of the user may be within a range of 40°-60°. Part or the whole structure of the sound production component 11 may extend into the cavity of auricular concha of the user. At this time, the sound production component 11 may have relatively good acoustic output quality, and the contact force between the sound production component 11 and ear canal of the user may be relatively moderate, thereby achieving more stable wearing relative to the ear of the user, and making the user have a more comfortable wearing experience. Preferably, in some embodiments, in order to further optimize the acoustic output quality and the wearing experience of the open earphone in the wearing state, the inclination angle of the sound production component 11 relative to the auricle surface may be controlled to be within a range of 42°-55°. More preferably, in some embodiments, in order to further optimize the acoustic output quality and the wearing experience of the open earphone in the wearing state, the inclination angle of the sound production component 11 relative to the auricle surface may be controlled to be within a range of 44°-52°.

It should be noted that, referring to FIG. 15, the auricle surface may be inclined upward relative to the sagittal plane, and the inclination angle between the auricle surface and the sagittal plane may be $\gamma 1$. In order to make the end of the sound production component 11 extend into the cavity of auricular concha concave relative to the auricle, the outer side or the inner side of the sound production component 11 may be inclined downward relative to the sagittal plane. The inclination angle of the outer side or the inner side of the sound production component 11 and the sagittal plane may be $\gamma 2$. An included angle between the sound production component 11 and the auricle surface may be a sum of the inclination angle $\gamma 1$ between the auricle surface and the sagittal plane and the inclination angle $\gamma 2$ between the major axis direction Y of the sound production component 11 and the sagittal plane. That is to say, the inclination angle of the outer side or the inner side of the sound production component 11 relative to the auricle surface of the user may be determined by calculating the inclination angle $\gamma 1$ between the auricle surface and the sagittal plane, and the included angle $\gamma 1$ between the outer side or the inner side of the sound production component 11 and the sagittal plane. The inclination angle between the outer side or the inner side of the sound production component 11 and the sagittal plane may be approximately regarded as the inclination angle between the major axis direction Y of the sound production component 11 and the sagittal plane. In some embodiments, the inclination angle may also be calculated by an included angle between a projection of the auricle surface on a plane formed by a T-axis and an R-axis (hereinafter referred to as a T-R plane) and a projection of the outer side or the inner side of the sound production component 11 on the T-R plane. When the outer side or the inner side of the sound production component 11 is a plane, the projection of the outer side or the inner side of the sound production component 11 on the T-R plane may be a straight line. An included angle between the straight line and the projection of the auricle surface on the T-R plane may be the inclination angle of the sound production component 11 relative to the auricle surface. When the outer side or the inner side of the sound production component 11 is a curved surface, the inclination angle of the sound production component 11 relative to the auricle surface may be approximately regarded as the included angle between the major axis direction Y of the sound production component 11 and the projection of the auricle surface on the T-R plane.

Figure 16:
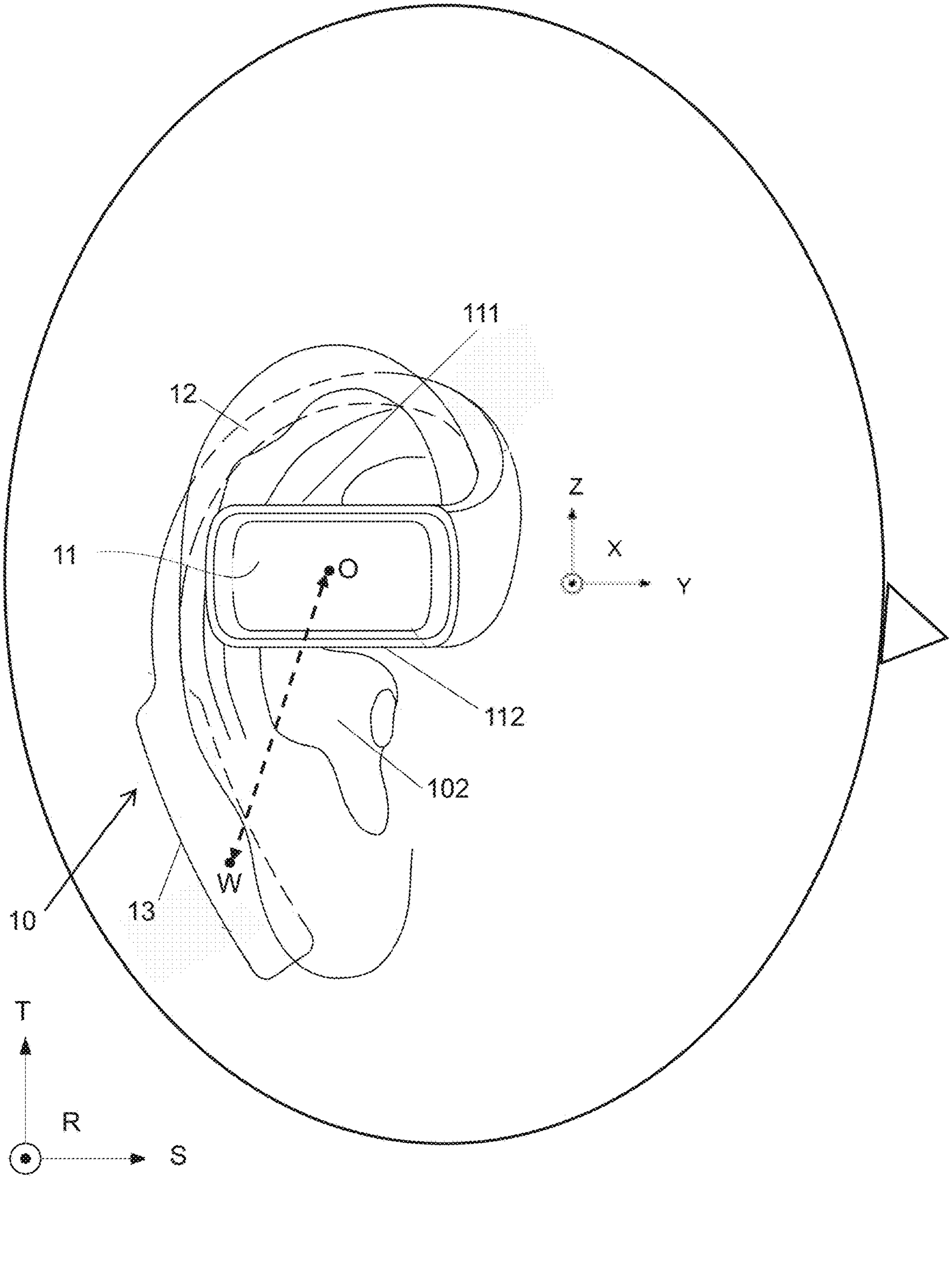
FIG. 16 is a schematic diagram illustrating exemplary wearing that a sound production component of an open earphone covers an antihelix region according to some embodiments of the present disclosure.

FIG. 16 is a schematic diagram illustrating exemplary wearing of an open earphone according to other embodiments of the present disclosure.

Referring to FIG. 16, in some embodiments, when the open earphone is in the wearing state, at least part of the sound production component 11 may cover the antihelix region of the user, wherein the antihelix region may include any one or more of the antihelix 105, the upper anticrus of helix 110, and the lower anticrus of helix 111 in FIG. 1. At this time, the sound production component 11 may be located above the cavity of auricular concha 102 and the opening of the ear canal, and the opening of the ear canal of the user may be in an open state. In some embodiments, the housing of the sound production component 11 may include at least a sound guiding hole and a pressure relief hole. The sound guiding hole may be acoustically coupled with a front cavity of the open earphone 10, and the pressure relief hole may be acoustically coupled with a rear cavity of the open earphone 10. The sound output from the sound guiding hole and the sound output from the pressure relief hole may be approximately regarded as two sound sources. The sounds of the two sound sources may have anti-phases to form a dipole. When the user wears the open earphone, the sound guiding hole may be located on a sidewall of the sound production component 11 toward or close to the opening of the ear canal of the user, and the pressure relief hole may be located on a sidewall of the sound production component 11 away from the opening of the ear canal of the user. The housing of the sound production component 11 may act as a baffle to increase a sound path difference from the sound guiding hole and the pressure relief hole to an external ear canal 101, thereby increasing a sound intensity at the external ear canal 101. Furthermore, in the wearing state, the inner side of the sound production component 11 may be in contact with the antihelix region, and a concave-convex structure of the antihelix region may also act as a baffle, which may increase a sound path of the sound emitted from the pressure relief hole to the external ear canal 101, thereby increasing the sound path difference from the sound guiding hole and the pressure relief hole to the external ear canal 101.

Figure 17:
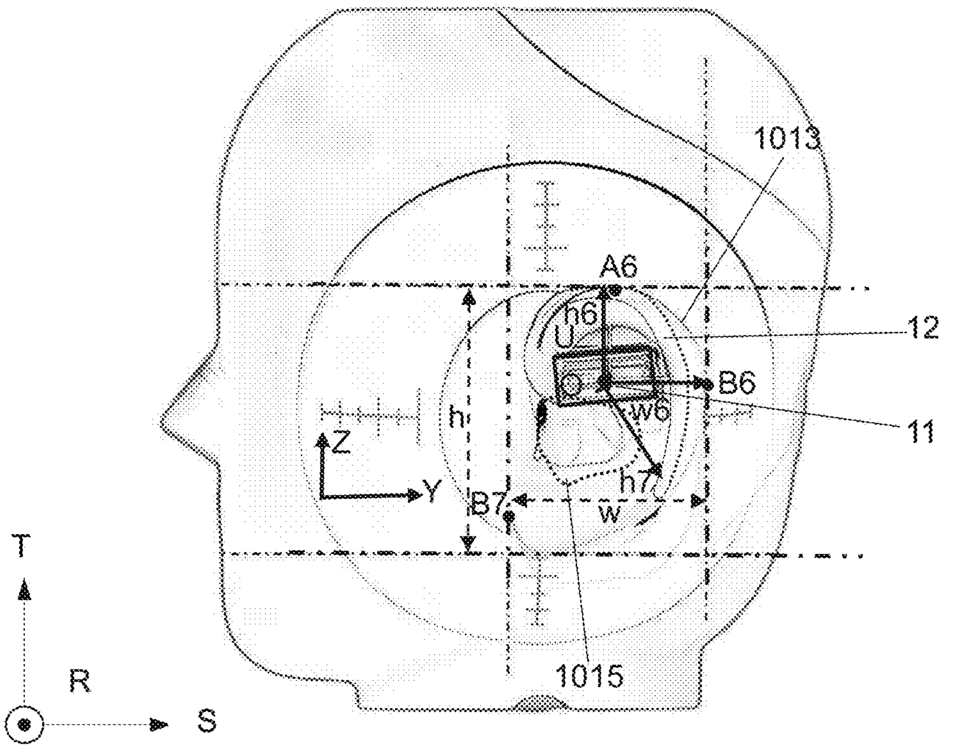
FIG. 17 is a schematic diagram illustrating exemplary wearing of an open earphone according to other embodiments of the present disclosure.
Figure 18:
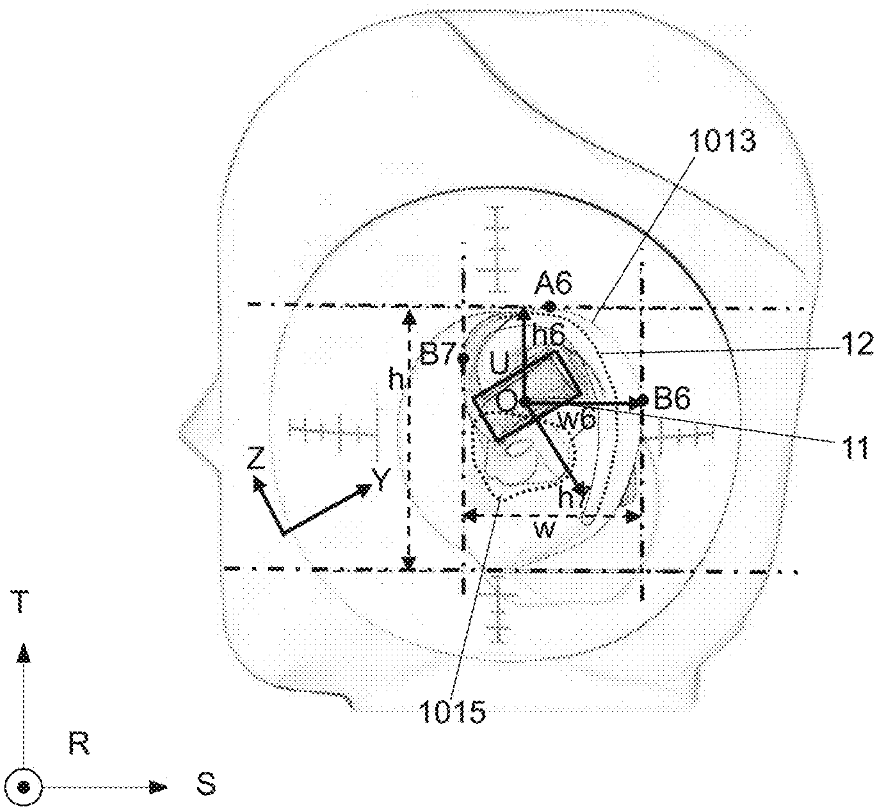
FIG. 18 is schematic diagram illustrating exemplary wearing of an open earphone according to other embodiments of the present disclosure.

FIG. 17 and FIG. 18 are schematic diagrams illustrating exemplary wearing of an open earphone according to other embodiments of the present disclosure. As shown in FIG. 17 and FIG. 18, in some embodiments, when the open earphone 10 is in the wearing state, the sound production component may be approximately parallel or inclined at a certain angle relative to the horizontal direction. In some embodiments, when the open earphone 10 is in the wearing state, the sound production component 11 and the auricle of the user have a first projection (a rectangular region defined by a solid line box U in FIG. 17 and FIG. 18 may be approximately equivalent to the first projection) and a second projection on the sagittal plane (e.g., an S-T plane in FIG. 17 and FIG. 18) of the head of the user, respectively. In order to make the whole or part structure of the sound production component 11 cover the antihelix region of the user (e.g., the position of the antihelix, the triangular fossa, the upper anticrus of helix, or the lower anticrus of helix), a ratio of a distance h6 between the centroid O of the first projection and a highest point A6 of the second projection in the vertical axis direction (e.g., a T-axis direction in FIG. 17 and FIG. 18) to a height h of the second projection in the vertical axis direction may be within a range of 0.25-0.4. A ratio of a distance w6 between the centroid O of the first projection U and an end point B6 of the second projection in the sagittal axis direction (e.g., an S-axis direction in FIG. 17 and FIG. 18) to a width w of the second projection in the sagittal axis direction may be within a range of 0.4-0.6.

Considering that the sidewall of the sound production component 11 may abut against the antihelix region, in order to make the sound production component 11 abut against a larger antihelix region, the concave-convex structure of the region may also act as a baffle, to increase the sound path of the sound emitted from the pressure relief hole to the external ear canal 101, thereby increasing the sound path difference between the sound guiding hole and the pressure relief hole to the external ear canal 101, increasing the sound intensity at the external ear canal 101, and reducing the volume of the far-field leakage sound. Accordingly, in order to balance the listening volume and the sound leakage volume of the sound production component 11 to ensure the acoustic output quality of the sound production component 11, the sound production component 11 may be fit as closely as possible to the antihelix region of the user. Correspondingly, the ratio of the distance h6 between the centroid O of the first projection of the sound production component on the sagittal plane of the head of the user and the highest point A6 of the second projection of the auricle of the user on the sagittal plane in the vertical axis direction to the height h of the second projection in the vertical axis direction may be controlled to be within a range of 0.25-0.4. Meanwhile, the ratio of the distance w6 between the centroid O of the first projection of the sound production component 11 on the sagittal plane and the end point B6 of the second projection of the auricle of the user on the sagittal plane to the width w of the second projection in the sagittal axis direction may be controlled to be within a range of 0.4-0.6. Preferably, in some embodiments, in order to improve the wearing comfort of the open earphone while ensuring the acoustic output quality of the sound production component 11, the ratio of the distance h6 between the centroid O of the first projection and the highest point A6 of the second projection in the vertical axis direction to the height h of the second projection in the vertical axis direction may be within a range of 0.25-0.35, and the ratio of the distance w6 between the centroid O of the first projection and the end point B6 of the second projection in the sagittal axis direction to the width w of the second projection in the sagittal axis direction may be within a range of 0.42-0.6. More preferably, the ratio of the distance h6 between the centroid O of the first projection and the highest point A6 of the second projection in the vertical axis direction to the height h of the second projection in the vertical axis direction may be within a range of 0.25-0.34, and the ratio of the distance w6 between the centroid O of the first projection and the end point B6 of the second projection in the sagittal axis direction to the width w of the second projection in the sagittal axis direction may be within a range of 0.42-0.55.

Similarly, when the shapes and the sizes of the ears of users are different, the ratio may fluctuate within a certain range. For example, when the earlobe of the user is long, the height h of the second projection in the vertical axis direction be larger than that of the general situation. At this time, when the user wears the open earphone 100, the ratio of the distance h6 between the centroid O of the first projection and the highest point A6 of the second projection in the vertical axis direction to the height h of the second projection in the vertical axis direction may be smaller, e.g., which may be within a range of 0.2-0.35. Similarly, in some embodiments, when the helix of the user is bent forward, the width w of the second projection in the sagittal axis direction may be smaller than that of the general situation, and the distance w6 between the centroid O of the first projection and the end point B6 of the second projection in the sagittal axis direction may also be smaller. At this time, the ratio of the distance w6 between the centroid O of the first projection and the end point B6 of the second projection in the sagittal axis direction to the width w of the second projection in the sagittal axis direction may be larger, e.g., which may be within a range of 0.4-0.7.

In some embodiments, the listening volume of the sound production component 11, the sound leakage reduction effect, and the wearing comfort and stability may also be improved by adjusting the distance between the centroid O of the first projection and the contour of the second projection. For example, when the sound production component 11 is located at the top of the auricle, the earlobe, the facial region on the front side of the auricle, or between the inner contour of the auricle and the edge of the cavity of auricular concha, it may be specifically embodied as that the distance between the centroid O of the first projection and a point of a certain region of the edge of the second projection may be too small, the distance between the centroid O of the first projection and a point of another region of the edge of the second projection may too large, and the antihelix region may not cooperate with the sound production component 11 to act as the baffle, affecting the acoustic output effect of the open earphone. In addition, if the distance between the centroid O of the first projection and the point of the certain region of the edge of the second projection is too large, a gap may be formed between the end FE of the sound production component 11 and the inner contour 1014 of the auricle, and the sound emitted from the sound guiding hole and the sound emitted from the pressure relief hole may produce an acoustic short circuit in a region between the end FE of the sound production component 11 and the inner contour 1014 of the auricle, resulting in a decrease in the listening volume at the opening of the ear canal of the user. The larger the region between the end FE of the sound production component 11 and the inner contour 1014 of the auricle, the more obvious the acoustic short circuit. In some embodiments, when the wearing state of the open earphone 10 is that at least part of the sound production component 11 covers the antihelix region of the user, the centroid O of the first projection of the sound production component 11 on the sagittal plane of the head of the user may also be located in a region enclosed by the contour of the second projection, but compared with at least part of the sound production component 11 extending into the cavity of auricular concha of the user, in the wearing state, the distance between the centroid O of the first projection of the sound production component 11 on the sagittal plane of the head of the user and the contour of the second projection may be different. In the open earphones in FIGS. 16-18, at least part of the structure of the sound production component 11 may cover the antihelix region, which may fully expose the opening of the ear canal, and make the user better receive sounds from the external environment. In some embodiments, in order to consider the listening volume of the sound production component 11, the sound leakage reduction effect, the effect of receiving the sound of the external environment, and reducing the region between the end FE of the sound production component 11 and the inner contour 1014 of the auricle as much as possible in the wearing manner, to make the sound production component 11 have better acoustic output quality, the distance between the centroid O of the first projection and the contour of the second projection may be within a range of 13 mm-54 mm. Preferably, the distance between the centroid O of the first projection and the contour of the second projection may be within a range of 18 mm-50 mm. More preferably, the distance between the centroid O of the first projection and the contour of the second projection may be within a range of 20 mm-45 mm. In some embodiments, by controlling the distance between the centroid O of the first projection of the sound production component 11 on the sagittal plane of the head of the user and the contour of the second projection to be within a range of 23 mm-40 mm, the sound production component 11 may be roughly located in the antihelix region of the user, and at least part of the sound production component 11 may form the baffle with the antihelix region, to increase the sound path of the sound emitted from the pressure relief hole to the external ear canal 101, thereby increasing the sound path difference from the sound guiding hole and the pressure relief hole to the external ear canal 101, increasing the sound intensity at the external ear canal 101, and reducing the volume of far-field sound leakage.

In some embodiments, in order to avoid that the distance between the centroid O of the first projection and the projection of the first portion 121 of the ear hook on the sagittal plane is too large to cause unstable wearing and the problem that the region between the end FE of the sound production component 11 and the inner contour 1014 of the auricle is relatively large, and avoid that the distance between the centroid O of the first projection and the projection of the first portion 121 of the ear hook 12 on the sagittal plane is too small to cause poor wearing comfort and be unable to match with the antihelix region to achieve relatively good acoustic output quality, the distance between the centroid O of the first projection of the sound production component 11 on the sagittal plane of the user and the first portion 121 of the ear hook on the sagittal plane may be controlled to be within 8 mm-45 mm. It can be understood that by controlling the distance to be within the range of 8 mm-45 mm, the first portion 121 of the ear hook may fit well with the rear inner side of the auricle of the user when wearing the open earphone, and the sound production component 11 may be ensured to be just located in on the antihelix region of the user, to make the sound production component 11 form the baffle with the antihelix region and increase the sound path of the sound emitted from the pressure relief hole to the external ear canal 101, thereby increasing the sound path difference between the sound guiding hole and the pressure relief hole to the external ear canal 101, increasing the sound intensity at the external ear canal 101, and reducing the volume of far-field sound leakage. In addition, the distance between the centroid O of the first projection of the sound production component 11 on the sagittal plane of the user and the projection of the first portion 121 of the ear hook on the sagittal plane may be controlled to be within the range of 8 mm-45 mm, which may make the region between the end FE of the sound production component 11 and the inner contour 1014 of the auricle minimized to reduce the acoustic short circuit region around the sound production component 11, thereby increasing the listening volume at the opening of the ear canal of the user. Preferably, in order to further improve the wearing stability of the open earphone, in some embodiments, the distance between the centroid O of the first projection of the sound production component 11 on the sagittal plane of the user and the first portion 121 of the ear hook on the sagittal plane may be within a range of 10 mm-41 mm. More preferably, the distance between the centroid O of the first projection of the sound production component 11 on the sagittal plane of the user and the first portion 121 of the ear hook on the sagittal plane may be within a range of 13 mm-37 mm. More preferably, the distance between the centroid O of the first projection of the sound production component 11 on the sagittal plane of the user and the first portion 121 of the ear hook on the sagittal plane may be within a range of 15 mm-33 mm. Further preferably, the distance between the centroid O of the first projection of the sound production component 11 on the sagittal plane of the user and the first portion 121 of the ear hook on the sagittal plane may be within a range of 20 mm-25 mm.

In some embodiments, the ear hook 12 may be elastic, and may deform to a certain extent in the wearing state compared with the non-wearing state. For example, in some embodiments, the distance between the centroid O of the first projection of the sound production component 11 on the sagittal plane of the user and the first portion 121 of the ear hook on the sagittal plane in the wearing state may be greater than that in the non-wearing state. Exemplarily, in some embodiments, when the open-back earphone 100 is in the non-wearing state, the distance between the centroid of the projection of the sound production component 11 on a specific reference plane and the first portion 121 of the ear hook on the specific reference plane may be within a range of 6 mm-40 mm. Preferably, the distance between the centroid of the projection of the sound production component 11 on the specific reference plane and the first portion 121 of the ear hook on the specific reference plane may be within a range of 9 mm-32 mm. It can be understood that in some embodiments, by making the distance between the centroid of the projection of the sound production component 11 on the specific reference plane and the first portion 121 of the ear hook on the specific reference plane in the non-wearing state slightly smaller than that in the wearing state, when the open earphone 10 is in the wearing state, the ear hook and the sound production component may product a certain clamping force on the ear of the user, to improve the wearing stability for the user without affecting the wearing experience of the user. The content regarding the specific reference plane may be found elsewhere in the present disclosure, which is not repeated here.

In some embodiments, when the wearing state of the open earphone 10 is that at least part of the sound production component 11 covers the antihelix region of the user, the centroid O of the first projection of the sound production component 11 on the sagittal plane of the user may be located outside a projection region of the opening of the ear canal on the sagittal plane, making the opening of the ear canal fully open to better receive sound information from the external environment. The position of the centroid O of the first projection may be related to the size of the sound production component. If the size of the sound production component 11 in the major axis direction Y or the minor axis direction Z is too small, the volume of the sound production component 11 may be relatively small, and then an area of a diaphragm inside the sound production component 11 may also be relatively small, resulting in low efficiency of the diaphragm pushing the air inside the housing of the sound production component 11 to produce sound, which may affect the acoustic output effect of the open earphone. When the size of the sound production component 11 in the major axis direction Y is too large, the sound production component 11 may exceed the auricle, the inner contour of the auricle may not support and limit the sound production component 11, and thus the open earphone may be liable to fall off in the wearing state. In addition, if the size of the sound production component 11 in the longitudinal direction Y is too small, a gap may be formed between the end FE of the sound production component 11 and the inner contour 1014 of the auricle, and the sound emitted from the sound guiding hole and the sound emitted from the pressure relief hole may have acoustic short circuit in the region between the end FE of the sound production component 11 and the inner contour 1014 of the auricle, resulting in a decrease in the listening volume at the opening the ear canal of the user. The larger the region between the end FE of the sound production component 11 and the inner contour 1014 of the auricle, the more obvious the acoustic short circuit. When the size of the sound production component 11 in the minor axis direction Z is too large, the sound production component 11 may cover the opening of the ear canal of the user, affecting the user obtaining sound information from the external environment. In some embodiments, in order to make the sound production component have better acoustic output quality, when the open earphone is in the wearing state, the distance between the centroid of the first projection of the sound production component on the sagittal plane of the user and the centroid of the projection of the opening of the ear canal of the user on the sagittal plane may not be greater than 25 mm. Preferably, the distance between the centroid of the first projection of the sound production component on the sagittal plane of the user and the centroid of the projection of the opening of the ear canal of the user on the sagittal plane may be within a range of 5 mm-23 mm. More preferably, the distance between the centroid of the first projection of the sound production component on the sagittal plane of the user and the centroid of the projection of the opening of the ear canal of the user on the sagittal plane may be within a range of 8 mm-20 mm. In some embodiments, by controlling the distance between the centroid of the first projection of the sound production component on the sagittal plane of the user and the centroid of the projection of the opening of the ear canal of the user on the sagittal plane to be within the range of 10 mm-17 mm, the centroid O of the first projection may be roughly located in the antihelix region of the user. Therefore, the sound output by the sound production component may be better transmitted to the user, the opening of the ear canal may keep fully open to obtain the sound information from the external environment. Meanwhile, the inner contour of the auricle may also make at least part of the sound production component 11 be subjected to a force that hinders its downward movement, thereby improving the wearing stability of the open earphone 10 to a certain extent. It should be noted that the shape of the projection of the opening of the ear canal on the sagittal plane may be approximately regarded as an ellipse. Correspondingly, the centroid of the projection of the opening of the ear canal on the sagittal plane may be a geometric center of the ellipse.

In some embodiments, when the open earphone 10 is in the wearing state and at least part of the sound production component 11 covers the antihelix region of the user, a distance between the centroid O of the first projection U and a centroid of a projection of the battery compartment 13 on the sagittal plane may vary to a certain extent compared with the wearing manner in which at least part of the sound production component 11 extends into the cavity of auricular concha of the user. It may be the same as the wearing manner in which at least part of the sound production component 11 extends into the cavity of auricular concha of the user. Referring to FIG. 6, in order to make the user have better stability and comfort when the user wears the open earphone 10, in the wearing state, a distance (sixth distance) between the centroid O of the projection of the sound production component 11 on the sagittal plane and the centroid W of the projection of the battery compartment 13 on the sagittal plane may be controlled to be within a range of 20 mm-31 mm. Preferably, the distance between the centroid O of the projection of the sound production component 11 on the sagittal plane and the centroid W of the projection of the battery compartment 13 on the sagittal plane may be within a range of 22 mm-28 mm. More preferably, the distance between the centroid O of the projection of the sound production component 11 on the sagittal plane and the centroid W of the projection of the battery compartment 13 on the sagittal plane may be within a range of 23 mm-26 mm. Due to the elasticity of the ear hook, in the wearing state and the non-wearing state of the open earphone 10, the distance between the centroid O of the projection corresponding to the sound production component 11 and the centroid W of the projection corresponding to the battery compartment 13 may vary. In some embodiments, in the non-wearing state, a distance (fifth distance) between the centroid O of the projection of the sound production component 11 on a specific reference plane and the centroid W of the projection of the battery compartment 13 on the specific reference plane may be within a range of 16.7 mm-25 mm. Preferably, in the non-wearing state, the distance between the centroid O of the projection of the sound production component 11 on the specific reference plane and the centroid W of the projection of the battery compartment 13 on the specific reference plane may be within a range of 18 mm-23 mm. More preferably, in the non-wearing state, the distance between the centroid O of the projection of the sound production component 11 on the specific reference plane and the centroid W of the projection of the battery compartment 13 on the specific reference plane may be within a range of 19.6 mm-21.8 mm.

Taking the specific reference plane as the sagittal plane for an example, in some embodiments, when the open earphone 10 is in the wearing state and the non-wearing state, a variation value (a ratio of a difference between the fourth distance and the third distance to the third distance) of the distance between the centroid O of the projection corresponding to the sound production component 11 and the centroid W of the projection corresponding to the battery compartment 13 may reflect a softness of the ear hook. It can be understood that when the softness of the ear hook is too large, the overall structure and shape of the open earphone 10 may not unstable, the sound production component 11 and the battery compartment 13 may not be strongly supported, the wearing stability may also be poor, and the open earphone 10 may be liable to fall off. Considering that the ear hook needs to be hung at a connection part between the auricle and the head, when the softness of the ear hook is too small, the open earphone 10 may not be liable to deform, and when the user wears the open earphone, the ear hook may stick tightly and even compress a region between the human ear and/or head, affecting the wearing comfort. Accordingly, in order to make the user have better stability and comfort when wearing the open earphone 10, in some embodiments, a ratio of the variation value of the distance between the centroid O of the first projection U and the centroid W of the projection of the battery compartment 13 on the sagittal plane in the wearing state and the non-wearing state of the open earphone 10 to the distance between the centroid O of the first projection U and the centroid W of the projection of the battery compartment 13 on the sagittal plane in the non-wearing state of the open earphone may be within a range of 0.3-0.7. Preferably, the ratio of the variation value of the distance between the centroid O of the projection on the sagittal plane and the centroid W of the projection of the battery compartment 13 on the sagittal plane in the wearing state and the non-wearing state of the open earphone 10 to the distance between the centroid O of the projection and the centroid W of the projection of the battery compartment 13 in the non-wearing state of the open earphone may be within a range of 0.45-0.68. The content regarding the specific reference plane may be found elsewhere in the present disclosure (e.g., FIG. 10A and FIG. 10 and corresponding content thereof).

In addition, while ensuring that the ear canal is not blocked, it is also considered that the size (especially the size along the major axis direction Y of the first projection) of the baffle formed by the sound production component 11 and the antihelix region may be as large as possible, and the overall volume of the sound production component 11 may not be too large or too small. Therefore, on the premise that the overall volume or shape of the sound production component 11 is specific, a wearing angle of the sound production component 11 relative to the antihelix region may also be considered.

Figure 19A:
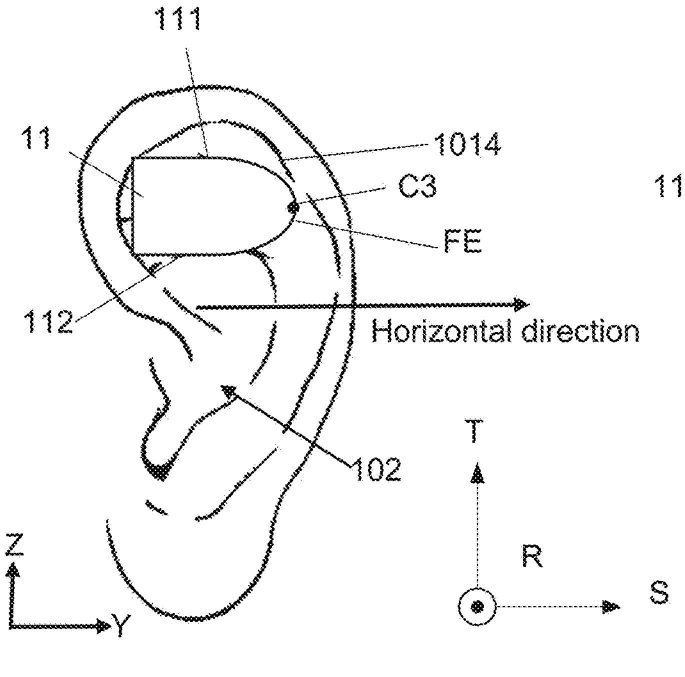
FIG. 19A is a schematic diagram illustrating different exemplary matching positions between an open earphone and an ear canal of a user according to some embodiments of the present disclosure.
Figure 19B:
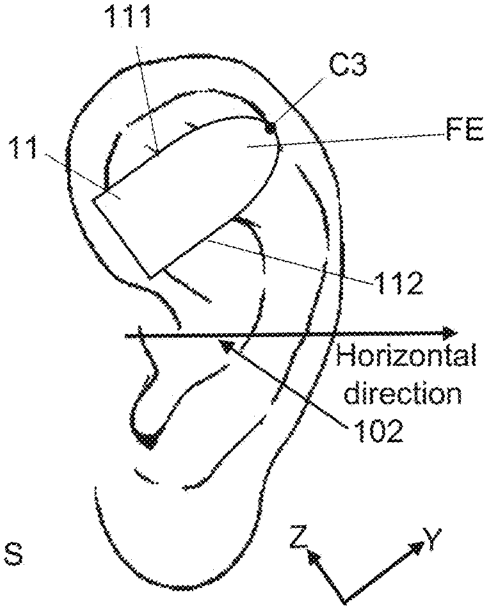
FIG. 19B is a schematic diagram illustrating different exemplary matching positions of another open earphone and an ear canal of a user according to some embodiments of the present disclosure.
Figure 19C:
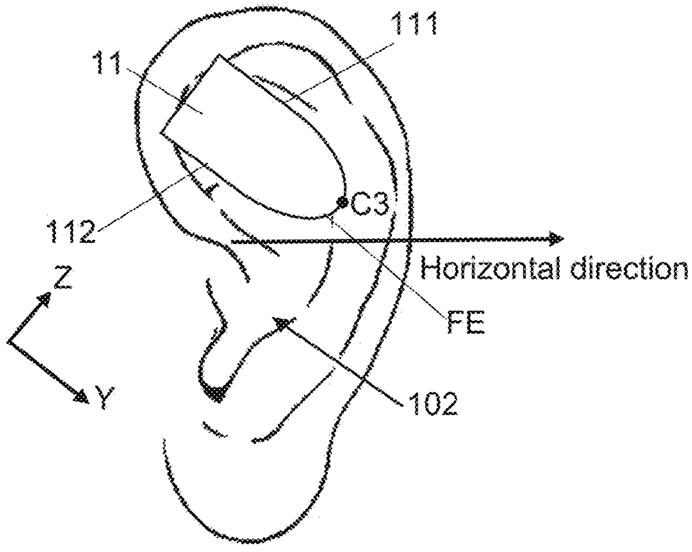
FIG. 19C is a schematic diagram illustrating different exemplary matching positions of another open earphone and an ear canal of a user according to some embodiments of the present disclosure.

FIGS. 19A-19C are schematic diagrams illustrating different exemplary matching positions of an open earphone and an ear canal of a user according to some embodiments of the present disclosure. Referring to FIG. 19A, in some embodiments, when the sound production component 11 is a quasi-cuboid structure, the upper sidewall 111 or the lower sidewall 112 of the sound production component 11 may be parallel to a horizontal plane (e.g., the ground plane) in the wearing state. Referring to FIG. 19B and FIG. 19C, in some embodiments, the upper sidewall 111 or the lower sidewall 112 of the sound production component 11 may also be inclined at a certain angle relative to the horizontal plane. Referring to FIG. 19A and FIG. 19B, when the sound production component 11 is inclined upward relative to the horizontal direction, an inclination angle of the upper sidewall 111 or the lower sidewall 112 of the sound production component 11 relative to the horizontal plane may be too large, which may cause the sound guiding hole of the sound production component 11 to be away from the opening of the ear canal, affecting the listening volume at the opening of the ear canal of the user. Referring to FIG. 19A and FIG. 19C, when the sound production component is inclined downward relative to the horizontal direction, the inclination angle of the upper sidewall 111 or the lower sidewall 112 of the sound production component 11 relative to the horizontal plane may be too large, which may cause the sound production component 11 to cover the opening of the ear canal, affecting user obtaining sound information from the external environment. Based on the above problems, in order to make the opening of the ear canal of the user have a better listening effect in the wearing state, and ensure that the opening of the ear canal of the user keeps fully open, in some embodiments, in the wearing state of the open earphone 10, an inclination angle of a projection of the upper sidewall 111 or the lower sidewall 112 of the sound production component 11 on the sagittal plane relative to the horizontal direction may not be greater than 40°. Preferably, in the wearing state of the open earphone 10, the inclination angle of the projection of the upper sidewall 111 or the lower sidewall 112 of the sound production component 11 on the sagittal plane relative to the horizontal direction may not be greater than 38°. More preferably, in the wearing state of the open earphone 10, the inclination angle of the projection of the upper sidewall 111 or the lower sidewall 112 of the sound production component 11 on the sagittal plane relative to the horizontal direction may not be greater than 25°. More preferably, in the wearing state of the open earphone 10, the inclination angle of the projection of the upper sidewall 111 or the lower sidewall 112 of the sound production component 11 on the sagittal plane relative to the horizontal direction may not be greater than 10°.

It should be noted that the inclination angle of the projection of the upper sidewall 111 of the sound production component 11 on the sagittal plane relative to the horizontal direction may be the same as or different from the inclination angle of the projection of the lower sidewall 112 of the sound production component 11 on the sagittal plane relative to the horizontal direction. For example, when the upper sidewall 111 is parallel to the lower sidewall 112 of the sound production component 11, the inclination angle of the projection of the upper sidewall 111 on the sagittal plane relative to the horizontal direction and the inclination angle of the projection of the lower sidewall 112 on the sagittal plane relative to the horizontal direction may be the same. As another example, when the upper sidewall 111 is not parallel to the lower sidewall 112 of the sound production component 11, or one of the upper sidewall 111 and the lower sidewall 112 is a planar wall, and the other of the upper sidewall 111 and the lower sidewall 112 is a non-planar wall (e.g., a curved wall), the inclination angle of the projection of the upper sidewall 111 on the sagittal plane relative to the horizontal direction and the inclination angle of the projection of the lower sidewall 112 on the sagittal plane relative to the horizontal direction may be different. In addition, when the upper sidewall 111 or the lower sidewall 112 is a curved surface or a concave-convex surface, the projection of the upper sidewall 111 or the lower sidewall 112 on the sagittal plane may be a curved line or a broken line. Then the inclination angle of the projection of the upper sidewall on the sagittal plane relative to the horizontal direction may be an included angle between a tangent line of a point at which the curved line or the broken line has a largest distance relative to the ground plane and the horizontal direction, and the inclination angle of the projection of the lower sidewall on the sagittal plane relative to the horizontal direction may be an included angle between a tangent line of a point at which the curved line or the broken line has a smallest distance relative to the ground plane and the horizontal direction.

The whole or part structure of the sound production component 11 may cover the antihelix region to form a baffle. The listening effect when the user wears the open earphone 10 may be related to a distance between the sound guiding hole and the pressure relief hole of the sound production component 11. The closer the distance between the sound guiding hole and the pressure relief hole, the more the sound emitted from the sound guiding hole and the pressure relief hole cancels out at the opening of the ear canal of the user, and the lower the listening volume at the opening of the ear canal of the user. The distance between the sound guiding hole and the pressure relief hole may be related to the size of the sound production component 11. For example, the sound guiding hole may be arranged on a sidewall (e.g., the lower sidewall or the inner side) of the sound production component 11 close to the opening of the ear canal of the user. The pressure relief hole may be arranged on a sidewall (e.g., the upper sidewall or the outer side) of the sound production component 11 away from the opening of the ear canal of the user. Therefore, the size of the sound production component may affect the listening volume at the opening of the ear canal of the user. For example, if the size is too large, pressure may be brought to most region of the ear, affecting the wearing comfort of the user and the convenience of carrying around. In some embodiments, a distance between a midpoint of the projection of the upper sidewall 111 and the lower sidewall 112 of the sound production component 11 on the sagittal plane and a highest point of the second projection may reflect the size of the sound production component 11 along the minor axis direction Z. Accordingly, in order to improve the listening effect of the open earphone 10 while ensuring that the open earphone 10 does not block the opening of the ear canal of the user, in some embodiments, when the wearing state of the open earphone 10 is that at least part of the sound production component 11 covers the antihelix region of the user, the distance between the midpoint of the projection of the upper sidewall 111 of the sound production component 11 on the sagittal plane and the highest point of the second projection may be within a range of 12 mm-24 mm, and the distance between the midpoint of the projection of the lower sidewall 112 of the sound production component 11 on the sagittal plane and the highest point of the second projection may be within a range of 22 mm-34 mm. Preferably, the distance between the midpoint of the projection of the upper sidewall 111 of the sound production component 11 on the sagittal plane and the highest point of the second projection may be within a range of 12.5 mm-23 mm, and the distance between the midpoint of the projection of the lower sidewall 112 of the sound production component 11 on the sagittal plane and the highest point of the second projection may be within a range of 22.5 mm-33 mm. It should be noted that, when the projection of the upper sidewall 111 of the sound production component 11 on the sagittal plane is a curved line or a broken line, the midpoint of the projection of the upper sidewall 111 of the sound production component 11 on the sagittal plane may be selected by the following exemplary method. A line segment may be drawn by selecting two farthest points on the projection of the upper sidewall 111 on the sagittal plane along the major axis direction, a mid-perpendicular line may be drawn by selecting a midpoint on the line segment, and an interaction point of the mid-perpendicular line and the projection may be the midpoint of the projection of the upper sidewall 111 of the sound production component 11 on the sagittal plane. In some alternative embodiments, a point on the projection of the upper sidewall 111 on the sagittal plane with a smallest distance from the highest point of the second projection may be selected as the midpoint of the projection of the upper sidewall 111 of the sound production component 11 on the sagittal plane. The midpoint of the projection of the lower sidewall 112 of the sound production component 11 on the sagittal plane may be selected in the same manner as above. For example, a point on the projection of the lower sidewall 112 on the sagittal plane with a largest distance from the highest point of the second projection may be selected as the midpoint of the projection of the lower sidewall 112 of the sound production component 11 on the sagittal plane.

In some embodiments, a distance between the midpoint of the projection of the upper sidewall 111 and the lower sidewall 112 of the sound production component 11 on the sagittal plane and a projection of the vertex of the ear hook on the sagittal plane may reflect the size of the sound production component 11 along the minor axis direction Z. In order to improve the listening effect of the open earphone 10 while ensuring that the open earphone 10 does not block the opening of the ear canal of the user, in some embodiments, the distance between the midpoint of the projection of the upper sidewall 111 of the sound production component 11 on the sagittal plane and the projection of the vertex of the ear hook on the sagittal plane may be within a range of 13 mm-20 mm, and the distance between the midpoint of the projection of the lower sidewall 112 of the sound production component 11 on the sagittal plane and the projection of the vertex of the ear hook on the sagittal plane may be within a range of 22 mm-36 mm. Preferably, the distance between the midpoint of the projection of the upper sidewall 111 of the sound production component 11 on the sagittal plane and the projection of the vertex of the ear hook on the sagittal plane may be within a range of 14 mm-19.5 mm, and the distance between the midpoint of the projection of the lower sidewall 112 of the sound production component 11 on the sagittal plane and the projection of the vertex of the ear hook on the sagittal plane may be within a range of 22.5 mm-35 mm. More preferably, the distance between the midpoint of the projection of the upper sidewall 111 of the sound production component 11 on the sagittal plane and the projection of the vertex of the ear hook on the sagittal plane may be within a range of 15 mm-18 mm, and the distance between the midpoint of the projection of the lower sidewall 112 of the sound production component 11 on the sagittal plane and the projection of the vertex of the ear hook on the sagittal plane may be within a range of 26 mm-30 mm.

Referring to FIG. 19A, in some embodiments, the upper sidewall 111 or the lower sidewall 112 of the sound production component 11 may be parallel or approximately parallel to the horizontal plane in the wearing state, and the end FE of the sound production component 11 may be located between the inner contour 1014 of the auricle and the edge of the cavity of auricular concha 102, i.e., the midpoint C3 of the projection of the end FE of the sound production component 11 on the sagittal plane may be located between the projection of the inner contour 1014 of the auricle on the sagittal plane and the projection of the edge of the cavity of auricular concha 102 on the sagittal plane. As shown in FIG. 19B and FIG. 19C, in some embodiments, the upper sidewall 111 or the lower sidewall 112 of the sound production component 11 may also be inclined at a certain angle relative to the horizontal plane in the wearing state. As shown in FIG. 19B, the end FE of the sound production component 11 may be inclined toward the region of the top of the auricle relative to the fixed end of the sound production component 11, and the end FE of the sound production component 11 may abut against the inner contour 1014 of the auricle. As shown in FIG. 19C, the fixed end of the sound production component 11 may be inclined toward the region of the top of the auricle relative to the end FE of the sound production component 11, and the end FE of the sound production component 11 may be located between the edge of the cavity of auricular concha 102 and the inner contour 1014 of the auricle. That is to say, the midpoint C3 of the projection of the end FE of the sound production component 11 on the sagittal plane may be located between the projection of the inner contour 1014 of the auricle on the sagittal plane and the projection of the edge of the cavity of auricular concha 102 on the sagittal plane. In some embodiments, the midpoint C3 of the projection of the end FE of the sound production component 11 on the sagittal plane may be located between the projection of the inner contour 1014 of the auricle on the sagittal plane and the projection of the edge of the concha cavity 102 on the sagittal plane. In the wearing state, if the midpoint C3 of the projection of the end FE of the sound production component 11 on the sagittal plane is too small relative to the projection of the edge of the cavity of auricular concha 102 on the sagittal plane, the end FE of the sound production component 11 may not abut against the inner contour 1014 of the auricle, the sound production component 11 may not be limited and may be easy to fall off. If the midpoint C3 of the projection of the end FE of the sound production component 11 on the sagittal plane is too large relative to the projection of the edge of the cavity of auricular concha 102 on the sagittal plane, the sound production component 11 may squeeze the inner contour 1014 of the auricle, causing discomfort to the user after a long time of wearing. In order to ensure that the open earphone 10 has a better listening effect and ensure the wearing comfort and stability for the user, in some embodiments, a distance between the midpoint C3 of the projection of the end FE of the sound production component 11 on the sagittal plane and the projection of the edge of the cavity of auricular concha on the sagittal plane may not be greater than 15 mm. Preferably, the distance between the midpoint C3 of the projection of the end FE of the sound production component 11 on the sagittal plane and the projection of the edge of the cavity of auricular concha on the sagittal plane may not be greater than 13 mm. More preferably, the distance between the midpoint C3 of the projection of the end FE of the sound production component 11 on the sagittal plane and the projection of the edge of the cavity of auricular concha on the sagittal plane may not be greater than 11 mm. In addition, considering that a gap is formed between the end FE of the sound production component 11 and the inner contour 1014 of the auricle, the sound emitted from the sound guiding hole and the sound emitted from the pressure relief hole may have acoustic short circuit in a region between the end FE of the sound production component 11 and the inner contour 1014 of the auricle, resulting in a decrease in the listening volume at the opening of the ear canal of the user. The larger the region between the end FE of the sound production component 11 and the inner contour 1014 of the auricle, the more obvious the acoustic short circuit. In order to ensure the listening volume when the user wears the open earphone 10, in some embodiments, the end FE of the sound production component 11 may abut against the inner contour 1014 of the auricle, to make the acoustic short circuit between the end FE of the sound production component 11 and the inner contour 1014 of the auricle closed, thereby increasing the listening volume at the opening of the ear canal.

It should be noted that, when the projection of the end FE of the sound production component 11 on the sagittal plane is a curved line or a broken line, the midpoint C3 of the projection of the end FE of the sound production component 11 on the sagittal plane may be selected by the following exemplary method. A line segment may be drawn by selecting two farthest points on the projection of the end FE on the sagittal plane along the minor axis direction Z, a mid-perpendicular line may be drawn by selecting a midpoint on the line segment, and an interaction point of the mid-perpendicular line and the projection may be the midpoint C3 of the projection of the end FE of the sound production component 11 on the sagittal plane. In some embodiments, when the end FE of the sound production component 11 is a curved surface, a tangent point where a tangent line parallel to the minor axis direction Z on the projection may also be selected as the midpoint of the projection of the end FE of the sound production component 11 on the sagittal plane.

In addition, in some embodiments of the present disclosure, the distance between the midpoint of the projection of the end FE of the sound production component 11 on the sagittal plane and the projection of the edge of the cavity of auricular concha on the sagittal plane refers to a minimum distance between the midpoint of the projection of the end FE of the sound production component 11 on the sagittal plane and the projection region of the edge of the cavity of auricular concha on the sagittal plane. The distance between the midpoint C3 of the projection of the end FE of the sound production component 11 on the sagittal plane and the projection of the edge of the cavity of auricular concha on the sagittal plane refers to a distance between the midpoint C3 of the projection of the end FE of the sound production component 11 on the sagittal plane and the projection of the edge of the cavity of auricular concha on the sagittal plane in the sagittal axis.

In some embodiments, in order to make part or the whole structure of the sound production component cover the antihelix region when the user wears the open earphone as shown in FIG. 16 and FIG. 18, a certain included angle may be formed between the upper sidewall 111 of the sound production component 11 and the second portion 122 of the ear hook. Similar to the principle that at least part of the sound production component extends into the cavity of auricular concha, referring to FIG. 14A, the included angle may be represented by an included angle β between the projection of the upper sidewall 111 of the sound production component 11 on the sagittal plane and a tangent line 126 of a projection of a connection part between the second portion 122 of the ear hook and the upper sidewall 111 of the sound production component 11 on the sagittal plane. Specifically, the upper sidewall of the sound production component 11 and the second portion 122 of the ear hook may have the connection part. The projection of the connection part on the sagittal plane may be a point U. The tangent line 126 of the projection of the second portion 122 of the ear hook on the sagittal plane may be drawn through the point U. When the upper sidewall 111 is a curved surface, the projection of the upper sidewall 111 on the sagittal plane may be a curved line or a broken line. At this time, the included angle between the projection of the upper sidewall 111 on the sagittal plane and the tangent line 126 may be an included angle between a tangent line to a point at which the curved line or the broken line has a largest distance from the ground plane and the tangent line 126. In some embodiments, when the upper sidewall 111 is the curved surface, a tangent line parallel to the major axis direction Y on the projection may also be selected, and an included angle between the tangent line and the horizontal direction may be used to represent the inclination angle between the projection of the upper sidewall 111 on the sagittal plane and the tangent line 126. In some embodiments, the included angle β may be within a range of 45°-110°. Preferably, the included angle β may be within a range of 60°-100°. More preferably, the included angle β may be within a range of 80°-95°.

The human head is approximately regarded as a quasi-sphere structure, and the auricle is a structure that protrudes relative to the head. When the user wears the open earphone, part of the ear hook 12 may be attached to the head of the user. In order to make the sound production component 11 in contact with the anthelix region, in some embodiments, a certain inclination angle may be formed between the sound production component 11 and the ear hook plane when the open earphone is in the wearing state. The inclination angle may be represented by an included angle between a plane corresponding to the sound production component 11 and the ear hook plane. In some embodiments, the plane 11 corresponding to the sound production component 11 may include an outer side and an inner side. In some embodiments, when the outer side or the inner side of the sound production component 11 is a curved surface, the plane corresponding to the sound production component 11 refers to a tangent plane corresponding to the curved surface at a center position, or a plane roughly coinciding with a curve enclosed by the edge contour of the curved surface. Taking the inner side of the sound production component 11 as an example, the included angle formed between the inner side and the ear hook plane may be the inclination angle of the sound production component 11 relative to the ear hook plane.

Considering that if the angle is too large, the contact area between the sound production component 11 and the antihelix region of the user may be small, sufficient contact resistance may not be provided, and the open earphone may be liable to fall off when the user wears the open earphone. In addition, the size (especially the size along major axis direction Y of the sound production component 11) of the baffle formed by the antihelix region covered by at least part of the sound production component 11 may be too small, and the sound path difference from the sound guiding hole and the pressure relief hole to the external ear canal 101 may be small, affecting the listening volume at the opening of the ear canal of the user. Furthermore, the size of the sound production component 11 along the major axis direction Y may be too small, the region between the end FE of the sound production component 11 and the inner contour 1014 of the auricle may be relatively large, and the sound emitted from the sound guiding hole and the sound emitted from the pressure relief hole may have the acoustic short circuit in the region between the end FE of the sound production component 11 and the inner contour 1014 of the auricle, resulting in a decrease in the listening volume at the opening of the ear canal of the user. In order to ensure that the user has a better listening effect when wearing the open earphone 10, while ensuring the wearing stability and comfort, for example, in some embodiments, when the wearing manner of the open earphone is that at least part of the sound production component covers the antihelix region of the user, and the open earphone is in the wearing state, the inclination angle of the plane corresponding to the sound production component 11 relative to the ear hook plane may not be greater than 8°. Therefore, the sound production component 11 and the antihelix region of the user may have a relatively large contact region, improving the wearing stability. Meanwhile, most of the structure of the sound production component 11 may be located in the antihelix region, making the opening of the ear canal completely open, and facilitating the user to receive the sound from the external environment. Preferably, the inclination angle of the plane corresponding to the sound production component 11 relative to the ear hook plane may be within a range of 2°-7°. More preferably, the inclination angle of the plane corresponding to the sound production component 11 relative to the ear hook plane may be within a range of 3-6°.

Due to the elasticity of the ear hook, the inclination angle of the sound production component relative to the ear hook plane may vary to a certain extent in the wearing state and the non-wearing state. For example, the inclination angle in the non-wearing state may be smaller than that in the wearing state. In some embodiments, when the open earphone is in the non-wearing state, the inclination angle of the sound production component relative to the ear hook plane may be within a range of 0°-6°. By making the inclination angle of the sound production component relative to the ear hook plane in the non-wearing state slightly smaller than that in the wearing state, the ear hook of the open earphone 10 may clamp the ear of the user (e.g., the antihelix region) when the open earphone is in the wearing state. Therefore, the wearing stability for the user may be improved without affecting the wearing experience of the user. Preferably, in the non-wearing state, the inclination angle of inclination of the sound production component relative to the ear hook plane may be within a range of 1°-6°. More preferably, in the non-wearing state, the inclination angle of the sound production component relative to the ear hook plane may be within a range of 2°-5°.

When the size of the sound production component 11 in the thickness direction X is too small, the volume of the front cavity and the rear cavity formed by the diaphragm and the housing of the sound production component 11 may be too small, the vibration amplitude of the vibration may be limited, and a large sound volume may not be provided. When the size of the sound production component 11 in the thickness direction X is too large, the overall size or weight of the sound production component 11 is relatively large in the wearing state, which may affect the wearing stability and comfort. In some embodiments, in order to ensure that the sound production component 11 has a better acoustic output effect and ensure the wearing stability, in some embodiments, when the wearing mode of the open earphone is that at least part of the sound production component covers the antihelix region of the user, and the open earphone is in the wearing state, a distance between a point on the sound production component farthest from the ear hook plane and the ear hook plane may be within a range of 12 mm-19 mm, and a distance between a point on the sound production component closest to the ear hook plane and the ear hook plane may be within a range of 3 mm-9 mm. Preferably, when the open earphone is in the wearing state, the distance between the point on the sound production component farthest from the ear hook plane and the ear hook plane may be within a range of 13.5 mm-17 mm, and the distance between the point on the sound production component closest to the ear hook plane and the ear hook plane may be within a range of 4.5 mm-8 mm. More preferably, when the open earphone is in the wearing state, the distance between the point on the sound production component farthest from the ear hook plane and the ear hook plane may be within a range of 14 mm-17 mm, and the distance between the point on the sound production component closest to the ear hook plane and the ear hook plane may be within a range of 5 mm-7 mm. In some embodiments, by controlling the distance between the point on the sound production component farthest from the ear hook plane and the ear hook plane to be within the range of 12 mm-19 mm, and controlling the distance between the point on the sound production component closest to the ear hook plane and the ear hook plane to be within the range of 3 mm-9 mm, the size of the sound production component along the thickness direction X and the major axis direction Y may be constrained, at least part of the sound production component may cooperate with the antihelix region of the user to form the baffle, and the open earphone may be ensured to have better wearing comfort and stability. The overall structure of the open earphone shown in FIG. 16 and FIG. 18 may be roughly the same as that of the open earphone shown in FIG. 14A and FIG. 14B. The content regarding the inclination angle of the sound production component relative to the ear hook plane in the open earphone shown in FIG. 16 and FIG. 18, and the distance between the point on the sound production component 11 farthest from the ear hook plane and the ear hook plane may be found in FIG. 14A and FIG. 14B.

In some embodiments, when the wearing manner of the open earphone 10 is that at least part of the sound production component covers the antihelix region of the user, and the open earphone is in the wearing state, at least part of the sound production component 11 may be subjected to an antihelix force to prevent from sliding down, thereby ensuring the acoustic output effect of the sound production component 11, and improving the wearing stability of the open earphone through the force of the antihelix region on the sound production component 11. At this time, the sound production component 11 may have a certain inclination angle relative to the auricle surface of the user. When the inclination angle of the sound production component 11 relative to the auricle surface is large, the sound production component 11 may abuts against the antihelix region, and the user may feel a strong sense of discomfort after wearing the open earphone for a long time. Therefore, in order to make the user have better stability and comfort when wearing the open earphone, and make that the sound production component 11 have a better acoustic output effect, the inclination angle of the sound production component of the open earphone relative to the auricle surface may be within a range of 5°-40° in the wearing state. Preferably, in some embodiments, in order to further optimize the acoustic output quality and the wearing experience of the open earphone in the wearing state, the inclination angle of the sound production component relative to the auricle surface may be controlled to be within a range of 8°-35°. More preferably, the inclination angle of the sound production component relative to the auricle surface may be controlled to be within a range of 15°-25°. It should be noted that the inclination angle of the sidewall of the sound production component 11 away from the head of the user or facing the opening of the ear canal of the user relative to the auricle surface of the user may be a sum of an included angle $\gamma 1$ between the auricle surface and the sagittal plane and an included angle $\gamma 2$ between the sidewall of the sound production component 11 away from the head of the user or facing the opening of the ear canal of the user and the sagittal plane. The content regarding the inclination angle of the sound production component relative to the auricle surface may be found elsewhere in the embodiments of the present disclosure (e.g., FIG. 15 and related descriptions thereof).

The basic concept has been described above. Obviously, for those skilled in the art, the above detailed disclosure is only an example, and does not constitute a limitation to the present disclosure. Although not explicitly stated here, those skilled in the art may make various modifications, improvements, and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, "one embodiment", "an embodiment", and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, some features, structures, or features in the present disclosure of one or more embodiments may be appropriately combined.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. An open earphone, comprising:

a sound production component; and an ear hook including a first portion and a second portion connected in sequence, wherein the first portion is hung between an auricle of a user and a head of the user, the second portion extends toward a front outer side of the auricle and connects to the sound production component, and the sound production component is located close to the ear canal but does not block the opening of the ear canal;

wherein the sound production component and the auricle have a first projection and a second projection on a sagittal plane, respectively, a centroid of the first projection have a first distance from a highest point of the second projection in a vertical axis direction, a ratio of the first distance to a height of the second projection in the vertical axis direction is within a range of 0.25-0.6, the centroid of the first projection has a second distance from an end point of the second projection in a sagittal axis direction, and a ratio of the second distance to a width of the second projection in the sagittal axis direction is within a range of 0.4-0.7.

2. The open earphone of claim 1, wherein the sound production component at least partially covers an antihelix area, a ratio of the first distance to the height of the second projection in the vertical axis direction is within a range of 0.25-0.4; and a ratio of the second distance to the width of the second projection in the sagittal axis is within a range of 0.4-0.6.

3. The open earphone of claim 2, wherein a distance between the centroid of the first projection and a contour of the second projection is within a range of 13 mm-54 mm.

4. The open earphone of claim 2, wherein a distance between the centroid of the first projection and a projection of the first portion of the ear hook on the sagittal plane is within a range of 8 mm-45 mm.

5. The open earphone of claim 2, wherein when the earphone is not worn, a distance between a centroid of a projection of the sound production component on a specific reference plane and a centroid of a projection of the first portion of the ear hook on the specific reference plane is within a range of 10 mm-50 mm.

6. The open earphone of claim 2, wherein a distance between the centroid of the first projection and a centroid of a projection of the opening of the ear canal on the sagittal plane is not greater than 25 mm.

7. The open earphone of claim 2, further comprising a battery compartment, which is located at an end of the ear hook away from the sound production component; wherein when the earphone is not worn, a centroid of a projection of the sound production component on a specific reference plane has a fifth distance from a centroid of a projection of the battery compartment on the specific reference plane, and the fifth distance is within a range of 20 mm-31 mm.

8. The open earphone of claim 7, wherein when the earphone is worn, the centroid of the first projection has a sixth distance from a centroid of a projection of the battery compartment on the sagittal plane, and the sixth distance is within a range of 25 mm-40 mm.

9. The open earphone of claim 8, wherein a ratio of a difference between the sixth distance and the fifth distance to the sixth distance is within a range of 0.3-0.7.

10. The open earphone of claim 2, wherein an inclination angle of a projection of an upper sidewall or a lower sidewall of the sound production component on the sagittal plane relative to a horizontal direction is not more than 40°.

11. The open earphone of claim 10, wherein a distance between a midpoint of the projection of the upper sidewall of the sound production component on the sagittal plane and a highest point of the second projection is within a range of 12 mm-24 mm; and a distance between a midpoint of the projection of the lower sidewall of the sound production component on the sagittal plane and the highest point of the second projection is within a range of 22 mm-34 mm.

12. The open earphone of claim 10, wherein a distance between a midpoint of the projection of the upper sidewall of the sound production component on the sagittal plane and a projection of the vertex of the ear hook on the sagittal plane is within a range of 13 mm-20 mm; and a distance between a midpoint of the projection of the lower sidewall of the sound production component on the sagittal plane and the projection of the vertex of the ear hook on the sagittal plane is within a range of 22 mm-36 mm.

13. The open earphone of claim 2, wherein a distance between a midpoint of a projection of an end of the sound production component on the sagittal plane and a projection of an edge of the cavity of auricular concha on the sagittal plane is not more than 15 mm.

14. The open earphone of claim 2, wherein when the earphone is not worn, an inclination angle of the sound production component relative to a plane of the ear hook is not greater than 8°.

15. The open earphone of claim 5, wherein when the earphone is not worn, a distance between a farthest point on the sound production component from a plane of the ear hook and the plane of the ear hook is within a range of 26 mm-32 mm.

16. The open earphone of claim 2, wherein an inclination angle of the sound production component relative to a surface of the auricle within a range of 7°-25°.

17. The open earphone of claim 2, wherein an angle between a projection of an upper sidewall of the sound production component on a sagittal plane and a tangent of a projection of a connection part between the second portion of the ear hook and the upper sidewall on the sagittal plane is within a range of 45°-110°.

18. An open earphone comprising:

a sound production component; and an ear hook comprising a first portion and a second portion connected in sequence, wherein the first portion is hung between an auricle of a user and a head of the user, the second portion extends towards the front outer side of the auricle and connects to the sound production component, the sound production component is located close to an ear canal but does not block an opening of the ear canal, and the sound production component covers at least partially an antihelix area;

wherein the sound production component and the auricle have a first projection and a second projection on a sagittal plane, respectively, a distance between a centroid of the first projection and a contour of the second projection is within a range of 13 mm-54 mm, and an inclination angle of a projection of an upper sidewall or a lower sidewall of the sound production component on the sagittal plane relative to a horizontal direction is not more than 40°.

19. The open earphone of claim 18, wherein a distance between a midpoint of the projection of the upper sidewall of the sound production component on the sagittal plane and a highest point of the second projection is within a range of 12 mm-24 mm; and a distance between a midpoint of the projection of the lower sidewall of the sound production component on the sagittal plane and the highest point of the second projection is within a range of 22 mm-34 mm.

20. The open earphone of claim 18, wherein a distance between a midpoint of the projection of the upper sidewall of the sound production component on the sagittal plane and a projection of a vertex of the ear hook on the sagittal plane is within a range of 13 mm-20 mm; and a distance between a midpoint of the projection of the lower sidewall of the sound production component on the sagittal plane and the projection of the vertex of the ear hook on the sagittal plane is within a range of 22 mm-36 mm.

* * * * *